(12) United States Patent
Fleckenstein

(10) Patent No.: US 11,959,666 B2
(45) Date of Patent: Apr. 16, 2024

(54) SYSTEM AND METHOD FOR HARVESTING GEOTHERMAL ENERGY FROM A SUBTERRANEAN FORMATION

(71) Applicant: Colorado School of Mines, Golden, CO (US)

(72) Inventor: William W. Fleckenstein, Lakewood, CO (US)

(73) Assignee: Colorado School of Mines, Golden, CO (US)

( * ) Notice: Subject to any disclaimer, the term of this patent is extended or adjusted under 35 U.S.C. 154(b) by 0 days.

(21) Appl. No.: 17/896,955

(22) Filed: Aug. 26, 2022

(65) Prior Publication Data

US 2023/0076219 A1    Mar. 9, 2023

Related U.S. Application Data

(60) Provisional application No. 63/400,687, filed on Aug. 24, 2022, provisional application No. 63/237,425, filed on Aug. 26, 2021.

(51) Int. Cl.
*F24T 10/30* (2018.01)
*E21B 43/26* (2006.01)
*F03G 4/00* (2006.01)

(52) U.S. Cl.
CPC .............. *F24T 10/30* (2018.05); *E21B 43/26* (2013.01); *F03G 4/023* (2021.08)

(58) Field of Classification Search
CPC .......... F24T 10/30; E21B 43/26; F03G 4/023; F03G 4/02; F03G 4/026; F03G 4/031; F03G 4/033; F03G 4/001; Y02E 10/10
See application file for complete search history.

(56) References Cited

U.S. PATENT DOCUMENTS

| | | | |
|---|---|---|---|
| 1,177,984 | A | 4/1916 | Beene |
| 2,085,115 | A | 6/1937 | Moineau |

(Continued)

FOREIGN PATENT DOCUMENTS

| | | |
|---|---|---|
| CA | 2775524 | 10/2013 |
| EP | 0564500 | 10/1993 |

(Continued)

OTHER PUBLICATIONS

"Cobra Frac@ H Service Enables High-Intensity Multistage Fracturing and Post-Frac Analysis," Halliburton, Oct. 2009, 2 pages.

(Continued)

*Primary Examiner* — James G Sayre
(74) *Attorney, Agent, or Firm* — Sheridan Ross P.C.

(57) ABSTRACT

A system and method of harvesting geothermal energy in a subterranean formation includes providing an injection wellbore that extends into the subterranean formation, positioning a plurality of selectively opening sleeves in the injection wellbore spaced apart the subterranean formation, providing at least one producing wellbore that extends into the subterranean formation in a predetermined location proximate to the injection wellbore, and fracturing the subterranean formation in a plurality of locations proximate to the plurality of selectively opening sleeves to enhance a fluid pathway between the injection wellbore and the at least one producing wellbore. Fluid is injected down the injection wellbore at a first temperature, and the fluid is produced from the at least one producing wellbore at a second temperature higher than said first temperature.

20 Claims, 20 Drawing Sheets

(56) References Cited

U.S. PATENT DOCUMENTS

| | | |
|---|---|---|
| 2,742,259 A | 4/1956 | Boucher |
| 2,871,946 A | 2/1959 | Bigelow |
| 3,211,232 A | 10/1965 | Grimmer |
| 3,405,772 A | 10/1968 | Wisenbaker et al. |
| 3,670,566 A | 6/1972 | Basham et al. |
| 3,753,628 A | 8/1973 | Becker |
| 3,827,512 A | 8/1974 | Edmond |
| 3,862,359 A | 1/1975 | McCullough et al. |
| 3,876,255 A | 4/1975 | Ilon |
| 3,890,905 A | 6/1975 | Clavin |
| 3,926,267 A | 12/1975 | Svirschevsky et al. |
| 3,932,072 A | 1/1976 | Clark |
| 3,955,634 A | 5/1976 | Slator et al. |
| 4,031,750 A | 6/1977 | Youmans et al. |
| 4,033,640 A | 7/1977 | Garcia |
| 4,050,384 A | 9/1977 | Chapman |
| 4,071,086 A | 1/1978 | Bennett |
| 4,095,655 A | 6/1978 | Still |
| 4,099,563 A | 7/1978 | Hutchison et al. |
| 4,112,850 A | 9/1978 | Sigel-Gfeller |
| 4,141,414 A | 2/1979 | Johansson |
| 4,177,734 A | 12/1979 | Rhoden |
| 4,190,300 A | 2/1980 | Scalzi |
| 4,192,380 A | 3/1980 | Smith |
| 4,272,781 A | 6/1981 | Taguchi et al. |
| 4,292,988 A | 10/1981 | Montgomery |
| 4,369,713 A | 1/1983 | Richardson |
| 4,372,161 A | 2/1983 | de Buda et al. |
| 4,437,522 A | 3/1984 | Krause, Jr. et al. |
| 4,460,920 A | 7/1984 | Weber et al. |
| 4,463,814 A | 8/1984 | Horstmeyer et al. |
| 4,469,174 A | 9/1984 | Freeman |
| 4,510,994 A | 4/1985 | Pringle |
| 4,537,136 A | 8/1985 | Douglas |
| 4,614,232 A | 9/1986 | Jurgens et al. |
| 4,670,862 A | 6/1987 | Staron et al. |
| 4,676,310 A | 6/1987 | Scherbatskoy et al. |
| 4,686,653 A | 8/1987 | Staron et al. |
| 4,711,305 A | 12/1987 | Ringgenberg |
| 4,718,824 A | 1/1988 | Cholet et al. |
| 4,729,432 A | 3/1988 | Helms |
| 4,797,075 A | 1/1989 | Edwards et al. |
| 4,823,882 A | 4/1989 | Stokley et al. |
| 4,828,037 A | 5/1989 | Lindsey et al. |
| 4,838,170 A | 6/1989 | Illakowicz |
| 4,862,808 A | 9/1989 | Hedgcoxe et al. |
| 4,862,966 A | 9/1989 | Lindsey et al. |
| 4,893,678 A | 1/1990 | Stokley et al. |
| 4,919,223 A | 4/1990 | Egger et al. |
| 5,090,481 A | 2/1992 | Pleasants et al. |
| 5,135,059 A | 8/1992 | Turner et al. |
| 5,142,989 A | 9/1992 | Suzumori et al. |
| 5,146,992 A | 9/1992 | Baugh |
| 5,184,676 A | 2/1993 | Graham et al. |
| 5,244,044 A | 9/1993 | Henderson |
| 5,293,823 A | 3/1994 | Box |
| 5,309,844 A | 5/1994 | Zollinger |
| 5,375,530 A | 12/1994 | Zollinger et al. |
| 5,375,668 A | 12/1994 | Hallundbaek |
| 5,391,059 A | 2/1995 | Hallundbaek |
| 5,392,862 A | 2/1995 | Swearingen |
| 5,649,603 A | 7/1997 | Simpson |
| 5,727,641 A | 3/1998 | Eddison et al. |
| 5,794,703 A | 8/1998 | Newman et al. |
| 5,803,178 A | 9/1998 | Cain |
| 5,954,131 A | 9/1999 | Sallwasser |
| 6,003,606 A | 12/1999 | Moore et al. |
| 6,019,583 A | 2/2000 | Wood |
| 6,068,642 A | 5/2000 | Johnson et al. |
| 6,089,323 A | 7/2000 | Newman et al. |
| 6,112,809 A | 9/2000 | Angle |
| 6,179,055 B1 | 1/2001 | Sallwasser et al. |
| 6,241,031 B1 | 6/2001 | Beaufort et al. |
| 6,273,189 B1 | 8/2001 | Gisler et al. |
| 6,290,004 B1 | 9/2001 | Evans |
| 6,345,669 B1 | 2/2002 | Buyers et al. |
| 6,357,523 B1 | 3/2002 | Zupanick |
| 6,394,184 B2 | 5/2002 | Tolman et al. |
| 6,431,270 B1 | 8/2002 | Angle |
| 6,460,616 B1 | 10/2002 | Simpson |
| 6,629,571 B1 | 10/2003 | Downie |
| 6,675,909 B1 | 1/2004 | Cowart et al. |
| 6,761,233 B1 | 7/2004 | Aadland |
| 6,966,368 B2 | 11/2005 | Farquhar |
| 7,159,668 B2 | 1/2007 | Herrera |
| 7,225,887 B2 | 6/2007 | Kriesels |
| 7,267,172 B2 | 9/2007 | Hofman |
| 7,287,596 B2 | 10/2007 | Frazier et al. |
| 7,322,417 B2 | 1/2008 | Rytlewski et al. |
| 7,325,616 B2 | 2/2008 | Lopez de Cardenas et al. |
| 7,373,974 B2 | 5/2008 | Connell et al. |
| 7,377,321 B2 | 5/2008 | Rytlewski |
| 7,387,165 B2 | 6/2008 | Lopez de Cardenas et al. |
| 7,798,229 B2 | 9/2010 | Vick, Jr. et al. |
| 7,849,927 B2 | 12/2010 | Herrera |
| 7,891,442 B2 | 2/2011 | Orban |
| 7,926,571 B2 | 4/2011 | Hofman |
| 8,167,059 B2 | 5/2012 | Oldham et al. |
| 8,177,001 B2 | 5/2012 | McClain et al. |
| 8,770,303 B2 | 7/2014 | Aguirre et al. |
| 8,794,331 B2 | 8/2014 | Getzlaf et al. |
| 8,807,245 B2 | 8/2014 | Scott et al. |
| 8,991,505 B2 | 3/2015 | Fleckenstein et al. |
| 9,045,942 B2 | 6/2015 | Gillis |
| 9,133,673 B2 | 9/2015 | Hill et al. |
| 9,500,058 B2 | 11/2016 | Tunc et al. |
| 9,562,419 B2 | 2/2017 | Fleckenstein et al. |
| 9,759,062 B2 | 9/2017 | Deffenbaugh et al. |
| 10,119,333 B2 | 11/2018 | Bullin |
| 10,927,625 B2 | 2/2021 | Fleckenstein et al. |
| 2003/0024710 A1 | 2/2003 | Post et al. |
| 2003/0070841 A1 | 4/2003 | Merecka et al. |
| 2007/0272411 A1 | 11/2007 | Lopez de Cardenas et al. |
| 2007/0272413 A1 | 11/2007 | Rytlewski et al. |
| 2008/0073077 A1 | 3/2008 | Tunc et al. |
| 2009/0056934 A1 | 3/2009 | Xu |
| 2009/0065194 A1 | 3/2009 | Frazier |
| 2009/0084553 A1 | 4/2009 | Rytlewski et al. |
| 2009/0236101 A1 | 9/2009 | Nelson et al. |
| 2010/0294510 A1 | 11/2010 | Holmes |
| 2011/0056692 A1 | 3/2011 | Lopez de Cardenas et al. |
| 2011/0073321 A1 | 3/2011 | Fay et al. |
| 2011/0132621 A1 | 6/2011 | Agrawal et al. |
| 2011/0284232 A1 | 11/2011 | Huang |
| 2012/0061088 A1 | 3/2012 | Dykstra et al. |
| 2012/0090807 A1* | 4/2012 | Stewart ............... F24T 10/40 165/45 |
| 2012/0145397 A1* | 6/2012 | Schultz ............... F24T 10/20 166/57 |
| 2012/0168176 A1 | 7/2012 | Aguirre et al. |
| 2013/0081807 A1 | 4/2013 | Dyer et al. |
| 2013/0319769 A1 | 12/2013 | Scott |
| 2013/0333891 A1* | 12/2013 | Fripp ................. E21B 43/26 166/302 |
| 2015/0122453 A1* | 5/2015 | Colwell ............... F24T 10/20 165/45 |
| 2015/0159462 A1 | 6/2015 | Cutler |
| 2015/0300327 A1 | 10/2015 | Sweatman et al. |
| 2016/0177637 A1 | 6/2016 | Fleckenstein et al. |
| 2017/0254171 A1* | 9/2017 | Cleven ............... E21B 33/124 |
| 2017/0321934 A1* | 11/2017 | Krüger ............... E21B 33/127 |
| 2018/0080905 A1 | 3/2018 | Al Nahwi et al. |
| 2018/0363439 A1 | 12/2018 | Fehr et al. |
| 2020/0217181 A1 | 7/2020 | Norbeck et al. |
| 2020/0362693 A1* | 11/2020 | Ahmadian-Tehrani ............... E21B 43/14 |
| 2021/0003320 A1 | 1/2021 | Toews et al. |
| 2021/0278106 A1* | 9/2021 | O'Malley ............... E21B 47/06 |

FOREIGN PATENT DOCUMENTS

| | | |
|---|---|---|
| GB | 890144 | 2/1965 |
| GB | 2520752 | 6/2015 |

(56) References Cited

FOREIGN PATENT DOCUMENTS

| | | |
|---|---|---|
| WO | WO 92/10677 | 6/1992 |
| WO | WO 95/21987 | 8/1995 |
| WO | WO 98/06927 | 2/1998 |
| WO | WO 00/57100 | 9/2000 |
| WO | WO 00/73619 | 12/2000 |
| WO | WO 01/18351 | 3/2001 |
| WO | WO 03/78887 | 9/2003 |
| WO | WO 2011/146866 | 11/2011 |
| WO | WO 2013/156781 | 10/2013 |
| WO | WO-2013169242 A1 * 11/2013 ............. E21B 43/25 |
| WO | WO 2014/100262 | 6/2014 |
| WO | WO 2017/029606 | 2/2017 |
| WO | WO 2017/029613 | 2/2017 |
| WO | WO 2017/029614 | 2/2017 |
| WO | WO 2017/029621 | 2/2017 |
| WO | WO 2017/029622 | 2/2017 |
| WO | WO-2022241567 A1 * 11/2022 |

OTHER PUBLICATIONS

"Conductor Pipe_PGL00003 webshot," as late as Jun. 18, 2010, retrieved from http://www.glossary.oilfield.slb.com/files/OGL00003.gif, 1 page.

"Cook Inlet Wellbore Schematic," Figure 5.2, Final Finding of the Director Cook Inlet Areawide 1999 Oil and Gas Lease Sale Jan. 20, 1999, Chapter 5, p. 5-42, Oct. 17, 1999, available at http://dog.dnr.alaska.gov/Publications/CookInlet.htm.

"Delta Stim® Initiator Valve," Halliburton, 2010, 4 pages.

"Delta Stim® Lite Sleeve," Halliburton, 2009, 2 pages.

"Delta Stim® Plus 20 Completion Service," Halliburton, 2010, 4 pages.

"Excape Completion Process," Expro Int'l Group Ltd., 2010, retrieved http://exprogroup.com/products-services/well-testing-commissioning/well-test/excape/, 1 page.

"Excape$^{SM}$ Completion Process: Your Fastest Path to Profit," BJ Services, The Expro Group & Marathon Oil Co., 2004, 5 pages.

"Extending the Productive Life of Mature Assets," Halliburton, 2007, pp. 1-48.

"FORGE 58-32 Injection and Packer Performance—Apr. 2019," OpenEI, Apr. 2019, retrieved from https://gdr.openei.org/files/1210/FORGE%2058-32%20packer%20failure%20summary.pdf, 3 pages.

"GTI Hydraulic Downhole Tractor," Global Technology & Innovation Limited, 2018, retrieved from http://www.gtitools.co.uk/gti-hydraulic-downhole-tractor/, 3 pages.

"Horizontal Well Stimulation," Williston Basin Petroleum Conference, Halliburton, May 1, 2007, 24 pages.

"Improving the economics of geothermal development through an oil and gas industry approach," Schlumberger Business Consulting, Date Unknown, retrieved Nov. 2, 2022 from https://www.smu.edu/-/media/Site/Dedman/Academics/Programs/Geothermal-Lab/Documents/Oil-and-Gas-Publications/Schlumberger_Improving_the_Economics_of_Geothermal_Development.pdf, 10 pages.

"Magnum Stimulation Valve" product brochure, Magnum Oil Tools Int'l, Corpus Christi, TX, Dec. 2, 2009, 1 page.

"New Methods Boost Multistage Fracturing in Horizontals," J. Petroleum Technology, vol. 59, No. 7, Jul. 2007, 3 pages.

"OptiFrac™ SJ Multizone Fracturing Process," BJ Services, Aug. 2009, 2 pages.

"Packers Plus® StageFRACT" brochure, Oct. 1, 2009, 2 pages.

"Production Services Tractor System," Schlumberger, Dec. 2003, 8 pages.

"Pump Jack," Wikipedia, Aug. 3, 2008, retrieved http://en.wikipedia.org/wiki/File:Pump_Jack_labelled.png. 1 page.

"QuickFRAC Batch Fracturing System Overview" Packers Plus Energy Services, Mar. 22, 2011, http://www.packersplus.com/products/quickfrac.php, 1 page.

"QuickFRAC" brochure, Packers Plus Energy Services, Mar. 22, 2011, retrieved from http://www.packersplus.com/products/quickfrac.php, 4 pages.

"RapidFrac System," Halliburton, Jul. 26, 2011, retrieved from http://www.halliburton.com/ps/default.aspx?pageid=5313&prodid=PRN::LK0BSD15, 6 pages.

"RapidFrac™ System For Use with Multi-Point Completions and Sub-Inteval Fracturing," Halliburton, Aug. 5, 2011, 3 pages.

"RepeaterPORT Sleeve" Overview, Packers Plus Energy Services, Aug. 19, 2011, retrieved from http://packersplus.com/products/repeaterport.php, 1 page.

"RepeaterPORT" brochure, Packers Plus Energy Services, Aug. 3, 2011, retrieved from http://packersplus.com/products/repeaterport.php, 2 pages.

"RepeaterPort" Case Study, Packers Plus Energy Services, Aug. 3, 2011, retrieved from http://packersplus.com/products/repeaterport.php, 1 page.

"StackFRAC HD: High Density Multi-Stage Fracturing System Overview," Packers Plus Energy Services, Feb. 9, 2011, retrieved from http://www.packersplus.com/products/stackfrac.php, 6 pages.

"StageFRAC," Schlumberg, 2007, 2 pages.

Arispe, M. et al., "Utilizing Modern Frac Baffles Improves Completion Efficiencies," Society of Petroleum Engineers Inc., Texas, USA, SPE 116232, Sep. 21-24, 2008, 13 pages.

Billingham et al., "Conveyance—Down and Out in the Oil Field," Oilfield Review, vol. 23, No. 2, Summer 2011, pp. 18-31.

Bozeman et al., "Cemented Ball-Activated Sliding Sleeves Improve Well Economics and Efficiency," Society of Petroleum Engineers Annual Technical Conference and Exhibition, New Orleans, Louisiana, Oct. 2009, 5 pages. Abstract only.

Bracken, L., "How to Destroy the Earth's Fresh Water Supplies Without Anyone Finding Out," 2007-2009, retrieved from http://www.journeyoftheforsaken.com/fracpage.htm, 30 pages.

Breede et al., "A systematic review of enhanced (or engineered) geothermal systems: past, present and future," Geothermal Energy, vol. 1, No. 4, 2013, 27 pages.

Cipolla et al., "Observation Lateral Project: Direct Measurement of Far-Field Drainage," Society of Petroleum Engineers Hydraulic Fracturing Technology Conference and Exhibition, The Woodlands, Texas, Feb. 1, 2022, 30 pages.

Cohcran et al., "Induced Earthquake Families Reveal Distinctive Evolutionary Patterns Near Disposal Wells," Journal of Geophysical Research: Solid Earth, vol. 123, Sep. 28, 2018, pp. 8045-8055.

Dipippo, "Chapter 14: Combined and hybrid geothermal power systems," in Geothermal Power Generation (ed. DiPippo), 2016, pp. 391-420.

Esquivel et al., "Optimizing the Development of the Haynesville Shale—Lessons-Larned from Well-to-Well Hydraulic Fracture Interference," Unconventional Resources Technology Conference, Austin, TX, Jul. 24, 2017, 22 pages.

Eustes et al., "Application of Horizontal Well Completion Techniques to Enhanced Geothermal Systems: Final Report—Oct. 2015-Sep. 2016," U.S. Dept. of Energy National Renewable Energy Laboratory, Subcontract Report NREL/SR-6A20-71201, Aug. 2018, 65 pages.

Fleckenstein et al., "Development of Multi-Stage Fracturing System and Wellbore Tractor to Enable Zonal Isolation During Stimulation and EGS Operations in Horizontal Wellbores," GRC Transactions, vol. 45, 2021, pp. 767-790.

Fleckenstein et al., "Novel Wireline Coring System," SPE Annual Technical Conference and Exhibition, Oct. 5-8, 2003, 7 pages.

Fleckenstein et al., "System To Enable Multi-stage Stimulation And Enhanced Geothermal System Operations In Parallel Horizontal Wellbores," Society of Petroleum Engineers Annual Technical Conference and Exhibition, Houston, Texas, Oct. 3, 2022, 27 pages.

Freudenrich, "How Oil Drilling Works," printed on Jun. 18, 2010, retrieved from http://science.howstuffworks.com/oil-drilling4.htm, 3 pages.

Gradl, "Review of Recent Unconventional Completion Innovations and their Applicability to EGS Wells," Proceedings of the 43rd Workshop on Geothermal Reservoir Engineering, Stanford University, Stanford, CA, Feb. 12, 2018, 8 pages.

Granberg, A., "Hydraulic Fracturing," 2010, retrieved from http://oecotextiles.files.wordpress.com/2010/02/hydraulic-fracturing.jpg, 1 page.

(56) References Cited

OTHER PUBLICATIONS

Guinot et al., "Can Unconventional Completion Systems Revolutionise EGS? A Critical Technology Review," Society of Petroleum Engineers Europec, 81st EAGE Conference and Exhibition, London, England, Jun. 3, 2019, 13 pages.
Haustveit et al., "Monitoring the Pulse of a Well Through Sealed Wellbore Pressure Monitoring, a Breakthrough Diagnostic With a Multi-Basin Case Study," Society of Petroleum Engineers Hydraulic Fracturing Technology Conference and Exhibition, The Woodlands, Texas, Feb. 2020, 6 pages. Abstract only.
Hejl, K.A. et al., "Extreme Multistage Fracturing Improves Vertical Coverage and Well Performance in the Lost Hills Field," SPE 101840, Society of Petroleum Engineers Inc., Texas, USA, Sep. 24-27, 2006, 9 pages.
Henry, "Newsbase: Deep and Meaningful," InnovOil, vol. 10, May 2013, pp. 4-5.
Hoffman et al., "Improved Oil Recovery IOR Pilot Projects in the Bakken Formation," Society of Petroleum Engeineers Low Perm Symposium, Denver, Colorado, May 2016, 5 pages.
Jin et al., "Utilization of Produced Gas for Improved Oil Recovery and Reduced Emissions from the Bakken Formation," Society of Petroleum Engineers Health, Safety, Security, Environment, & Social Responsibility Conference—North America, New Orleans, Louisiana, Apr. 2017, 6 pages. Abstract only.
Kerr et al., "Multi-Pronged Diagnostics with Modeling to Improve Development Decisions—An Operator Case Study," Society of Petroleum Engieners Hydraulic Fracturing Technology Conference and Exhibition, The Woodlands, Texas, Feb. 1, 2022, 20 pages.
King et al., "Frac Hit Induced Production Losses: Evaluating Root Causes, Damage Location, Possible Prevention Methods and Success of Remedial Treatments," Society of Petroleum Engineers Annual Technical Conference and Exhibition, San Antonio, Texas, Oct. 9, 2017, 44 pages.
Kuuskraa et al., "The Next Phase of the "Shale Oil Revolution": Storing CO2 with Shale EOR," Advanced Resources Inc, Arlington, VA, Sep. 23, 2020, 28 pages.
Lee et al., "Final Report of the Korean Government Commission on Relations between the 2017 Pohang Earthquake and EGS Project" The Geological Society of Korea, Apr. 2019, 457 pages.
Lonnes et al., "Advanced Multizone Stimulation Technology," Society of Petroleum Engineers Inc., Texas, USA, Oct. 9-12, 2005, pp. 1-7.
MacDonald et al., "Dynamic Flow Behavior in Shales Described via Digital Rock Modeling Provides Insight into Gas Injection," Unconventional Resources Technology Conference, Austin, Texas, Jul. 2017, 1 page. Abstract only.
Morad et al., "Modeling Frac-hits Using Dynamic Microseismicity-Constrained Enhanced Fracture Regions," Unconventional Resources Technology Conference, Denver, Colorado, Jul. 2019, 1 page. Abstract only.
Olasolo et al., "Enhanced geothermal systems (EGS): A review," Renewable and Sustainable Energy Reviews, vol. 56, Dec. 9, 2015, pp. 133-144.
Olson et al., "Design Considerations for Applying Multi-Zonal Isolation Techniques in Horizontal Wells in a Geothermal Setting," Proceedings of the Fortieth Workshop on Geothermal Reservoir Engineering, Stanford University, Stanford, CA, Jan. 26, 2015, 5 pages.
Phi et al., "CO2 EOR Simulation in Unconventional Liquid Reservoirs: An Eagle Ford Case Study," Thesis Submitted to the Office of Graduate and Professional Studies of Texas A&M University in partial fulfillment of the requirements for the degree of Master of Science, Aug. 2016, 100 pages.

Rytlewski et al., "A study of Fracture Initiation Pressures in Cemented Cased-Hole Wells Without Perforations," Society of Petroleum Engineers Gas Technology Symposium, Calgary, Alberta, May 15, 2006, 10 pages.
Sardinha et al., "Determining Interwell Connectivity and Reservoir Complexity Through Frac Pressure Hits and Production Interference Analysis," SPE/CSUR Unconventional Resources Conference, Calgary, Alberta, Sep. 30, 2014, 15 pages.
Sheiretov, "Wireline Tractors and Mechanical Services Tools: Comparative Study of Technical Solutions," SPE/ICoTA Coiled Tubing and Well Intervention Conference and Exhibition, Mar. 22-23, 2016, abstract only.
Sinha et al., "Impact of Solvent Extraction on Surface Area Measurements in Organic-Rich Shales using Nitrogen Adsorption," Unconventional Resources Technology Conference, Austin, Texas, Jul. 2017, 21 pages.
Skoumal et al., "Earthquakes Induced by Hydraulic Fracturing Are Pervasive in Oklahoma," Journal of Geophysical Research: Solid Earth, vol. 123, Dec. 27, 2018, pp. 10918-10935.
Stegent et al., "Comparison of Frac Valves vs. Plug-and-Perf Completion in the Oil Segment of the Eagle Ford Shale: A Case Study," Canadian Unconventional Resources Conference, Calgary, Alberta, Nov. 2011, 5 pages. Abstract only.
Wang et al., "Effect of Stress Shadow Caused by Multistage Fracturing from Multiple Well Pads on Fracture Initiation and Near-Wellbore Propagation from Infill Wells," Society of Petroleum Engineers Journal, Feb. 2022, pp. 204-225.
Warpinski et al., "Altered-Stress Fracturing," Journal of Petroleum Technology, vol. 41, No. 9, Sep. 1989, pp. 990-997. Abstract only.
Webb et al., "Field Trial Results of Ball-Activated Outflow Control Devices for SAGD," Society of Petroleum Engineers Annual Technical Conference and Exhibition, Calgary, Alberta, Sep. 30, 2019, 11 pages.
International Search Report and Written Opinion for International (PCT) Patent Application No. PCT/US2022/041733, dated Dec. 7, 2022, 9 pages.
Bozeman et al., "Cemented Ball-Activated Sliding Sleeves Improve Well Economics and Efficiency," Society of Petroleum Engineers Annual Technical Conference and Exhibition, New Orleans, Louisiana, Oct. 2009, 10 pages.
Haustveit et al., "Monitoring the Pulse of a Well Through Sealed Wellbore Pressure Monitoring, a Breakthrough Diagnostic With a Multi-Basin Case Study," Society of Petroleum Engineers Hydraulic Fracturing Technology Conference and Exhibition, The Woodlands, Texas, Feb. 2020, 42 pages.
Jin et al., "Utilization of Produced Gas for Improved Oil Recovery and Reduced Emissions from the Bakken Formation," Society of Petroleum Engineers Health, Safety, Security, Environment, & Social Responsibility Conference—North America, New Orleans, Louisiana, Apr. 2017, 12 pages.
MacDonald et al., "Dynamic Flow Behavior in Shales Described via Digital Rock Modeling Provides Insight into Gas Injection," Unconventional Resources Technology Conference, Austin, Texas, Jul. 2017, 11 pages.
Moradi et al., "Modeling Frac-hits Using Dynamic Microseismicity-Constrained Enhanced Fracture Regions," Unconventional Resources Technology Conference, Denver, Colorado, Jul. 2019, 26 pages.
Stegent et al., "Comparison of Frac Valves vs. Plug-and-Perf Completion in the Oil Segment of the Eagle Ford Shale: A Case Study," Canadian Unconventional Resources Conference, Calgary, Alberta, Nov. 2011, 13 pages.
Todd et al., "Improved Oil Recovery IOR Pilot Projects in the Bakken Formation," Society of Petroleum Engineers Low Perm Symposium, Denver, Colorado, May 2016, 22 pages.
Warpinski et al., "Altered-Stress Fracturing," Journal of Petroleum Technology, vol. 41, No. 9, Sep. 1989, pp. 990-997.

* cited by examiner

SYSTEM AND METHOD FOR HARVESTING GEOTHERMAL ENERGY FROM A SUBTERRANEAN FORMATION

CROSS REFERENCE TO RELATED APPLICATIONS

This application claims priority to U.S. Provisional Application No. 63/237,425, filed on Aug. 26, 2021, and entitled "SYSTEM AND METHOD FOR HARVESTING GEOTHERMAL ENERGY FROM A SUBTERRANEAN FORMATION", and to U.S. Provisional Application No. 63/400,687, filed on Aug. 24, 2022, and entitled "SYSTEM AND METHOD FOR HARVESTING GEOTHERMAL ENERGY FROM A SUBTERRANEAN FORMATION," the entireties of which are each hereby incorporated by reference.

FIELD OF THE INVENTION

Embodiments of the present invention are generally related to a system and method for harvesting geothermal energy from a subterranean formation and, in particular, to a system and method for harvesting geothermal energy from a subterranean formation and generating electricity with the harvested geothermal energy.

BACKGROUND OF THE INVENTION

Enhanced Geothermal Systems (EGS) include systems that inject water into vertical and horizontal wells or wellbores, where the water travels through a reservoir following fracturing and harvests heat from the hot rock to generate hot water which is produced to the surface. Fracturing in vertical and horizontal wells has historical bases in the oil and gas industry. Two primary methods of oil well multi-stage fracturing include plugging and perforation (or "Plug and Perf") and using fracture or frac sleeves.

Plugging and perforation techniques include packing and firing explosives (e.g., gun powder for bullet perforating, or more complex explosives in shaped charges) at select depths within the wellbores to perforate the casing of the wellbores. The primary limitations which prevent the use of "plug and perforation" for EGS include the use of composite plugs, and the high temperatures which lead to high stresses and material/electronics failure while limiting conventional stimulation efforts.

Composite bridge plugs are limited by the impact of temperature on materials and by the need for the plugs to be removed by drilling after the multi-stage fracturing process. Drilling plugs out in large diameter wellbores is difficult and expensive due to the possibility of small diameter coiled tubing buckling as it supplies weight on bit (WOB) to drill out the plugs, leading to the lock up of the coiled tubing before the entire horizontal length of the lateral can be cleaned out.

Conventional stimulation packers also have several inherent limitations for EGS applications. Conventional stimulation packers have a variety of leak paths in the presence of severe thermal stresses that result from high temperature which need to be sealed with elastomers. In addition, conventional stimulation packers must grip the wellbore, seal the wellbore, and maintain the seal throughout the stimulation of the formation while enduring thermal stresses in a high-temperature environment. Further, conventional packers used for conformance control and tubing take up valuable space defined within the inner diameter of the wellbore, which requires the total diameter of the wellbore to be increased to maintain desired injection and production rates, or else flow rates are limited, and heat recovery potential is reduced. Further, the installation of tubing and conventional packers and the perforating through the casing is inherently expensive and slow, with the installation of smaller tubing in the cased wellbore between the packers also limiting the flow rates possible and/or causing the cost of the system to increase due to the needed increase in wellbore size.

Prior to modern multi-stage fracturing of horizontal oil wells, fracture stimulation of an entire horizontal oil well was performed in one pump stage using distributed diverters but with limited success. Similar single stage stimulation attempts were made for geothermal applications, which also had limited success, with early EGS completions relying upon either open hole or perforated completions to communicate with the formation.

As described in Bozeman et al. "Cemented Ball-Activated Sliding Sleeves Improve Well Economics and Efficiency," a Paper presented at the SPE Annual Technical Conference and Exhibition, New Orleans, Louisiana, October 2009, ("Bozeman") and in Stegent et al. (2011, January 1), Comparison of Frac Valves vs. Plug-and-Perf Completion in the Oil Segment of the Eagle Ford Shale: A Case Study, Society of Petroleum Engineers ("Stegent"), cemented sleeves have been used successfully in oil and gas well horizontal completions, with fractures being initiated through the cement without need for perforation.

In addition, as described by Moradi et al., Modeling frac-hits using dynamic micro-seismicity constrained enhanced fractured regions, 2019, URTEC, Denver, CO ("Moradi"), observations of micro-seismic event during multi-stage fracturing as well as rate transient analysis (RTA) have revealed long relatively planar induced frac systems with "frac hits" are common occurrences in offset laterals.

Further, as described in Haustveit et al., Monitoring the pulse of a well through sealed wellbore pressure monitoring, a breakthrough diagnostic with a multi-basin case study, Society of Petroleum Engineers, 2020 ("Haustveit"), similar long planar fracture systems have been observed with micro-seismicity in geothermal applications. A monitoring technology called Sealed Wellbore Pressure Monitoring (SWPM) uses frac hits to identify fracture arrivals at offset wells, providing positive measurement of the frac length and connection between the two wellbores. This technique has been used on at least 1,500 stages.

As described in Olson et al., "Design Considerations for Applying Multi-Zonal Isolation Techniques in Horizontal Wells in a Geothermal Setting", Fortieth Workshop on Geothermal Reservoir Engineering Proceedings, Jan. 26-28, 2015, Palo Alto, California, USA, to make an EGS system economical it is estimated 50,000-100,000 barrels per day (bpd) of heated fluid is necessary to generate 5 MWe (gross). This estimate, however, is dependent on the temperature of the resource rock and the heat exchange rates achieved. It is noted that 5 MWe (gross) and between 50,000-100,000 barrels per day (bpd) is a typical per-well generation capacity in the hydrothermal industry and represents a benchmark for an EGS project to approach being fiscally feasible.

Another benchmark for an economic EGS is the need for the well production to sustain the proposed rates with acceptable heat recovery for twenty to thirty years. To achieve the proposed rates over the well life, the volume of the reservoir may need to be considerably larger than used in currently known EGS projects. For example, the volume of the reservoir may be increased by using extended reach and horizontal wells to access more naturally occurring fracture systems or other porosity systems, or by creating more induced fracture networks between horizontal wells with multi-stage fracturing techniques. Horizontal well systems may provide the opportunity to hydraulically fracture numerous zones or stages, resulting in a reservoir that may support the proposed rates without sacrificing reservoir integrity. However, to prevent the fluid from short circuiting between the injection wells and producing wells, fluid flow and/or fluid pressure may need to be detected and modified to ensure that the heat is harvested from the entire volume of hot rock to maintain the proposed rates and temperature needed to for electrical generation. In addition, hot fluid may need to be added to the system (e.g., with a natural gas thermally heated system such as a binary power plant used in co-generation electrical generation plants, or the like) to provide sufficient additional heat and overcome the normal decline in heated water production.

As described in Webb et al., "Field Trial Results of Ball-Activated Outflow Control Devices for SAGD," a paper presented at the SPE Annual Technical Conference and Exhibition, Calgary, Alberta, Canada, September 2019, one example of horizontal well usage includes Steam Assisted Gravity Drainage (SAGD) for heavy oil production. For SAGD, twin horizontal wells are drilled at shallow depths in close proximity and hot steam is injected into one horizontal well. Heavy oil is recovered in the other horizontal well, having been displaced by the hot steam.

The injection of the steam may be controlled with the use of Outflow Control Devices (OCD) and/or shifted sleeves. For example, coiled tubing may be used to shift sleeves or OCDs for SAGD. The OCDs may utilize an Otis-B sliding sleeve or other sleeve with shifting profile, or may use a shifting tool that grips the sleeve without a profile to open or close the device. For instance, an Otis-B sliding sleeve or a shifting tool may run on coiled tubing past the OCD and its profile, and then may be pulled back through the OCD to engage the sleeve and slide it into the open position. It is noted that mechanical shifting tools require no activation prior to engaging the sliding sleeve profile, utilizing spring loaded keys that engage the profile and allow for force to be applied to the sliding sleeve. After the sleeve shifts to the open position, the keys on the shifting tool engage another profile, forcing the keys to retract inward and release from the profile inside the sleeve.

By way of another example, a hydraulically actuated shifting tool on coiled tubing may be used to shift sleeves by increasing pressure to extend the keys of the shifting tool. Once the sliding sleeve shift is complete, the keys of the shifting tool may be released in the same way as the mechanical tool or by bleeding off the differential pressure causing the keys to retract back into the shifting tool. Hydraulic shifting tools allow specific sliding sleeves to be shifted open by extending or relaxing the shifting keys, whereas a mechanical shifting tool will locate into any shifting profile it is run through. U.S. Pat. No. 8,794,331, issued Aug. 5, 2014, to Getzlaf et al. ("Getzlaf"), is directed to using coiled tubing to shift sleeves for fracturing, but this method is limited in horizontal well lengths in geothermal wells that require large casing diameters due to buckling of the coiled tubing and does not have a methodology to detect fluid flow and/or fluid pressure for conformance control, where conformance control is a technique to improve the uniform movement of a fluid within a formation toward a producing wellbore. In addition, the systems and methods described in Getzlaf are limited by the costs associated with the coiled tubing.

By way of another example, ball activated OCDs may use a ball seat to initially open the sliding sleeve and may maintain a sliding sleeve profile to close or re-open the OCD. The sliding sleeve may be positioned in the closed position, requiring a downhole action to open the sliding sleeve. To open the sliding sleeve, a specific sized dissolvable ball may be pumped to the OCD. Once the ball lands on the ball seat, pressure may be applied which causes pins to shear and the sliding sleeve to shift. Further pressure may be applied causing the seat to retract, and the ball may pass though before dissolving and leaving a full inner diameter through the device. The shear force required to shift the sliding sleeve may be determined by the number of shear pins installed, which indicates the differential pressure required to shift open the seat. Once the sliding sleeve is shifted, additional fluid may be pumped to clear the tubing of the dissolvable ball. As described in Rytlewski et al., (2006, January 1), "A Study of Fracture Initiation Pressures in Cemented Cased-Hole Wells Without Perforations," Society of Petroleum Engineers http://www.stagecompletions-.com/wp-content/uploads/2017/10/SC-Permian-Press-Release.pdf ("Stage Completions"), a tool made by Stage Completions uses a unique collet for each sleeve to determine pressure spike to track progress in a wellbore.

As described in Olasolo et al., (2016) "Enhanced geothermal systems (EGS): A review," Renewable and Sustainable Energy Reviews. 56. 133-144. 10.1016/j.rser.2015.11.031 ("Olasolo"), attempts to produce a deep, full-scale EGS reservoir demonstrated that heat could be extracted at reasonable rates from a hydraulically stimulated region of hot crystalline rock with low-permeability. In addition, Eustes et al, "Application of horizontal well completion techniques to enhanced geothermal systems: Final Report," October 2015-September 2016, Golden, CO: National Renewable Energy Laboratory. NREL/SR-6A20-71201, 2018 ("Eustes") describes methods of multi-stage fracturing of horizontal wells in the unconventional oil and gas industry that could be used for Geothermal completions. Further, Gradl, et al. "Review of Recent Unconventional Completion Innovations and their Applicability to EGS Wells." (2018). PROCEEDINGS, 43rd Workshop on Geothermal Reservoir Engineering Stanford University, Stanford, California, Feb. 12-14, 2018, SGP-TR-213 ("Gradl") describes previous attempts to use shale development techniques in EGS.

Other attempts to develop EGS technology relying on perforated completions, with limited entry or other methodologies, are described in U.S. Patent Publication No. US 2020/0217181A1 to Norbeck et al. ("Norbeck"), which may have failed due to the inability to access enough heated rock with the injected water. It is noted that the inability to access enough heated rock typically may be caused by water short-circuiting between the injector and the producer, resulting in water produced that is not hot enough for a power plant. In addition, selected attempts such as those described by Norbeck are undergoing testing in Utah at the DOE FORGE site. Many of the experimental EGS attempts fail as reported in FORGE 58-32 Injection and Packer Performance—April 2019 FORGE 58-32 packer failure summary.pdf (openei.org) ("FORGE").

Attempts to develop EGS technology have also been limited, however, by the possibility of induced seismicity. Earthquakes induced by hydraulic fracturing have been separately recorded in the United States, Switzerland, and Korea. Long planar fracture systems and induced fractures can extend great distances both laterally and vertically, and are detectable with tiltmeters, microseismic methods, and direct detecting at offset wellbores. One attempt to use offset, cooperating wells is taught in U.S. Pat. No. 6,357,523 to Zupanick et al. In Zupanick, a vertical well directly intersected with a section of a horizontal wellbore. A gas such as nitrogen was pumped through the vertical well to assist in aerating returns through the horizontal well. The direct intersection was necessary due to the softness of the coal in which the wells were drilled. The cooperating wellbores of Zupanick teach away from the use of fractures between wellbores that are spaced a selected distance apart to drain pressure and fluid from the formation and reduce formation stresses that may increase the likelihood of induced seismicity.

SUMMARY OF THE INVENTION

Accordingly, there is needed a system and method for harvesting geothermal energy from a subterranean formation. The present invention improves Enhanced Geothermal System (EGS) well stimulation and operation technology to provide hot water for electricity generation by addressing two critical and long recognized problems specific to the needs for the construction and operation of a subsurface EGS heat exchanger. For example, the present invention provides a multi-stage stimulation technology that has the speed of current shale development technologies but does not have the limitations of current stimulation tools and methods. For instance, the present invention does not have the temperature limitations of downhole equipment used in conventional plug and perforation stimulation techniques, or the need for coiled tubing cleanouts. The present invention also requires much less cost to setup and operate. The present invention also provides effective conformance control of the injected and produced water. The systems and methods of conformance control described herein improve the uniform movement of a fluid within a formation toward a producing wellbore, solving a problem of fluid cycling between injection wellbores and production wellbore over limited volumes of the reservoir, to prevent the fluid bypassing most of the hot rock and leading to premature cooling of the produced water.

Aspects of the present invention include apparatuses and methods that use sleeves such as, but not limited to, cemented sleeves. Aspects of the present invention also include apparatuses and methods to operate and/or manipulate the position of sliding sleeves when creating and controlling the injection and production in a subsurface network of induced and natural fractures and/or a naturally existing matrix porosity to create a subsurface heat exchanger.

In one aspect of the present invention, the system and method promotes the development of multi-stage stimulation technology tools that do not have temperature limitations of conventional stimulation equipment for plug and perforation techniques (e.g., "plug-and-perf"). In another aspect, the system and method promotes the development of multi-stage stimulation conformance control to detect fluid flow and/or fluid pressure and open, close, or modify the sleeve position for injection rate distribution.

In another aspect of the present invention, a system and method for harvesting geothermal energy from a subterranean formation and generating electricity with the harvested geothermal energy is provided. The present invention provides a commercial pathway for large-scale, economically viable EGS by facilitating the development of economical, sustainable, reproducible, and scalable drilling and completion methods for long-reach, deviated, and horizontal geothermal wells to be used in the construction and operations of a subsurface heat exchanger. The present invention includes monitoring and controlling the subsurface heat exchanger and surface process equipment to optimize fluid flow, thermal efficiency, and/or temperature gain when harvesting heat from the subterranean formation. The present invention also includes maximizing casing sleeve inner diameter to allow for downhole tools to pass through the injection wellbore.

In one embodiment of the present invention, cemented sleeves are first used for multi-stage fracturing. The intersection of fractures induced by the fracturing with one or more open hole or "barefoot" producing wellbores are detected by pressure measurements in the producing wellbores. The sleeves are then manipulated to create and control the injection and/or production in a subsurface network of fractures, either induced or naturally-formed, and are further manipulated to control a naturally existing matrix porosity to create a subsurface heat exchanger. For example, the sleeves may be manipulated with tractors using flowmeters and devices to shift sleeves to control injection, simplifying the equipment needed and lowering the costs of the system.

In another embodiment of the present invention, unique casing sleeves are used as a system for rapid and inexpensive multi-stage stimulations, and then used to perform conformance control functions. The sleeves and/or tubular string within the casing may be cemented in place, and use a single-sized, large diameter ball to open the sleeves for fracture stimulation. In one non-limiting example, the ball is dissolvable. The ball may pass through sleeves from a heel of a well toward a toe of the well until a correct or desired sleeve is located and actuated. After stimulation, the balls may dissolve, be drilled up, be flowed back up, or be pushed into a rathole at the end of the injection wellbore, leaving the sleeves open for immediate fluid injection. For example, the diameter of the ball may be reduced based on one of time or a chemistry of the fluid pumped into the injection wellbores. A wellbore tractor (or other suitable downhole tool or device with a fluid survey capability to detect fluid injection or production and allow shifting, plugging, or choking of fluid movement through the sleeves) may then be deployed to detect and control the injection entry points to create an effective EGS through paired horizontal injectors and producers. The producers may be open hole. The horizontal wells may be connected through a system of multiple networks of induced and natural fractures that may be controlled by opening and closing sleeves throughout the field life.

It is noted that the cementing of the sleeves and/or tubular string may overcome the need to perforate the casing. In addition, not plugging the perforations either with injected diverters, inner tubing, or tubular strings with sliding sleeves and packers for conformance control may facilitate a much less expensive capital cost. The use of cemented sliding sleeves in the injection wellbore permit stimulations to produce fractures that are induced, which intersect the producer wellbore. The intersection of the fractures that are induced with the producer wellbore is detected by pressure signatures at the producer wellbore and/or by pressure signatures at the injection wellbore. In one embodiment, all conformance and workover operations may be inside the cooler injection wellbores, which are cooled by the large volume of injected water from the surface. The cooler injection wellbore may facilitate the use of electrical components within the injection wellbore, that may otherwise be limited by temperature.

In another embodiment of the present invention, the systems and methods described herein may be used in a variety of other subsurface applications that require control of stimulation fluids and injection fluids. For example, systems and methods of the present invention may be used for enhanced oil recovery (EOR) or any other application needing multi-stage stimulation to create multiple networks of induced and natural fractures. Injection into the fractures and production from the fractures are controlled by multiple sleeves positioned within a single wellbore and associated with the fractures. In one non-limiting example, The opening and closing of alternating sleeves (or alternating series of sleeves) facilitates the injection of fluids for EOR into the fractures for a period of time, similar to existing "huff and puff" treatments. Closing the open sleeves used for injection and then opening previously-closed sleeves for production prevents the injected fluid from returning through the same fractures, and instead facilities fluid within the fractures to flow back into the wellbore by way of the newly opened sleeves. This creates a more circuitous path for the fluids to travel, enhancing the EOR processes compared to just soaking the formation and producing through the same sleeves. In this regard, the present invention may be used to create EOR reservoir systems by utilizing horizontal fracking techniques for horizontal wellbore reservoirs in shale reservoirs, in addition to the described uses for harvesting geothermal energy.

Aspects of the present invention also include a dual horizontal well system for EGS development, for shale development, or any other subsurface development that uses multiple horizontal wells with hydraulic fracturing. For example, the present invention may be used in EGS and shale well stimulation technology to reduce stress in the formation during multi-stage stimulation operations that contributes to induced seismicity. By way of another example, the present invention may be used in EGS and shale well stimulation technology to facilitate the recycling of water used in previous frac stages. The recycled water can be used immediately on subsequent frac stages, instead of waiting for flow back of those stimulation fluids after the completion of the multi-stage stimulations.

The present invention uses fractures, either induced or natural, to facilitate the flow of fluid from a first wellbore and into a second wellbore for production to the surface. Due to the higher pressure in the fracture(s) (which results from the fracture walls attempting to close the fractures), the flow of fluid into the offset well will continue, even after the pumping of fluid from the surface into that fracture via the first wellbore has ceased and it is isolated from subsequent fracture stages by a barrier in the well (such as a ball in a frac sleeve, or a plug or plugs in a conventional "plug and perf" completion). The in-situ stress will attempt to close the fracture, expelling the fluid contained in the fracture out of the fracture and into the second wellbore. This provides a pressure relief to the system and will lower the stress in rock and fractures, which will in turn lower the pressure in the system and reduce the risk of the stresses causing induced seismicity. This will also allow a much faster flowback of injected stimulation fluids and may allow recycling of fluid during the stimulation, potentially lowering the total amount of water needed to stimulate the entire well.

Embodiments of the present disclosure include fractures within a formation that are in an earlier stage (e.g., closer to the toe of the injection wellbore), and are isolated by a ball engaging a sleeve in a later stage (e.g., closer to the surface or heel of the injection wellbore). The fractures in the earlier stage continue to produce fracturing fluid (or frac fluid, as described throughout the present disclosure) into the producing well after being isolated. It is noted that one, some, or all the earlier stages below the later, isolating stage are producing into the producing wellbore. The continued production into the producing wellbore bleeds the pressure down from the isolated fractures. The producing wellbore may be open-hole, may include open-hole packers, or may be cemented with production casing. The pressure bleed reduces the risk of induced seismicity potentially caused by EGS creation via stimulation. The pressure bleed also reduces the risk of poor production and/or injection alongside a potential uneconomical impact. It is understood this technique may be used regardless of the type of multi-stage stimulation, and can be used on wells using perf and plug and well as frac sleeves.

Embodiments of the present disclosure are directed to injecting fluid and recovering produced fluid through the same wellbore. Sleeves at a first subset of stages are opened for the injection of fluid into the formation, which are connected via a fracture network with a second subset of stages in which sleeves are closed. The sleeves at the first subset of stages are then closed, and the sleeves at the second subset of stages are opened. The pressure within the formation causes the injected fluid to exit the formation through the now-open second subset of sleeves. The fluid is subsequently produced via the same wellbore into which the fluid was previously injected within the formation which may be useful of EOR operation in oil and gas wells, where each stage or series of stages are used as the injector and producing points in an EOR flood.

In another aspect of the present invention, a method of harvesting geothermal energy in a subterranean formation may include, but is not limited to, providing an injection wellbore that extends into the subterranean formation. The method may include, but is not limited to, positioning a plurality of selectively opening sleeves in the injection wellbore spaced apart within the subterranean formation, where each of the plurality of selectively opening sleeves is actuatable between a respective open position and a respective closed position. In one non-limiting example, the selectively opening sleeves may be cemented in the wellbore. The method may include, but is not limited to, providing at least one producing wellbore that extends into the subterranean formation in a predetermined location proximate to the injection wellbore. The method may include, but is not limited to, fracturing the subterranean formation in a plurality of locations proximate to the plurality of selectively opening sleeves to enhance a fluid pathway between the injection wellbore and the at least one producing wellbore when the plurality of selectively opening sleeves are in the open position. The method may include, but is not limited to, injecting a fluid down the injection wellbore at a first temperature. The injected fluid harvests geothermal energy from the subterranean formation as it flows through the fluid pathway to the at least one producing wellbore. In one non-limiting example, the wellbore fluid may include, but is not limited to, water. The method may include, but is not limited to, producing a heated wellbore fluid from the at least one producing wellbore at a second temperature higher than the first temperature.

In some embodiments, the method may include, but is not limited to, monitoring a rate of fluid flow of the injected fluid through the plurality of selectively opening sleeves. The method may include, but is not limited to, selectively opening or closing at least one of the plurality of selectively opening sleeves to adjust fluid flow of the wellbore fluid between the injection wellbore and the at least one producing wellbore to optimize the thermal efficiency and temperature gain between the injected fluid and the heated wellbore fluid.

In some embodiments, the method may include, but is not limited to, monitoring at least one of a temperature or fluid pressure drop at different locations at one or more of the injection wellbore and the at least one producing wellbore to determine which of the plurality of selectively opening sleeves should be in the open position or the closed position to optimize fluid flow between the injection wellbore and the at least one producing wellbore.

In some embodiments, the method may include, but is not limited to, directing the injected fluid into fractures associated with the plurality of locations corresponding to at least one of the plurality of selectively opening sleeves. In some embodiments, at least one of the plurality of selectively opening sleeves is actuated from the closed position by pumping a ball down the injection wellbore into a catch assembly of the at least one of the plurality of selectively opening sleeves at a first fluid pressure. In some embodiments, the catch assembly is configured to pass the ball through the catch assembly of the at least one of the plurality of selectively opening sleeves when a second fluid pressure that is higher than the first fluid pressure is applied to the ball. The injected fluid is allowed to continue downhole in the injection wellbore after the ball passes through the catch assembly.

In some embodiments, a diameter of the ball is configured to decrease based on one or more of time or a chemistry of the injected fluid. After the ball diameter decreases by a predetermined amount, the ball can pass through the catch assembly located on the selectively openable sleeve. In some embodiments, at least one of the plurality of selectively opening sleeves is actuated between the open position and the closed position with a downhole tool selectively positioned with coiled tubing or a downhole tractor driven with electrical energy or hydraulic energy.

In some embodiments, the method may include, but is not limited to, measuring, via a control system including one or more sensors, an effectiveness of fluid flow through the subterranean formation. In some embodiments, the method may include, but is not limited to, adjusting the opening and closing of the plurality of selectively opening sleeves to optimize at least one of an amount of the fluid being injected into the injection wellbore, an amount of the wellbore fluid produced by the at lone one producing wellbore, and a temperature differential between the first temperature of the fluid injected into the injection wellbore and the second temperature of the heated wellbore fluid produced by the at least one producing wellbore.

In some embodiments, the control system further comprises a pressure monitoring system operable to determine a rate of fluid flow through one or more stages in the subterranean formation defined by fractures associated with the plurality of locations. The control system may then optimize the rate of fluid flow and the temperature of the heated wellbore fluid by selectively opening and/or closing at least one of the plurality of selectively opening sleeves. In some embodiments, the method may include, but is not limited to, opening or closing the plurality of selectively openable sleeves with a downhole tool driven by electrical energy or hydraulic energy.

In some embodiments, the method may include, but is not limited to, extracting energy from the heated wellbore fluid delivered from the at least one production wellbore at a surface location proximate to a wellhead of the at least one producing wellbore. In some embodiments, the fluid is injected down the injection wellbore at the first temperature by at least a first surface component at the surface location. The heated wellbore fluid is received or extracted from the at least one producing wellbore at the second temperature by at least a second surface component at the surface location. The energy is extracted from the heated wellbore fluid by the at least a second surface component.

In some embodiments, the fracturing further includes, but is not limited to, injecting a first amount of fracturing fluid through a first selectively opening sleeve of the plurality of selectively opening sleeves. The first selectively opening sleeve is at a first location. The first location is a first distance from a toe of the injection wellbore. In some embodiments, the fracturing further includes, but is not limited to, engaging a second selectively opening sleeve of the plurality of selectively opening sleeves. The second selectively opening sleeve is at a second location. The second location is a second distance from the toe of the injection wellbore. The second distance is greater than the first distance. Engaging the second selectively opening sleeve isolates the first selectively opening sleeve within the injection wellbore. In some embodiments, the fracturing further includes, but is not limited to, injecting a second amount of fracturing fluid at the second location that is the second distance from the toe of the injection wellbore. In some embodiments, the fracturing further includes, but is not limited to, producing the first amount of fracturing fluid via the at least one producing wellbore to reduce pressure in the subterranean formation while the second amount of fracturing fluid is being injected at the second location.

In another aspect of the present invention, a system of harvesting geothermal energy from a subterranean formation and generating electricity at a surface location includes an injection wellbore provided in the subterranean formation. The system includes a plurality of selectively opening sleeves positioned in the injection wellbore and spaced apart within the subterranean formation, where each of the plurality of selectively opening sleeves are actuatable between a respective open position and a respective closed position. The system includes at least one producing wellbore provided in the subterranean formation in a predetermined location proximate to the injection wellbore. The subterranean formation is fractured in a plurality of locations proximate to the plurality of selectively opening sleeves to enhance a fluid pathway between the injection wellbore and the at least one producing wellbore when the plurality of selectively opening sleeves are in the open position. In this manner, the at least one producing wellbore is configured to produce a heated wellbore fluid at a second temperature higher than a first temperature of an injected fluid previously injected into the injection wellbore.

In some embodiments, the system includes a control system to measure the effectiveness of fluid flow through the subterranean formation and adjust the opening and closing of a plurality of selectively opening sleeves to optimize at least one of an amount of the fluid being injected into the injection wellbore, the amount of the heated wellbore fluid produced by the at least one producing wellbore, and a temperature differential between the first temperature of the fluid injected into an injection wellbore and the second temperature of the heated wellbore fluid produced by at least one producing wellbore.

In some embodiments, the control system further comprises a pressure monitoring system that determines a rate of fluid flow through one or more stages in the subterranean formation. The control system is operable to adjust the rate of fluid flow through the plurality of selectively opening sleeves to optimize fluid flow and the harvesting of geothermal energy. Each of the stages is associated with a sleeve of the plurality of selectively opening sleeves.

In some embodiments, the plurality of selectively opening sleeves can be opened or closed with a downhole tool driven by electrical energy or hydraulic energy.

In some embodiments, the system is configured to extract energy from the heated wellbore fluid delivered from the at least one production wellbore at a surface location proximate to a wellhead of the at least one producing wellbore. The system includes at least a first surface component at the surface location configured to inject the fluid down the injection wellbore at the first temperature. The system includes at least a second surface component at the surface location configured to receive the heated wellbore fluid produced or extracted from the at least one producing wellbore at the second temperature and extract energy from the heated wellbore fluid. The energy is extracted from the heated wellbore fluid by the at least a second surface component.

In some embodiments, the plurality of selectively opening sleeves includes a first selectively opening sleeve and a second selectively opening sleeve of the plurality of selectively opening sleeves. The first selectively opening sleeve is at a first location which is a first distance from a toe of the injection wellbore. The second selectively opening sleeve is at a second location which is a second distance from the toe of the injection wellbore. The second distance is greater than the first distance. The first selectively opening sleeve has a first open position to permit a first amount of fracturing fluid to flow into a first fracture network associated with the first selectively opening sleeve. The second selectively opening sleeve is configured to be blocked to isolate the first selectively opening sleeve within the injection wellbore. The second selectively opening sleeve has a second open position to permit a second amount of fracturing fluid to flow into a second fracture network associated with the second selectively opening sleeve such that the at least one production wellbore is capable of producing the first amount of fracturing fluid to reduce pressure in the subterranean formation while the second amount of fracturing fluid is being pumped out of an opening of the second selectively opening sleeve and into the subterranean formation.

In another aspect of the present invention, a method of harvesting a fluid including oil or gas from a subterranean formation may include, but is not limited to, providing an injection wellbore that extends into the subterranean formation. The method may include, but is not limited to, positioning a plurality of selectively opening sleeves in the injection wellbore and spaced apart within the subterranean formation. Each of the plurality of selectively opening sleeves being actuatable between an open position and a closed position. The method may include, but is not limited to, fracturing the subterranean formation in a plurality of locations proximate to the plurality of selectively opening sleeves to define stages and enhance a fluid flow into the subterranean formation when the plurality of selectively opening sleeves are in the open position. The method may include, but is not limited to, injecting an enhanced recovery fluid down the injection wellbore through a first selectively opening sleeve of the plurality of selectively opening sleeves. The method may include, but is not limited to, closing the first selectively opening sleeve and opening at least a second selectively opening sleeve of the plurality of selectively opening sleeves. The method may include, but is not limited to, producing the fluid including oil or gas from the at least a second selectively opening sleeve.

In another aspect of the present invention, a system of harvesting a fluid including oil or gas from a subterranean formation and generating electricity from a surface location includes an injection wellbore drilled into the subterranean formation. The system includes a plurality of selectively opening sleeves positioned in the injection wellbore and spaced apart within the subterranean formation. The subterranean formation is stimulated in a plurality of locations proximate to the plurality of selectively opening sleeves to enhance a fluid pathway when the plurality of selectively opening sleeves are in the open position. A first selectively opening sleeve of the plurality of selectively opening sleeves has an open position to inject an enhanced recovery fluid into the subterranean formation and a closed position to prevent the injection of the enhanced recovery fluid into the subterranean formation. At least a second selectively opening sleeve of the plurality of selectively opening sleeves has an open position to produce the fluid including oil or gas from the subterranean formation and a closed position to prevent the production of the fluid including oil or gas from the subterranean formation.

The term "wellbore" and variations thereof, as used herein, refers to a hole drilled into the earth's surface to explore or extract natural materials including, but not limited to, water, gas, and oil. In addition, the term "casing" and variations thereof, as used herein, refers to large diameter pipe that is assembled and inserted into a wellbore and typically secured in place to the surrounding formation with cement. Further, the term "tubular string" and variations thereof, as used herein, refers to an assembled length of pipe, to include jointed pipe and integral tubular members such as coiled tubing, and which generally is positioned within the casing.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more clear from the Detailed Description, particularly when taken together with the drawings.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. The term "a" or "an" entity, as used herein, refers to one or more of that entity. As such, the terms "a" (or "an"), "one or more" and "at least one" can be used interchangeably herein.

Unless otherwise indicated, all numbers expressing quantities, dimensions, conditions, ratios, ranges, and so forth used in the specification and claims are to be understood as being modified in all instances by the term "about" or "approximately". Accordingly, unless otherwise indicated, all numbers expressing quantities, dimensions, conditions, ratios, angles, ranges, and so forth used in the specification and claims may be increased or decreased by approximately 5% to achieve satisfactory results. Additionally, where the meaning of the terms "about" or "approximately" as used herein would not otherwise be apparent to one of ordinary skill in the art, the terms "about" and "approximately" should be interpreted as meaning within plus or minus 10% of the stated value.

The term "parallel" means two objects are oriented at an angle within plus or minus 0° to 5° unless otherwise indicated. Similarly, the term "perpendicular" means two objects are oriented at angle of from 85° to 95° unless otherwise indicated. Unless otherwise indicated, the term "substantially" indicates a different of from 0% to 5% of the stated value is acceptable. All ranges described herein may be reduced to any sub-range or portion of the range, or to any value within the range without deviating from the present invention. For example, the range "5 to 55" includes, but is not limited to, the sub-ranges "5 to 20" as well as "17 to 54."

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

Unless otherwise stated, any embodiment described throughout the disclosure should be understood as being individually implementable and/or combinable with any other embodiment or embodiments described throughout the disclosure.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s).

Figure 1A:
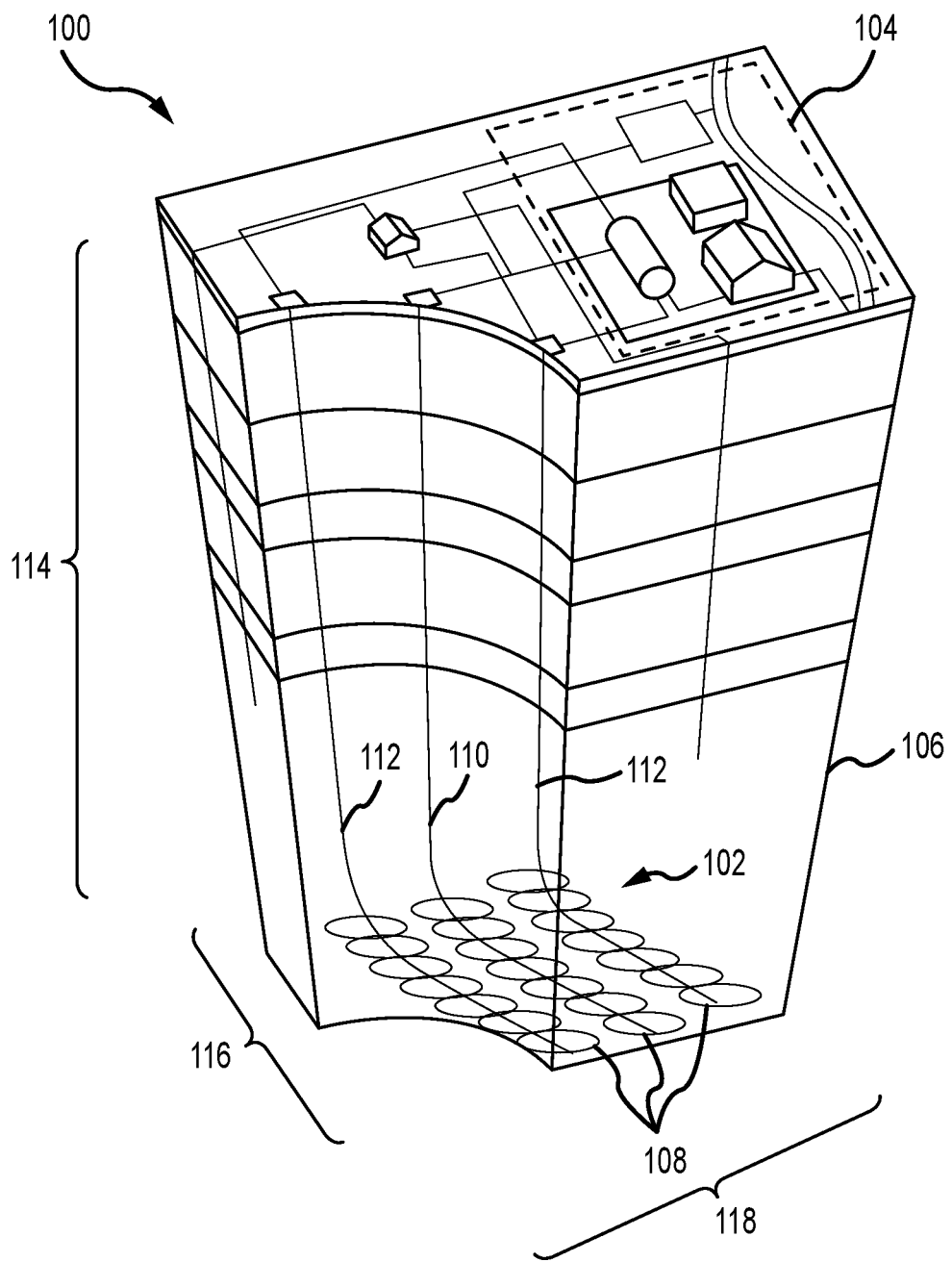
FIG. 1A depicts a perspective view of an Enhanced Geothermal System (EGS) including a subsurface heat exchanger in a subterranean formation and surface process equipment for injecting cool water down an injection wellbore and through fractures within the subterranean formation and producing water up a producing wellbore after the water is heated by harvesting heat from the fractures in the subterranean formation, in accordance with one or more embodiments of the present invention.

The drawings are not necessarily (but may be) to scale. In certain instances, details that are not necessary for an understanding of the disclosure or that render other details difficult to perceive may have been omitted. It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

The following is a listing of components according to various embodiments of the present disclosure, and as shown in the drawings:

| Number | Component |
|---|---|
| 100 | Enhanced Geothermal System (EGS) |
| 102 | Subsurface Heat Exchanger |
| 104 | Surface Process Equipment |
| 106 | Subterranean or Geologic Formation |
| 108 | Fractures |
| 110 | Injection (or Injecting) Wellbore |
| 112 | Producing (or Production) Wellbore |
| 114 | Vertical Wellbore Section |
| 116 | Horizontal Wellbore Section |
| 118 | Total Width |
| 200 | Casing String |
| 202 | Casing Sleeve |
| 204 | Injection Wellbore Borehole |
| 206 | Producing Wellbore Borehole |
| 300 | Packers |
| 400 | Fingers |
| 402 | Ball |
| 404 | Tubular |
| 406 | Opening |
| 408 | Hydraulic Oil Reservoir |
| 410 | Piston Member |
| 412 | Biasing element |
| 414 | Trigger |
| 416 | Profile |
| 500 | Stage |
| 502 | Stimulation Fluid |
| 600 | Heat Transfer |
| 602 | Injected Fluid |
| 603 | Fluid Undergoing Heating |
| 604 | Produced Fluid |
| 606 | Pressure Gauge |

-continued

| Number | Component |
|---|---|
| 700 | Tractor |
| 702 | Tubing |
| 704 | Electronic Package |
| 800 | Method |
| 802, 804, 806 | |
| 808, 810, 812 | |
| 814, 816 | Step |
| 900 | Control System |
| 902 | Sensors |
| 904 | Actuation Devices |
| 906 | Controllers |
| 908 | Processors |
| 910 | Memory |
| 912 | Program Instructions |
| 1000 | Fracture Formation Pressure |
| 1002 | Stimulation Fluid Pressure |
| 1004 | Formation Drain Time |
| 1100 | Injected Fluid |
| 1102 | Produced Fluid |

DETAILED DESCRIPTION OF THE INVENTION

The present invention generally relates to a system and method for harvesting geothermal energy from a subterranean formation and, in particular, to a system and method for harvesting geothermal energy from a subterranean formation and generating electricity with the harvested geothermal energy. The system and method for harvesting geothermal energy employs a multi-stage stimulation technique. Multi-stage stimulation techniques have been applied successfully to reduce costs in unconventional oil and gas wells but not in geothermal wells due to temperature limitations and casing size limitations, rendering known multi-stage stimulation techniques unusable which the present invention addresses.

The present invention is directed to a novel multi-stage fracturing technology with casing frac sleeves actuated by a dissolvable ball or downhole tool that eliminates need for expensive packers, which provides a scalable, rapid, and economical multi-stage fracturing technology for EGS environments. The present invention is also directed to a novel system and method using casing sleeves and a wellbore tractor to control conformance in injection wellbores that minimizes the need to complete producing wellbores and provides an economical technology for effective conformance control. The present invention is also directed to the use of pressure analysis to monitor fractures that are induced in geothermal wells, which provides a novel, low-cost system and method to detect fracture intersections in open hole producing wellbores.

FIG. 1A depicts an Enhanced Geothermal System 100 including a subsurface heat exchanger 102 formed in a subterranean formation 106 (or geologic formation 106) and surface process equipment 104 for injecting cool water down an injection wellbore 110. The injected water is pumped (or flows) through fractures 108 in the subterranean formation to harvest heat from the subterranean formation 106. The heated water is subsequently produced up a producing wellbore 112, in accordance with one or more embodiments of the present invention.

The subsurface heat exchanger 102 consists of a series of multi-stage hydraulic fractures 108 within the geologic formation 106, with injectors or injection wellbores 110 and proximate producers or producing wellbores 112 drilled into the geologic formation 106. The distance and/or spacing and/or arrangement of the injection wellbores 110 and the producing wellbores 112 may be dependent on the land (e.g., including a subterranean formation such as a reservoir) in which the injection wellbores 110 and the producing wellbores 112 are drilled. It is noted that the injection wellbores 110 and/or the producing wellbores 112 may be drilled for use with the EGS 100. However, the injection wellbores 110 and/or the producing wellbores 112 may alternatively be pre-existing structures within the formation 106 (e.g., that may or may not include fractures 108 previously propagated through the formation 106 between the wellbores 110, 112) that are provided for use with the EGS 100, without departing from the scope of the present disclosure. In addition, it is noted that embodiments as described throughout the disclosure are not intended to limit the distance and/or spacing and/or arrangement of the blue injection wellbores and the red producing wellbores.

Cool water is pressurized via one or more surface process equipment 104 components including, but not limited to, a pump and is injected down the injection wellbore 110 and produced up at least one producing wellbore 112 as hot or heated water, following the harvesting of heat from the rock or components of the geologic formation 106 while the cool water travels through the fractures 108 between the injection wellbore 110 and the at least one producing wellbore 112. For example, water may be injected into the injection wellbore 110, which travels through the fractures 108 (or fracture network 108) in the reservoir and, eventually, to the producing wellbore 112 where the resultant hot water is produced (or transported) to the surface. In one or more embodiments, the hot water is extracted from the producing wellbore 112 by the surface process equipment 104 components, such as a pump. Energy is subsequently harvested from the hot water via the other surface process equipment 104 to generate electricity or provide thermal energy for the use in heat pumps or other energy transfer devices well known by one skilled in the art. In some embodiments, the hot water is used to turn turbines to generate the electricity.

The hot water is cooled, either naturally during the passage through the turbines or with surface process equipment 104 capable of cooling processes and is then re-injected into the injection wellbore 110. In this regard, the EGS 100 including the subsurface heat exchanger 102 and the surface process equipment 104 may effectively be considered a closed loop system unless or until water is added or removed. In some embodiments, the surface process equipment 104 may include pumps to assist in extracting the heated wellbore fluid from the producing wellbore 112, without departing from the scope of the present disclosure.

In one non-limiting example, one scale of the EGS 100 includes wellbores 110, 112 with vertical sections 114 between 4000 and 6000 meters (m) in height, and horizontal sections 116 between 500 and 1000 m in length. The wellbores 110, 112 may be spaced within the formation 106 between 91 and 1000 m, or between 500 and 850 m, in total width 118 for the subsurface heat exchanger 102. It is noted, however, the example ranges for the height of the vertical sections 114, the length of the horizontal sections 116, and/or the total width 118 of the subsurface heat exchanger 102 within the formation 106 is merely illustrative and should not be interpreted as limiting on the present disclosure, and that the EGS 100 may include any respective height, length, and/or total width. In addition, subsurface heat exchanger 102 may be configured such that the wellbores 110, 112 are proximate in a horizontal or substantially horizontal plane (e.g., beside one another), are proximate in a vertical or substantially vertical plane (e.g., fully stacked or overlapping), and/or are set at an angle to one another within the formation 106 (e.g., partially stacked or overlapping). In one non-limiting example, the subsurface heat exchanger 102 may include fractures that are induced at a pre-determined angle (e.g., 45°, or the like) outward (e.g., upward and offset, or the like) from the injection wellbore 110 to the production wellbore 112. For instance, where there are 4 production wellbores 112, the production wellbores 112 may be separated by 90° angles, with the injection wellbore 110 positioned at the center of the angles. Alternatively, Further, where there are 8 production wellbores 112, the production wellbores 112 may be separated by 45° angles, with the injection wellbore 110 position at the center of the angles. Further, the wellbores 110, 112 may only include vertical sections 114 or horizontal sections 116, and/or may only include fractures 108 proximate to the vertical sections 114 or horizontal sections 116.

Figure 1B:
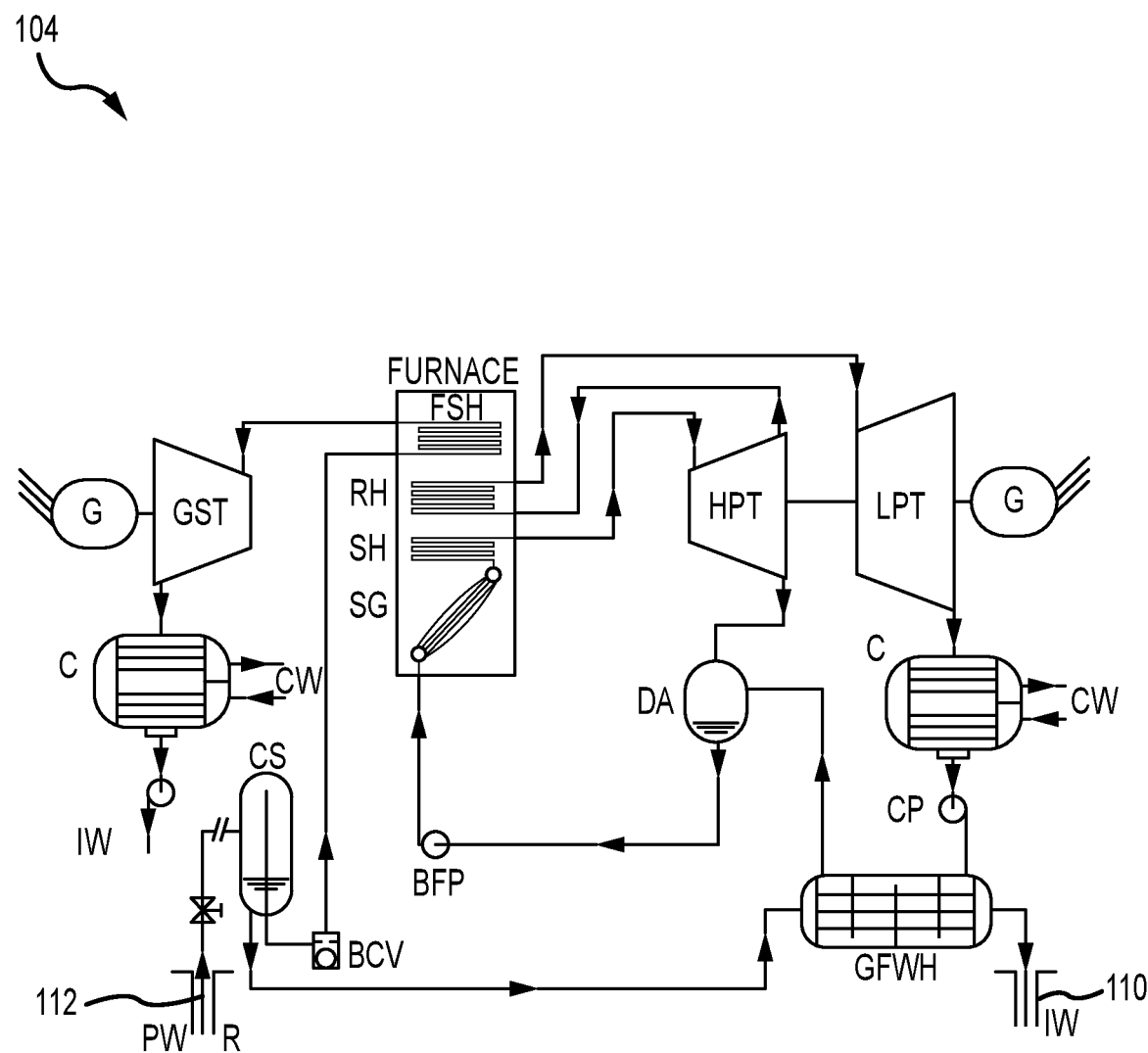
FIG. 1B depicts a schematic of surface process equipment of the enhanced geothermal system of FIG. 1A, in accordance with one or more embodiments of the present invention.

FIG. 1B depicts an example schematic of the surface process equipment 104 of the EGS 100, in accordance with one or more embodiments of the present invention. Produced fluid from the production wellbore 112 (PW) passes through the surface process equipment 104 to harvest the geothermal energy, before recycling and recirculating the fluid back into the injection wellbore 110 (IW). In some embodiments, the produced fluid may pass through one or more components of the surface process equipment 104 between the production wellbore 112 and injection wellbore 110 including, but not limited to, recuperator (R); a cyclone separator (CS); a ball check valve (BCV); a furnace including a fossil superheater (FSH), a reheater (RH), a superheater (SH), and/or a steam generator (SG); a geothermal steam turbine (GST); a high-pressure turbine (HPT), a medium-pressure turbine (MPT), and/or a low-pressure turbine (LPT); a deaerator (DA); a boiler feed pump (BFP); a generator (G); a condenser (C) (which may also be configured to receive cooling water (CW)); a condensate pump (CP); and/or a geothermal feedwater heater (GFWH). It is noted herein, however, that the surface process equipment 104 may be arranged or configured differently from that depicted in FIG. 1B, and that FIG. 1B should not be interpreted as limiting on the present disclosure.

Figure 2:
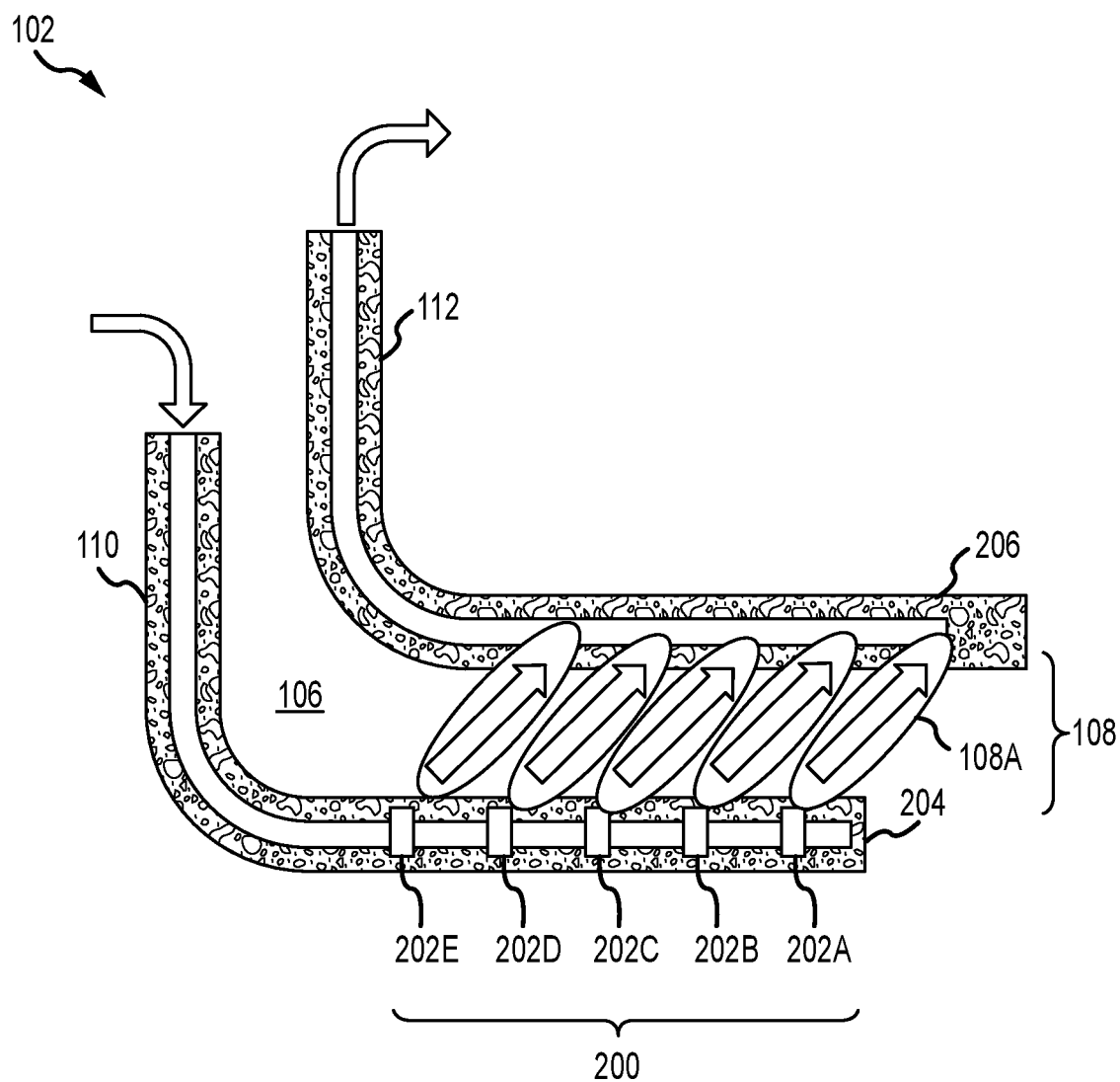
FIG. 2 depicts a schematic of a subsurface heat exchanger including casing sleeves cemented into a borehole of an injection wellbore connected via fractures in a formation to an open hole producing wellbore, in accordance with one or more embodiments of the present invention.
Figure 3:
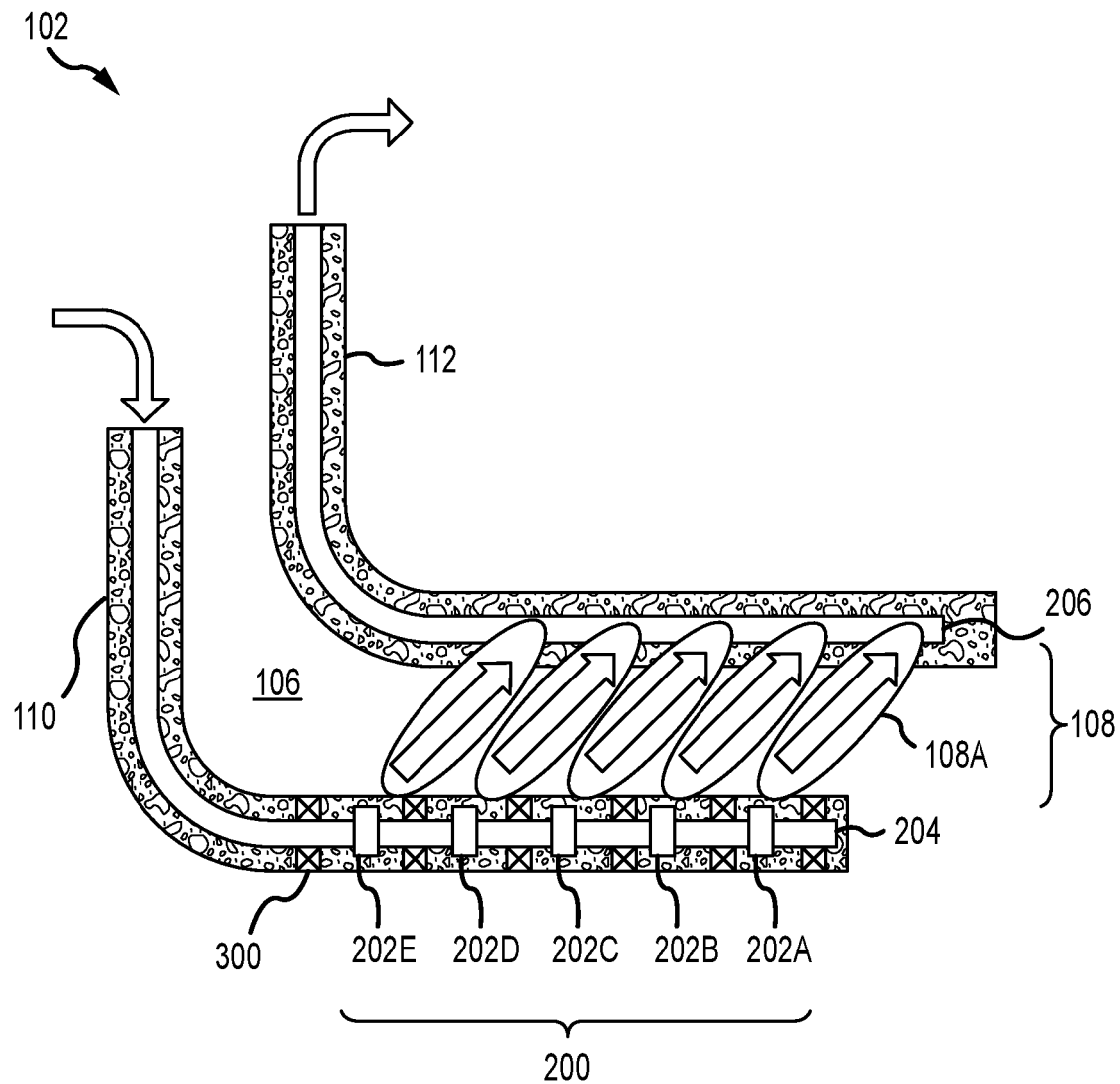
FIG. 3 depicts a schematic of a subsurface heat exchanger including packers for isolation in a borehole of an injection wellbore connected via fractures in a formation to an open hole producing wellbore, in accordance with one or more embodiments of the present invention.

FIGS. 2 and 3 depict example schematics of a subsurface heat exchanger 102 including an injection wellbore 110 connected via fractures 108 in a formation 106 to an open hole producing wellbore 112, in accordance with one or more embodiments of the present invention. Specifically, FIG. 2 depicts an injection wellbore 110 with a casing string, tubular string, or liner 200 with five casing sleeves 202 that are cemented into a borehole 204, and a producing wellbore 112 with a borehole 206. In addition, FIG. 3 depicts an injection wellbore 110 with a casing string, tubular string, or liner 200 with five casing sleeves 202 that are using packers 300 for isolation in the borehole 204, sealing either against the inner surface of the casing or the surface of a borehole 204, and a producing wellbore 112 with a borehole 206.

In FIGS. 2 and 3, example embodiments of the horizontal injection wellbore 110 and a horizontal open hole producing wellbore 112 are depicted. The injection wellbore 110 is completed with five sleeves 200, and the open hole producing wellbore 112 is completed with five fractures 108 from the horizontal injection wellbore 110. It is noted the injection wellbore 110 may be (or has previously been) connected to an offset wellbore that is in proximity to the injection wellbore 110. The offset wellbore may provide information related to the geologic formation when planning and preparing the injection wellbore. In addition, it is noted that the horizontal laterals may be 300 to 5,000 meters long and equipped with any variation and number of cemented sleeves based on factors including, but not limited to, geological conditions, length of well, and geothermal conditions present. In this regard, the depiction of five sleeves should not be interpreted as limiting on the present invention.

In some embodiments, the multi-stage fracturing of each stage in the injection wellbore 110 that connects the injection wellbore 110 to the producing wellbore 112 is accomplished using dissolvable fracture or frac balls, described in detail further herein, starting at sleeve 202A and ending at sleeve 202E. A hydraulic toe sleeve 202A opened with pressure begins circulation from the surface and allows the first fracture stimulation stage 108A to begin proximate to the toe of the horizontal lateral. It is noted a stage may be understood as corresponding to one or more fractures 108 associated with a sleeve 202, the fractures extending between the injection wellbore 110 and the producing wellbore 112, for purposes of the present disclosure.

In one embodiment, the present invention uses dissolvable balls to open each sleeve sequentially (e.g., from toe to heel of the injection wellbore 110, in one non-limiting example) after fracture stimulation is completed at the first stage with a pressure-activated toe sleeve. The formation is systematically fractured through each sleeve consecutively by using a ball to actuate each sleeve between the open position and the closed position, and plug off the previous frac stage prior to performing the next frac stage with the next sleeve. The balls dissolve, are drilled up, are flowed back up, or are pushed into a rathole at the end of the injection wellbore after all five stages have been stimulated, leaving each of the five sleeves 202 open and ready for injection.

In one embodiment of the present invention, the frac sleeves 202 are configured for closely spaced frac entry points in the horizontal injection wellbores 110. For example, the entry points may allow for fractures 108 to be initiated as close as every 40 feet and permit optimal frac spacing as desired. In general, however, the fractures 108 may be initiated at any distance, and as such 40 feet should not be interpreted as limiting on the present invention. For example, frac sleeves may be used with either cement for annular isolation with little or no impact on fracture initiation or known packers found to be suitable for use in a geothermal application at select temperatures. It is noted that other suitable annular isolation systems could be used such as swellable packers, or external casing packers.

In one non-limiting example, the injection wellbore 110 may include fifty sleeves run on a casing, a tubular string, or a liner 200 where there are fifty desired frac points. The first sleeve 202 at the toe would be a toe sleeve, and the next forty-nine may be stimulated by a corresponding ball dropped during the fracture stimulation process. For example, where fluid pressure is observed during the insertion, pressure spikes may indicate the passing of a ball beyond a sleeve or an engaging of a sleeve by the ball to open the sleeve.

In one embodiment of the present invention, cemented casing sleeves 202 are used to overcome problems and limitation with current equipment that may otherwise make EGS systems 100 too expensive and inefficient. For example, the cemented casing sleeves 202 may minimize the large thermal effect forces acting on the downhole equipment due to temperature changes in the unrestrained tubulars between packers. The casing sleeves 202 may be used with packers 300 or are cemented in the injection wellbore 110, with the cement hardening to provide annular isolation between the sleeves and to distribute forces from the casing to be resisted by the encapsulating cement, thus lowering the resultant stresses in the tubulars and sleeves.

The dual-purpose sleeves 202 are first used to rapidly stimulate the well using multi-stage fracturing techniques to create the network of fractures 108 between injection wellbores 110 and producing wellbores 112. The sleeve 202 are subsequently used to control the flow of fluid through the fractures 108 and wellbores 110, 112 by opening, closing, or adjusting sleeves to modify the injection profile. In one embodiment of the present invention, a series of large, single sized ball actuated frac sleeves for multi-stage fracturing as described in U.S. Pat. No. 8,991,505, issued on Mar. 31, 2015, to Fleckenstein (the '505 patent), and U.S. Pat. No. 9,562,419, issued on Feb. 7, 2017, to Fleckenstein (the '419 patent), which are each incorporated by reference in their entirety. In particular, the frac sleeves described in the '419 patent use a two-pressure actuation system which may be controlled from the surface to locate and activate a particular sleeve, allowing the use of a nearly infinite number of frac stages during stimulation. For example, the frac sleeves described in the '419 patent may be used to stimulate the entire length of wellbore rapidly, including for large diameter wellbores. The use of a low-cost and rapid multi-stage fracture stimulation with cemented casing frac sleeves may eliminate the use of packers in conventional stimulation (but is not intended to be limiting in this regard). The frac sleeves used for fracture stimulation may also be modified to be shifted for flow control, to prevent short circuiting of injection fluid over a limited area of the reservoir.

Figure 4A:
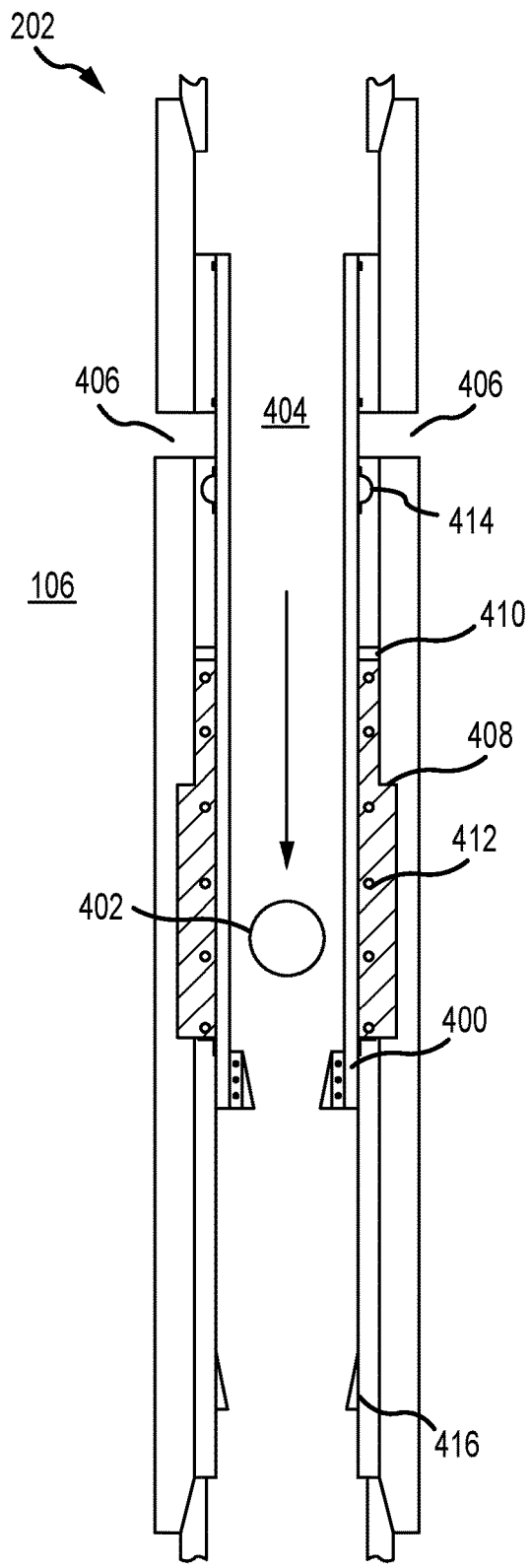
FIG. 4A depicts a top plan section view of downhole hardware with a sliding sleeve in a closed position in an injection wellbore of a subsurface heat exchanger, in accordance with one or more embodiments of the present invention.
Figure 4B:
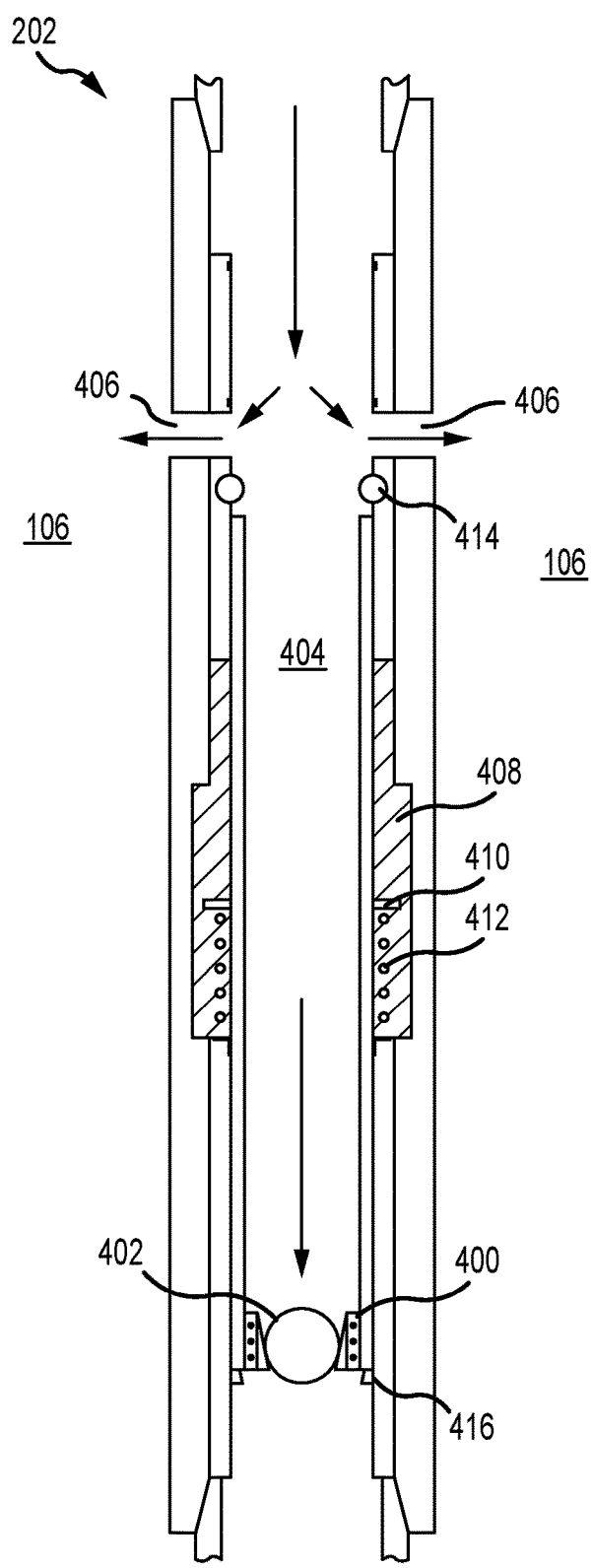
FIG. 4B is another top plan section view of the downhole hardware of FIG. 4A with the sliding sleeve in an open position in the injection wellbore of the subsurface heat exchanger, in accordance with one or more embodiments of the present invention.

FIGS. 4A and 4B depict a casing frac sleeve 202 for an injection wellbore of a subsurface heat exchanger, in accordance with one or more embodiments of the present invention. In particular, FIG. 4A depicts the sleeve in a closed position, and FIG. 4B depicts the sleeve in an open position.

In one embodiment of the present invention, the sleeve 202 utilizes a drop member catch or release mechanism or assembly 400 (e.g., collet 400 or fingers 400) on the inner sleeve. In some embodiments, the fingers 400 are at an end of the inner sleeve. However, the fingers 400 may be in other locations, such as a medial portion, or a beginning portion of the inner sleeve. In some embodiments, the fingers 400 may be made of a ductile alloy so that they may flex and return to their original position without experiencing any plastic deformation or fatigue (e.g., are able to elastically deform). Additionally, or alternatively, the fingers 400 may be pivotally or rotatably connected to the sleeve 202.

High fluid pressure sufficient to pass a ball 402 past the fingers 400 may be applied until the desired sleeve is reached or the ball 402 is dissolved, is drilled out, is flowed back up, or is pushed into a rathole at the end of the injection wellbore 110. For example, the fingers 400 may elastically deform when high pressures are applied to allow the ball 402 to pass through without activating the sleeve 202, while low pressure and time activates the sleeve 202. In this regard, high pressure (or pressure spikes) observed may allow an operator at the surface to understand exactly where the ball 402 is, by knowing the pressure a previous sleeve required to pass the ball 402.

Prior to the activation of the sleeve 202 to its open position, fluid injected into a tubular 404 may be at least partially (or completely) stopped within the tubular 404 by the engagement between the ball 402 and the fingers 400. Once the sleeve 202 has been activated, access to one or more openings 406 within the exterior of the sleeve 202 is provided. Fluid injected into the tubular 404 can exit the sleeve 202 through the one or more openings 406 into a tubular annulus, and then into the surrounding formation 106. This may cause a change in pressure of the fluid which can be observed by an operator at the surface. For example, after engagement of the ball 402 with the fingers causes the sleeve 202 to move to its open position, fluid exiting the tubular 404 through the openings 406 may cause pressure to decrease, indicating to the operator that the sleeve is in its open position.

In some embodiments, the sleeve 202 remains open until a force is applied to the sleeve 202 (e.g., by a tractor, as described in detail throughout the present disclosure) to close the sleeve 202 and prevent access to the one or more openings 406. In other embodiments, the sleeve 202 may include a hydraulic oil reservoir 408 for increased ease in opening and/or closing the sleeve 202. In addition, the sleeve 202 may include a piston member 410, where the piston member 410 is moveable between a first or closed position and a second or open position via a force provided by a biasing element, such as a spring 412. That biasing element 412 that has stored energy may move the sleeve back to the initial position, (e.g., a closed position). The biasing element 412 may freely move the sleeve 202. For example, the biasing element 412 may be time-delayed to allow the sleeve to naturally close. The biasing element 412 may be stopped by a trigger 414 holding the sleeve 402 in an open position (e.g., as illustrated in FIG. 4B) until the trigger 414 is engaged to allow the biasing element 412 to allow the sleeve 202 to return to the closed position (e.g., as illustrated in FIG. 4A). For example, the sleeves 202 may be designed with a biasing element 412 (such as a spring) and a trigger 414 (such as a locking mechanism or assembly), where the spring returns the sleeve 202 to the closed position if the locking mechanism or assembly is released. The sleeve 202 may also be equipped with a profile to allow engagement with an Otis B sliding sleeve or other sleeve and shifting profile or may use a tool that grips the sleeve 202 without a profile to open or close the sleeve. The sleeve 202 may be equipped with devices that allow choking of the flow as opposed to total closure for select EGS conformance control protocols. This technology may be used to stimulate the entire length of a wellbore rapidly, including large diameter wellbores.

The balls 402 used to engage the fingers 400 may be single-sized, having a large diameter that is substantially similar to a drift diameter of the casing. For purposes of the present disclosure, drift diameter is defined as the inside diameter (ID) that a pipe manufacturer guarantees per specifications and that may be used by a well planner to determine what size tools or casing strings can later be run through the casing. The draft diameter is a diameter than is slightly smaller than a listed nominal inside diameter, which may be used for fluid volume calculations such as mud circulating times and cement slurry placement calculations.

The large diameter of the balls 402 is an improvement over previous sleeves and facilitates EGS operations, as the large diameter balls 402 are received by minimal-sized components and/or deformable components (e.g., the fingers 400) within the sleeves 202 which allow for large diameter tools to pass through the horizontal wellbores 110 for injection conformance operations. For example, when conformance control is needed a downhole tool with coiled tubing or a tractor with coiled tubing may be used in the large diameter or horizontal injection wells 110 to close sleeves 202 as needed. The tractor may optionally be equipped with a means to detect flow and may be assisted in horizontal movement by injection flow. For instance, the tractor may be rotated and driven with electrical energy and/or hydraulic energy. Maintaining the diameter of the injection wells 110 through the use of large diameter balls 402 and corresponding minimal-sized receiving components (e.g., fingers 400) in the sleeves 202 will allow for more room for the tractor and coiled tubing.

By way of another example, the balls 402 may be multiple sizes. For instance, sleeves 202 with different diameters may be installed throughout the injection wellbore 110. In addition, sleeves 202 with the same diameter but having gaps with a different diameter or width between the fingers 400 may be installed throughout the injection wellbore 110. It is noted that having different-diameter balls 402 may allow for the engaging of a specific sleeve 202 at a specific stage by knowing the correlation between ball 402 diameter and stage, such that increased pressure may not be necessary to blow the ball 402 past the later stages closer to the heel of the injection wellbore 110 and/or surface.

In some embodiments, there may be some combination of sleeve diameters installed within the injection wellbore 110. A first set of sleeves (e.g., closer to the heel of the injection wellbore 110) are configured to be actuated by balls with a first diameter. A second set of sleeves (e.g., closer to the toe of the injection wellbore 110) are configured to be actuated by balls with a second diameter that is smaller than the first diameter. This is beneficial because the EGS 100 may have up to fifty sleeves in each of the first and second sets of sleeves. Accordingly, during stimulation and hydraulic fracturing of the injection wellbore 110, a ball 402 of the second diameter dropped into the wellbore will pass by all of the sleeves 202 of the first set without requiring the operator at the surface to increase the pressure of the fluid to force the ball 402 past the fingers 400 of the first set of sleeves. In this regard, the single ball diameter as described should not be interpreted as limiting on the present invention.

The ball 402 may be dissolved, may be drilled out, may be flowed back up, or may be pushed into the rathole at the end of the injection wellbore 110 following well stimulation and prior to water injection, avoiding the need for cleanout operations. The frac sleeve 202 of the present invention builds on the successful history of frac sleeves used in both oil and gas and geothermal development. However, although embodiments of the prevent invention utilize dissolvable balls 402 to shift sleeves 202, coiled tubing may be used to shift sleeves for fracturing in a similar manner to Getzlaf as previously described herein.

Figure 5A:
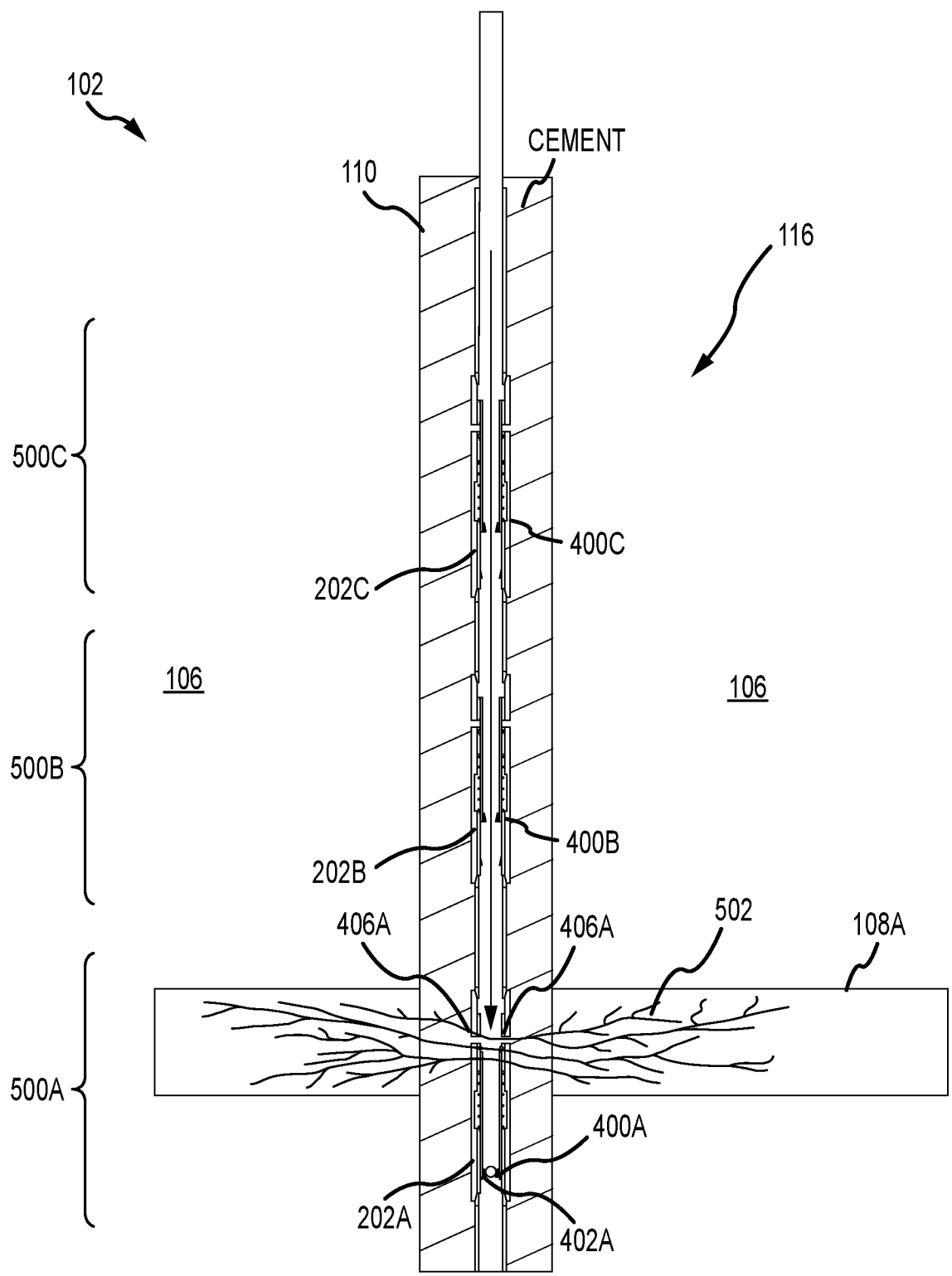
FIG. 5A depicts a top plan section view of frac fluid pumped through an open sleeve of an injection wellbore of a subsurface heat exchanger to initiate fracturing of a formation in a lower zone or stage, in accordance with one or more embodiments of the present invention.
Figure 5B:
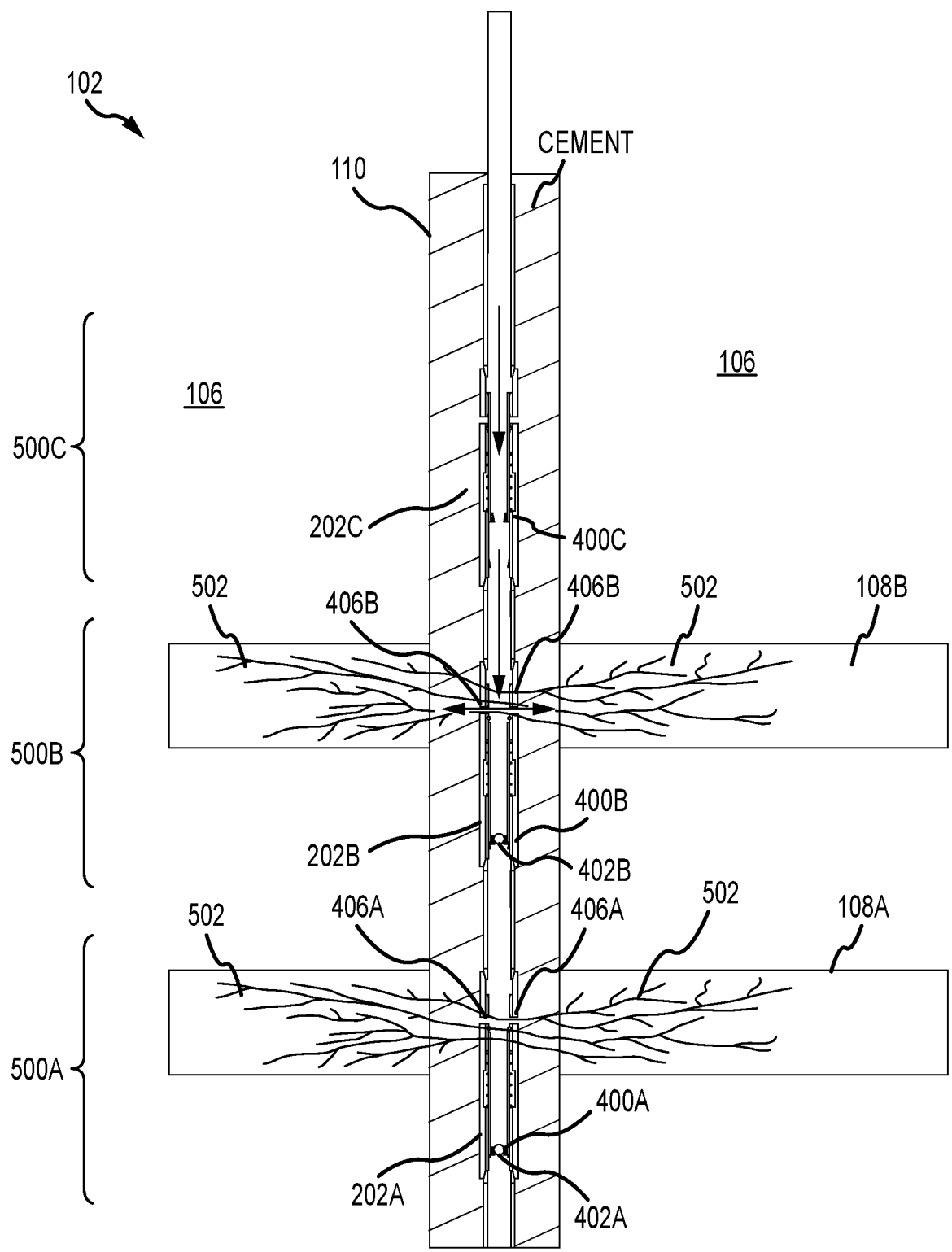
FIG. 5B is another top plan view of the injection wellbore of FIG. 5A with frac fluid pumped through an open sleeve of the injection wellbore of the subsurface heat exchanger to initiate fracturing of the formation in a middle zone or stage following the fracturing of the formation in the lower zone or stage, in accordance with one or more embodiments of the present invention.

FIGS. 5A and 5B depict any three sleeves 202 and corresponding zones or stages 500 between the toe sleeve and the heel of the injection wellbore 110 for the subsurface heat exchanger 102, in accordance with one or more embodiments of the present invention. Although FIGS. 5A and 5B depict a top plan view of sleeves 202 used in horizontal laterals or sections 116 injection wellbore 110, it is noted that one of skill in the art would recognize the sleeves 202 may be deployed in vertical segments 114 of an injection wellbore 110. In addition, it is noted that one of skill in the art would recognize how those sleeves 202 may be deployed in a wellbore 110 using hydraulic or swell packers 300, or any other isolation medium that may be used between stages, and as such should not be interpreted as limiting on the present invention. In addition, although FIGS. 5A and 5B depict sleeves 202 used in horizontal laterals 116 injection wellbore 110, it is noted that one of skill in the art would recognized how the sleeves may be deployed in vertical or inclined wellbores, and as such should not be interpreted as limiting on the present invention.

As depicted in FIG. 5A, a ball 402A has passed through tubing or casing and unstimulated stages 500B and 500C and landed in stage 500A, by engaging the fingers 400A to open the sleeve ports in the sleeve 202A in stage 500A. In this manner, the ball 402A facilitates stimulation of stage 500A. Stimulation fluid 502 has passed through the openings 406A and fractured though the cement in the wellbore annulus outside the sleeve 202A. The stimulation fluid 502 is pumped at a fracture pressure and is creating fractures 108 in the formation 106. It is noted that the stimulation fluid 502 could travel through existing fractures 108 below the fracture pressure or at higher pressures (such as the fracture pressure) needed to create new fractures 108.

Passing the ball 402A through stages 500B and 500C without stimulating those stages requires a large amount of pressure to force the ball 402A through the fingers 400C of sleeve 202C and fingers 400B of sleeve 202B. Utilizing the ball 402A to open the sleeve 202A and initiate fracturing through the formation in stage 500A requires a second, smaller amount of pressure than that required to force the ball 402A through the unstimulated stages 500B and 500C, in combination with time to allow the pump operator to detect the ball is in the proper sleeve and to ensure the second amount of pressure to actuate the intended sleeve. Spikes in pressure (e.g., as monitored on the surface) can indicate when the ball 402A moves through the fingers 400C of sleeve 202C and fingers 400B of sleeve 202B.

The pressure required to move the sleeve 202 when a ball 402 is seated in the fingers 400 will be both greater than the friction between components of the sleeve 202 when in the closed position (though the friction may be controlled with the choice of grease or hydraulic fluid within an oil reservoir 408, if employed) and less than the pressure necessary to push the ball past the fingers 400 of the sleeve 202. In one non-limiting example, the ball 402 cannot force the fingers 400 open past a profile 416 (e.g., a catch mechanism, a stopping device, or the like proximate to the fingers 400) within the sleeve 202 when the sleeve 202 is in the actuated position, thus preventing the fingers 400 from outwardly expanding and releasing the ball 400. The ball 402 is thus held and can assist with stimulating fractures with any chosen stimulation pressure based on the design criteria of the sleeve 202 and ball 402. As such, the pressure necessary to fracture the formation 106 is independent of the amount of pressure necessary to force a ball 402 through the fingers 400 of a sleeve 402, versus when the ball 402 is retained within the fingers 400 and causing the diversion of the stimulation fluid 502 into the formation 106. In addition, it is noted that a slight bleed-off of pressure may occur as the stimulation fluid 502 enters the formation 106 through the opening 406 to begin fracturing when the sleeve 202 is in the open position. As depicted in FIG. 5B, stimulation of stage 500A is complete and a second ball 402B is passed through tubing or casing and past the sleeve 202C of unstimulated stage 500C. The ball 402B has landed in stage 500B by engaging the fingers 400B to open the sleeve ports 406B in the sleeve 202B to permit stimulation of stage 500B. Stimulation fluid 502 has passed through the openings 406B and fractured though the cement in the wellbore annulus outside the sleeve 202B in stage 500B. The stimulation fluid 502 is pumped at a fracture pressure and is creating fractures 108B in the formation 106. The stimulated stage 500A is isolated below the ball 402B that landed in stage 500B, and stimulation fluid is thus prevented from flowing into the fractures 108A of stage 500A.

In a similar fashion, fracture stimulations in the horizontal injection wellbore 110 may continue until all the stages 500 have been stimulated, which could be a very short lateral with the three sleeves 202 depicted in FIGS. 5A and 5B or could continue through any number of frac sleeves 202 in a long lateral. Thus, the depiction in FIGS. 5A and 5B should not be interpreted as limiting on the present invention.

In one embodiment of the present invention, alternating injection wellbores 110 and producing wellbores 112 including of one or more extended reach or horizontal wells may be used, where the injection wellbore 110 is cased and equipped with cemented casing sleeves 202 as described throughout the disclosure and the producing wellbores 112 are completed open hole to reduce costs. Multi-stage hydraulic fracturing using cemented sleeves in the injection wellbore 110 would continue with each stage 500 until the induced fracture 108 had reached the open hole producing wellbore 112. This system and method of the present invention may be used to detect when hydraulic fractures intersect offset wellbores and fracture systems. For example, an induced fracture 108 may be initiated from the individual cemented casing sleeves 202 in the injection wellbores 110 and would continue to propagate the fractures 108 until the fractures 108 arrive at the open hole producing wellbores 112 and are detected and characterized by changes in fluid pressure. In some embodiments, the change in fluid pressure is detected and measured by pressure gauges at the surface. The intersection of the fractures 108 with the producing open hole wellbore 112, sometimes called a "frac hit", could also be detected with a variety of technologies and equipment including, but not limited to, fiber optic cables using distributed sensing techniques known to one of skill in the art, micro-seismic sensing, or an SWPM-based technology to detect the arrival of stimulated fractures 108 that are induced using pressure observations in sealed offset wellbores. By using open hole producers 112 equipped with pressure gauges at the surface, the arrival of fractures would be detected in the production wellbores 112 by a pressure spike at the surface. Injection of fluid in the injection wellbores 110 may continue with flow of fluid up the producing wellbores 112 until the fracture connection cleans up and has sufficient conductivity to the injecting wellbore 110 for EGS operations.

It is noted that the EGS 100 may be employed in a formation 106 that is granite or a material of similar hardness. Due to the hardness of the granite, fractures 106 within the granite may offset and remain open. As such, a proppant such as sand may not be necessary. Where a proppant is used, however, the proppant may need to be different from sand or other known proppants to withstand forces from the granite or other material of similar hardness.

FIGS. 6A-6D depict frac fluid pumped through open sleeves 202 of an injection wellbore 110 and through fractures 108 in a formation 106 to a producing wellbore 112 for a subsurface heat exchanger 102, in accordance with one or more embodiments of the present invention. It is noted the stages 500 in FIGS. 6A-6D may be the same stages or different stages from the stages 500 depicted in FIGS. 5A-5B. Although FIGS. 6A-6D depict a top plan view of sleeves 202 used in horizontal laterals or sections 116 in the injection wellbore 110, it is noted that one of skill in the art would recognize the sleeves 202 may be deployed in vertical segments 114 of an injection wellbore 110. In addition, it is noted that one of skill in the art would recognize how those sleeves 202 may be deployed in a wellbore 110 using hydraulic or swell packers 300, or any other isolation medium that may be used between stages, and as such should not be interpreted as limiting on the present invention.

Figure 6A:
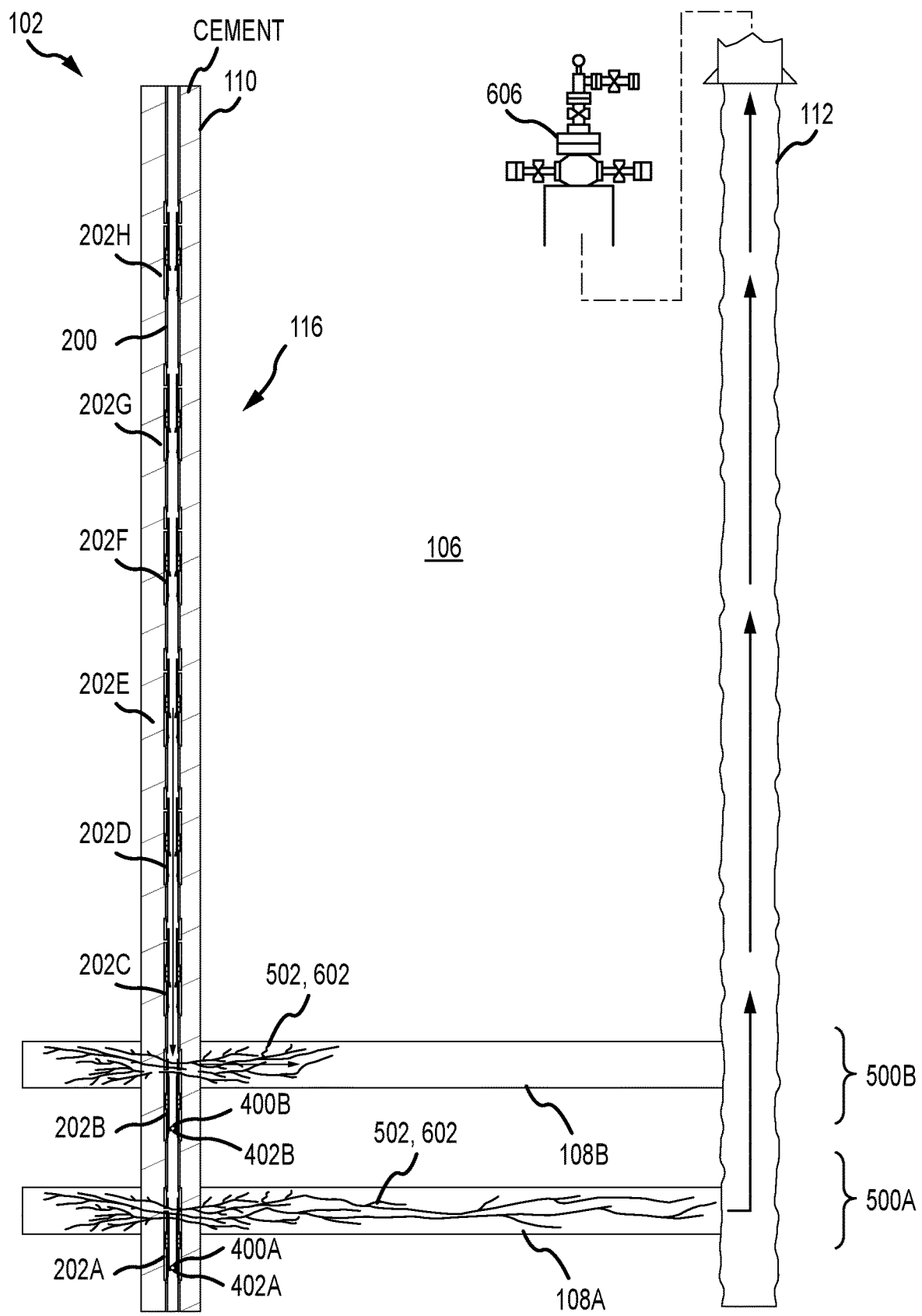
FIG. 6A depicts a top plan section view of frac fluid pumped through an open sleeve of an injection wellbore to initiate fracturing of a formation in a middle zone or stage following the fracturing of the formation in a lower zone or stage between the injection wellbore and a producing wellbore of a subsurface heat exchanger, in accordance with one or more embodiments of the present invention.
Figure 6B:
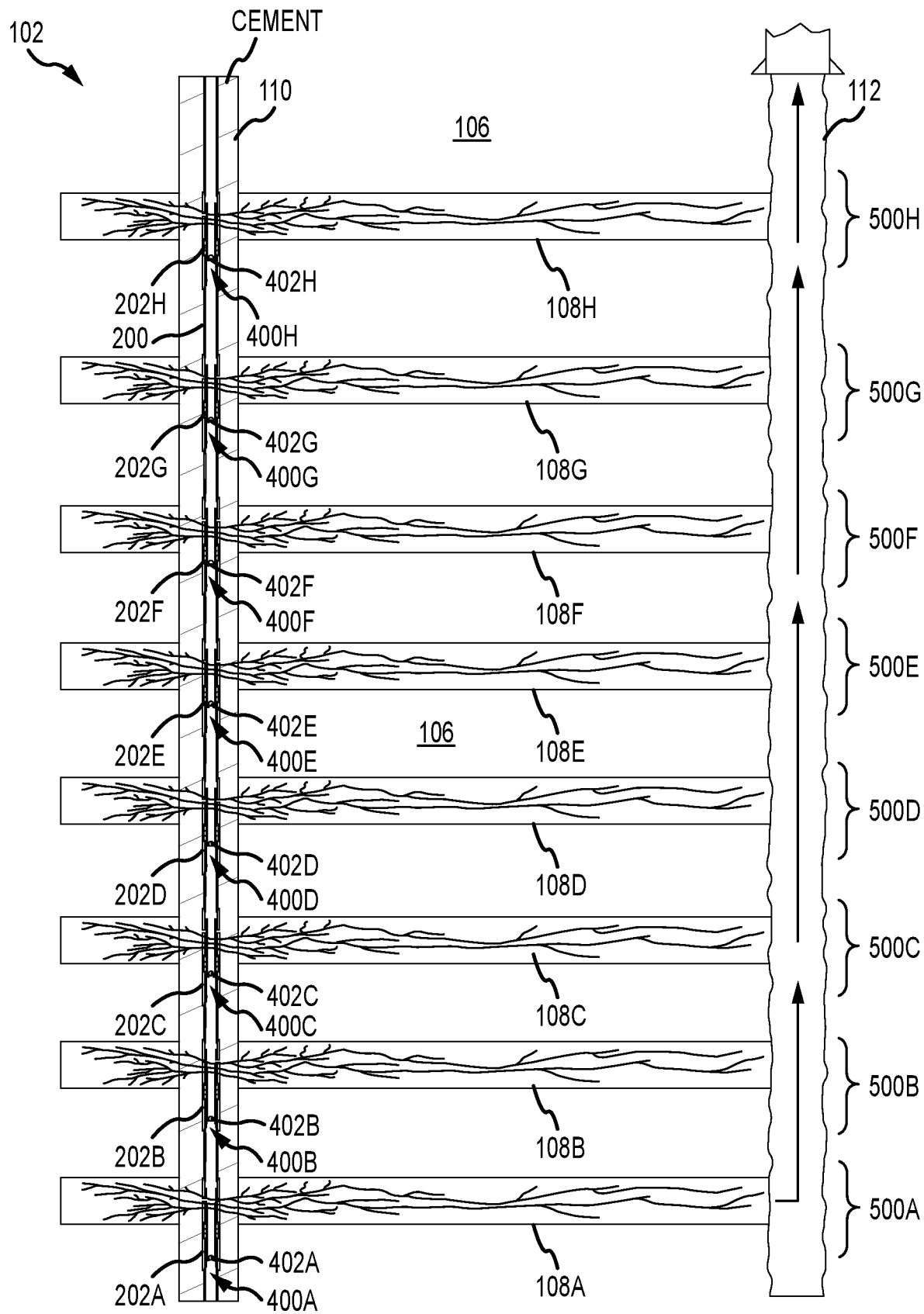
FIG. 6B is another top plan section view of the formation of FIG. 6A, with fractures initiated through multiple zones or stages between the injection wellbore and the producing wellbore of the subsurface heat exchanger, in accordance with one or more embodiments of the present invention.
Figure 6C:
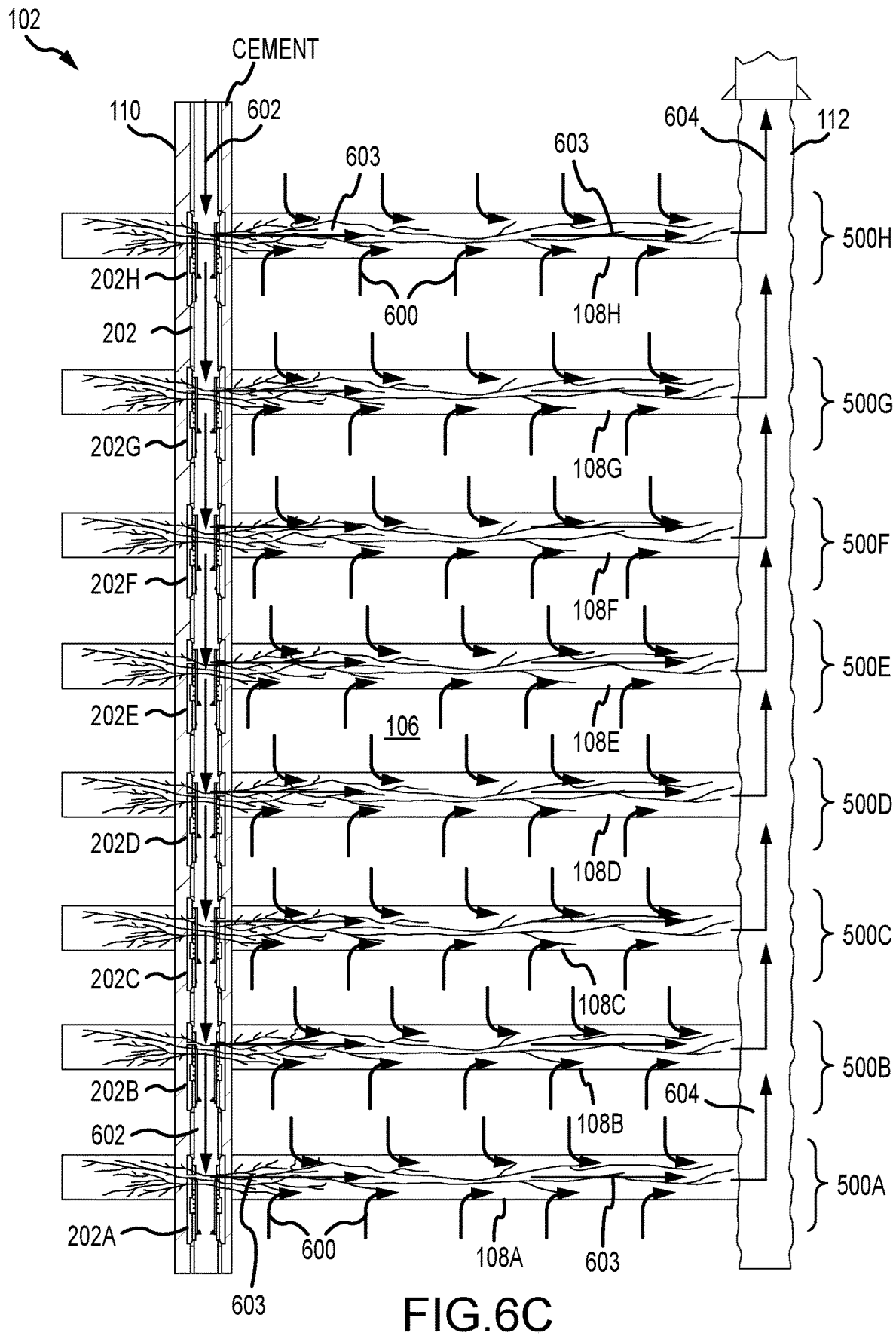
FIG. 6C is another top plan section view of the formation of FIG. 6B, with heat harvesting via uniform distribution of water in the fractures initiated through the multiple zones or stages between the injection wellbore and the producing wellbore of the subsurface heat exchanger, in accordance with one or more embodiments of the present invention.
Figure 6D:
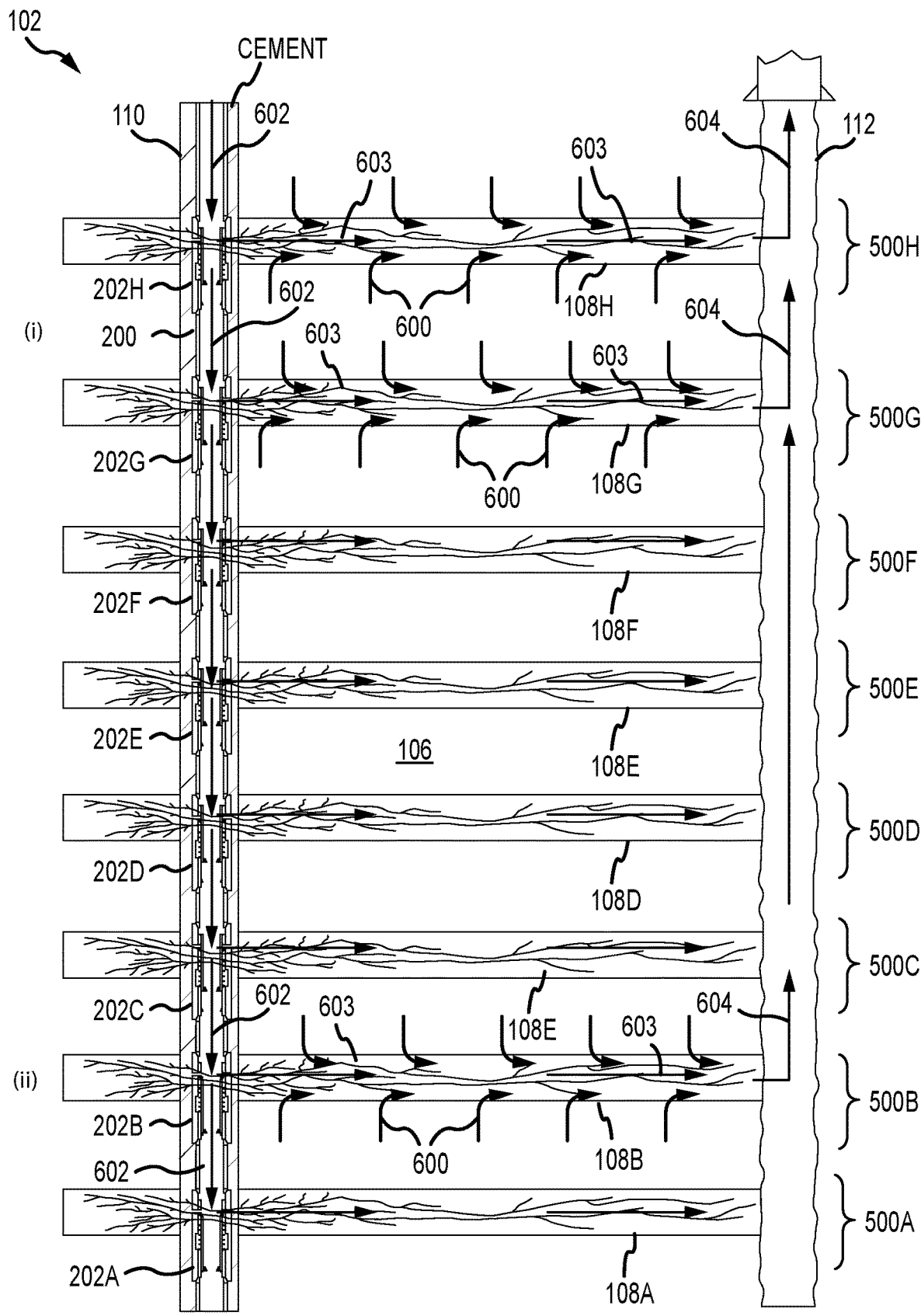
FIG. 6D is another top plan section view of the formation of FIG. 6B, illustrating a non-uniform distribution of water in the fractures initiated through the multiple zones or stages between the injection wellbore and the producing wellbore of the subsurface heat exchanger, in accordance with one or more embodiments of the present invention.

In particular, FIG. 6A illustrates two stages 500A, 500B having been stimulated, where stage 500A is isolated by stage 500B. In addition, FIG. 6B illustrates eight stages having been stimulated, where each of stages 500A-500G are isolated by a following stage closer to the heel of the injection wellbore 110. Further, FIG. 6C illustrates eight stages 500A-500H having been stimulated, with sleeves 202A-202H of all stages 500A-500H being open for the harvesting of geothermal energy, or the heat transfer represented by the arrows 600 from the hot rock of the formation 106 to the injection fluid 602 traveling in the fractures 108 from the injection wellbore 110 to the producing wellbore 112. Further, FIG. 6D illustrates eight stages 500A-500H after simulation, but only a subset of the stages 500B, 500G, and 500H in use for the harvesting of geothermal energy due to the injected fluid 502 short circuiting from the injection wellbore 110 to the producing wellbore 112 and bypassing stages 500A and 500C-500F, which results in a premature cooling of the produced fluid 604.

It is noted that injected fluid 602 may be the same fluid or different fluid as the stimulation fluid 502, in one or more embodiments. For example, where the EGS 100 is a closed system (either permanently or when additional fluid is not being added to counter inherent losses in the system through the formation 106, the surface process equipment 104, or the like), the stimulation fluid 502 may be produced by the subsurface heat exchanger 102 during the stimulation or fracturing phases, processed by the surface process equipment 104, and re-circulated by the surface process equipment 104 back into the subsurface heat exchanger 102 as the injected fluid 602 during energy harvesting.

In addition, it is noted that produced fluid 604 and injected fluid 602 may be the same fluid, but with a temperature differential where the injected fluid 602 has a first, lower temperature and the produced fluid 604 has a second, higher temperature, where the produced fluid 604 is heated through the harvesting of geothermal energy via the heat transfer 600 from the hot rock of the formation 106 during passage through the fractures 108.

In general, as depicted in FIG. 6A-6D, in some embodiments the casing sleeves 202 are placed in the casing string or liner 200 by threaded connections to the joints of casing, allowing the spacing of the induced fracture system to be as large or small as desired for the EGS 100.

As depicted in FIG. 6A, the injection wellbore 110 is illustrated on the left with cemented sleeves 202 including a series of frac stages 500A-500H with various amounts of fracturing. A producing wellbore 112 is illustrated on the right. In some embodiments, the producing wellbore 112 has an open hole completion. Stimulation of stage 500A has been completed with fractures 108A intersecting the producing wellbore 112. Intersection of the fractures 108A from the injection wellbore 110 with the producing wellbore 112 may be detected with a change in pressure at a pressure gauge 606 at the surface on the wellhead of the producing wellbore 112. Stage 500B is undergoing stimulation to form fractures 108B that will intersect the producing wellbore 112. As the induced fracture 108 arrives at the production wellbore 112, the pressure of the induced fracture 108 will increase the pressure in the producing wellbore 112. For example, the producing wellbore 112 may be sealed at the surface. By way of another example, the producing wellbore 112 could be opened at the surface, allowing flow to improve the connection between the injection wellbore 110 and producing wellbores 112 at that portion (or stage 500) of the formation 106. This increase in pressure will be measured with the pressure gauge 606, with recorded pressure history convenient for analysis.

In some embodiments, this fracture connection 108 between two wellbores 110, 112 may be a discrete induced fracture, or a series of fractures, including natural fractures and formation permeability, or a combination. The fluid injection at the injection wellbore 110 may be optimized with a propping mechanism, or a stimulation fluid 502, or an injection rate and pressure protocol, depending on the formation 106 and experience with the technique. As described herein, in some embodiments the producing wellbore 112 may be left at least partially unfinished, or open hole. It is noted that the use of an open hole producing wellbore 112 is significantly less expensive than a cased and cemented producer 112 which requires a stimulation program to connect to the induced fracture system from the injection well 110.

Although embodiments of the present invention are directed to the cemented frac sleeves 202 being described for use in injection wellbores 110, it is noted that the cemented frac sleeves 202 may be installed in producing wellbores 112. For example, instances may exist where it is needed or desired to stimulate producing wellbores 112 using the cemented frac sleeves 202 and/or control fluid conformance in the producing wellbores 112, and the use of cemented frac sleeves 202 may allow for stimulation and control of the fluid production in a similar manner in the producing wellbores 112 to that described for the injection wellbores 110.

As depicted in FIG. 6B, stimulation of all stages 500A-500H is completed and the frac sleeves 202 are in the open position, with the injection wellbore 110 blocked to fluid injection by the balls 402A-402H. If dissolvable balls 402 are used, they will dissolve and allow the injection wellbore 110 to be immediately available for injection. If the balls 402 are not dissolvable, they may be drilled out, may be flowed back up, or may be pushed into a rathole within the injection wellbore 110, or may be flowed back and otherwise prevented from wellbore blockage by devices designed to prevent the balls 402 from engaging the sleeves 202.

The balls 402A-402F may be substantially the same diameter as or just slightly smaller than the drift diameter of the casing. In this manner, tools or other devices are permitted to pass through the sleeves 202 for diagnostics and to shift the sleeves 202, which is not possible with conventional ball drop sleeves. Although discrete fractures 108 would ideally be created, the invention may be used where a permeable connection exists between injection wellbores 110 and producing wellbores 112 that also has connectivity between flow paths, with little or no distinction between in-situ permeability and the conductivity of the fractures 108.

The use of casing frac sleeves 202 are configured to be used for both conformance control and stimulation control. In this manner, the sleeves 202 address a challenge presented with EGS of the effective management of fluid flow and/or fluid pressure between the injection wellbore 110 and the producing wellbore 112 to maximize heat recovery per volume of fluid injected. In one embodiment of the present invention, horizontal injection wellbores 110 equipped with the sleeves 202 described throughout the disclosure may also be used to effectively detect and control flow of heat-carrier fluid solely from a long-reach injection well 110 through the network of induced and existing fractures 108 and produced from a barefoot long-reach injection well to improve heat recovery. The large volumes of fluid needed for EGS entail the need for wellbores with larger-than-normal diameters. Conventional techniques of using coiled tubing to shift sleeves 202 in conventional horizontal wellbores with a small diameter will not work in the wellbore 110 of the present invention that have a larger-than-normal diameter. For example, small diameter coiled tubing may buckle in a larger or increased-diameter horizontal wellbores required for EGS. By way of another example, coiled tubing may not be able to actuate the tractor in horizontal wellbores 110 having a larger or increased length.

As depicted in FIG. 6C, in an ideal state of operation water is injected down the injection wellbore 110 (e.g., injected down the casing with no inner tubing, or otherwise injected down the casing), with the injection fluid 602 (e.g., water, or the like) represented by the arrows 602 in FIG. 6C (and in FIG. 6D). The water 602 injected down the injection wellbore 110 is divided equally between each stage 500A-500H and travels through the fractures 108A-108H, harvesting heat as represented by the arrows 600 in FIG. 6C (and in FIG. 6D) from the hot rock of the formation 106. The fluid undergoes heating 603 by the thermal transfer from the rock (and may also pick up water native to the hot rock) while traveling through the fractures 108 to the producing wellbore 112. Once it passes through the fractures 108A-108H, the fluid is heated fluid 604 and is produced to the surface via the production wellbore 112.

As depicted in FIG. 6D, the water 602 injected down the injection wellbore 110 is not uniformly distributed to the stages 500A-500H. In non-limiting example (i), two injection points, labeled stage 500G and stage 500H and which represent the injection points nearest the heel of the horizontal injection well 110, are receiving a much higher volume of water than other stages 500A-500F. This may be addressed by choking or completely closing the injection points associated with stages 500G, 500H by closing their associated sliding sleeves 202G 202H to force the injection fluid 602 to move down the wellbore 110 to the other injection points.

FIG. 6D also illustrates another non-limiting example (ii) in which the water injected down the injection wellbore 110 may follow the path of least resistance as represented by fluid entering the injection point labeled stage 500B, bypassing stages 500A and 500C-500F (or 500C-500H) that have greater resistance. For instance, the lesser resistance in stage 500B may be due to the presence of a high permeability streak, natural fractures, or a fault system that causes the injection fluid 602 to short circuit between the injection wellbore 110 and the production wellbore 112. In both examples, most of the hot rock 106 is left with unharvested heat.

To assist in the directing of fluid and improve the operation of the subsurface heat exchanger 102 through conformance control, tractors 700 or other devices with fluid flow and/or fluid pressure survey capability may be used to detect "thief zones." The tractors or other devices may include various tools and sensors, such as spinner survey tools, temperature sensors or even weight indication on the wireline at the surface as the tools move past the sleeve(s) 202H, 202G, 202B receiving much of the injection fluid 602. The tractors 700 or other devices include a sleeve shifting capability to plug or choke fluid movement through the sleeves 202 based on real time fluid survey data to control the subsurface EGS heat exchanger 102, by opening, closing or modifying the injection points to improve heat drainage from the rock to maximize heat recovery and minimize water temperature declines. In addition, the injection fluid 602 would cool the injection wellbores 110 greatly, allowing more conventional electronic systems to be used in the cooler environment for the detection of fluid flow and/or fluid pressure and avoid the corrosion and scaling tendencies of geothermal waters. This present disclosure uses tractors 700, the inertial forces of the injected fluid, or a combination thereof to deploy a flow detection device such as a spinner or temperature meter, and/or the tension on a wireline, to detect the sleeve(s) 202 that are allowing injected fluid 602 to short circuit to a producing wellbore 112 and a shifting tool to close those sleeves 202 to redistribute the injected fluid 602 into reservoir areas of less heat recovery. It is noted that this conformance control is similar in purpose to the control of oilfield waterfloods. Where inertial forces are unable to deploy the shifting tools, in a manner similar to deployment of composite plugs and perforating guns in horizontal wellbores, coiled tubing 702 could be used, until the horizontal reach of coiled tubing 702 is limited in larger diameter wellbores 110 (such as those needed for economic EGS injectors) due to helical buckling.

In one embodiment of the present invention, the tractor 700 may be similar to that described in U.S. Pat. No. 10,927,625, issued on May 10, 2019, to Fleckenstein et al. (the '625 patent), which is incorporated herein in the entirety. For example, the tractor 700 may use hydraulic pressure which is either provided by a hydraulic pump or wellbore fluid (hydraulic tractor 700 on coiled tubing 702, or jointed tubing with a wet connect if needed to connect the tractor to wireline), or another radial force such as a spring to deploy wheels against the casing wall. For instance, one version of the tractor 700 design may use a mud motor to provide the needed torque and rotation speed. In addition, the tractor 700 may be controlled either with hydraulic pumps at the surface to control a floating mandrel to deploy the wheels of the tractor 700 or downhole electric pumps with telemetry or short hop communications. By way of another example, the tractor 700 may be an electric tractor on wireline or coiled tubing.

Figure 7A:
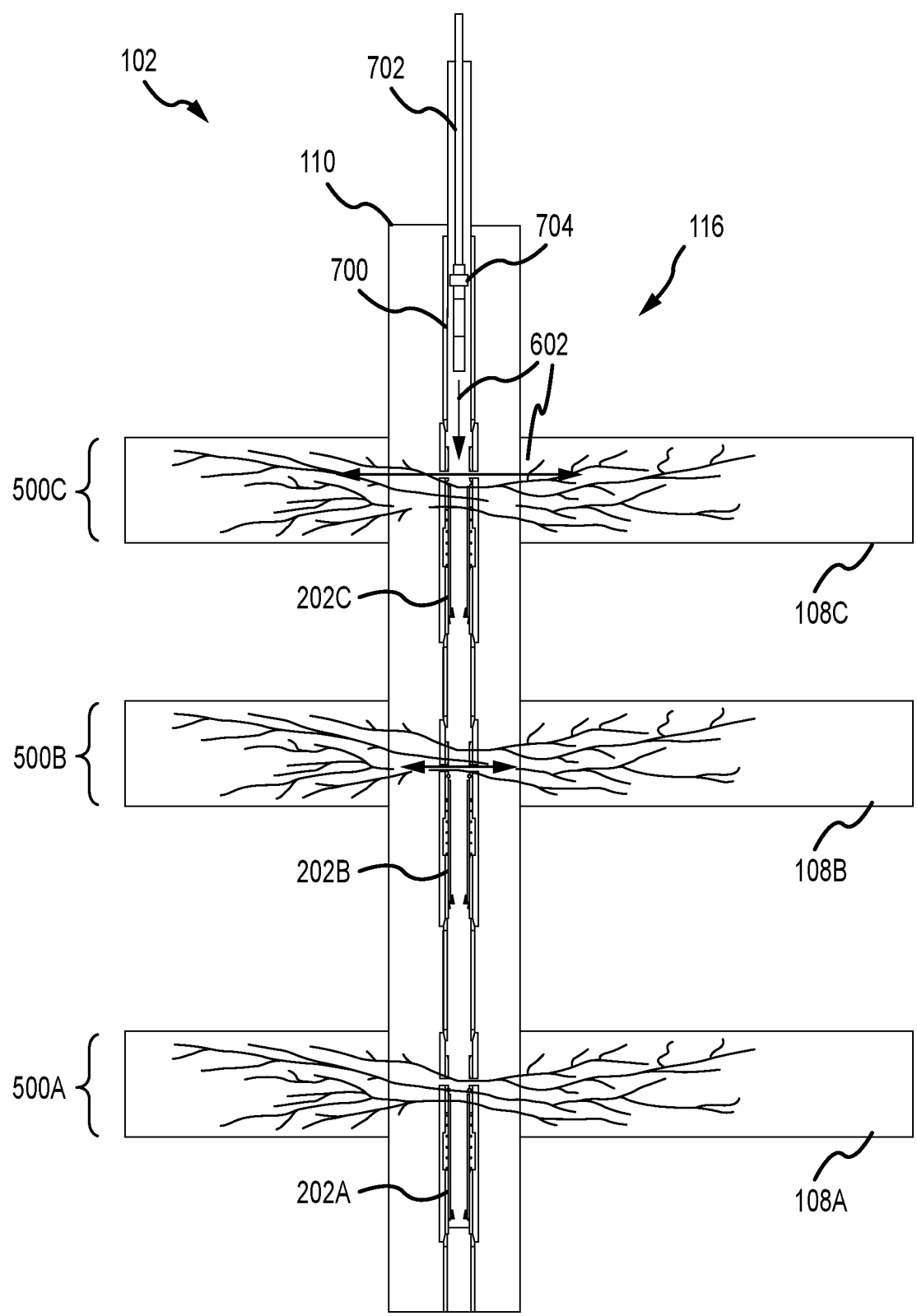
FIG. 7A depicts a top plan section view of a tractor engaging an open sleeve in an upper zone or stage of an injection wellbore of a subsurface heat exchanger, in accordance with one or more embodiments of the present invention.
Figure 7B:
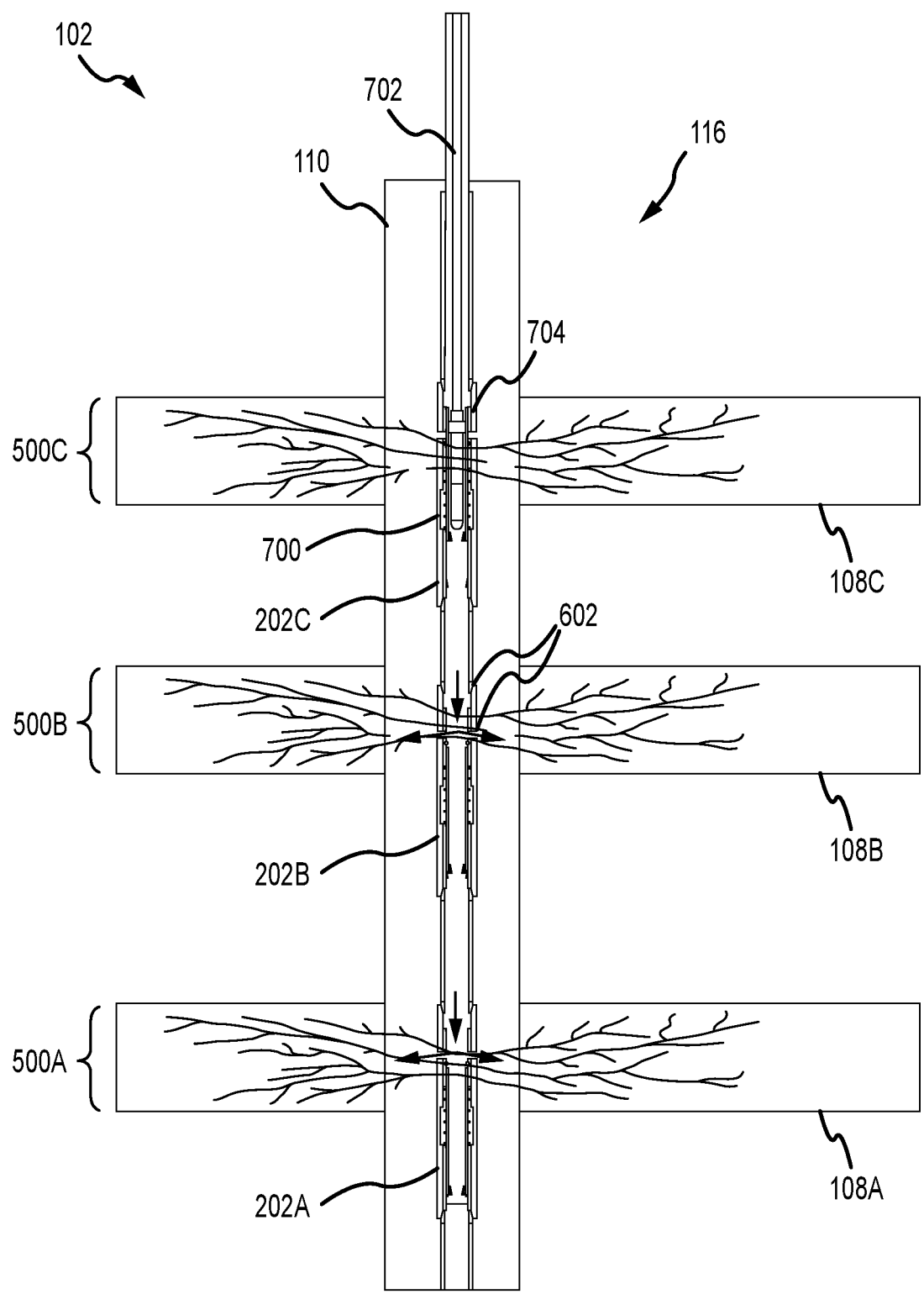
FIG. 7B depicts a top plan section view of a tractor closing an open sleeve by engaging and shifting the sleeve in an upper zone or stage of an injection wellbore of a subsurface heat exchanger, in accordance with one or more embodiments of the present invention.
Figure 8:
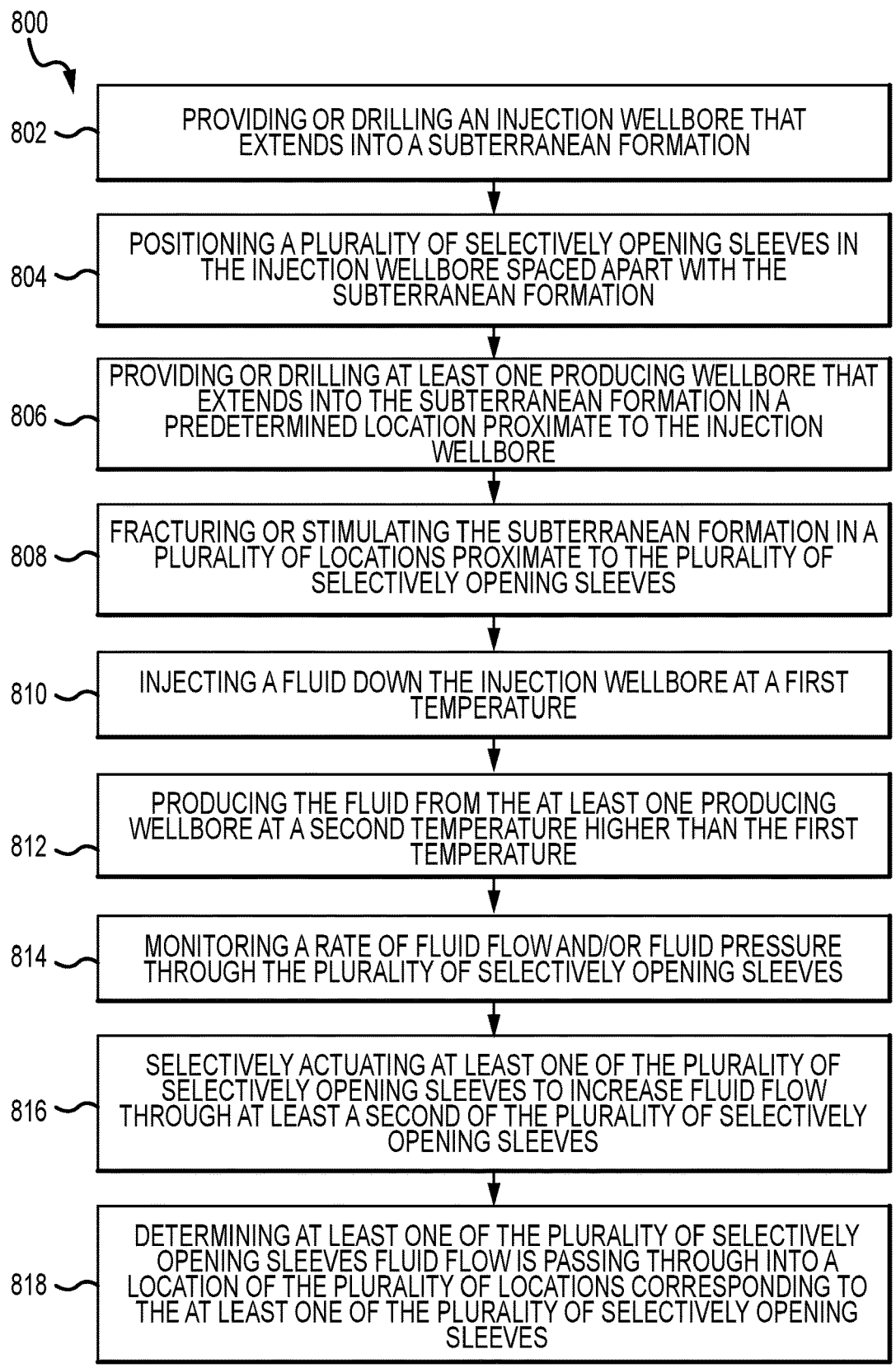
FIG. 8 is a method for harvesting geothermal energy from a subterranean formation, in accord with one or more embodiments of the present invention.

FIGS. 7A and 7B depict three sleeves 202 of an injection wellbore 110 of a subsurface heat exchanger 102 and the tractor 700, in accordance with one or more embodiments of the present invention. The tractor 700 may carry an apparatus with the capability to detect fluid injection and a shifting mechanism or assembly to allow opening and/or closing of frac sleeves 202 for plugging or choking of movement of fluid through the fractures 108 of the associated stages 500. The tractor may be electric, hydraulic, or a hybrid of the two. Although FIGS. 7A and 7B depict a top plan view of sleeves 202 used in horizontal laterals or sections 116 of the injection wellbore 110, it is noted that one of skill in the art would recognize the sleeves 202 may be deployed in vertical segments 114 of an injection wellbore 110. In addition, it is noted that one of skill in the art would recognize how those sleeves 202 may be deployed in a wellbore 110 using hydraulic or swell packers 300, or any other isolation medium that may be used between stages, and as such should not be interpreted as limiting on the present invention. In addition, although FIGS. 7A and 7B depict sleeves 202 used in horizontal laterals 116 injection wellbore 110, it is noted that one of skill in the art would recognized how the sleeves may be deployed in vertical or inclined wellbores, and as such should not be interpreted as limiting on the present invention.

As depicted in at least FIG. 7A, the tractor 700 may have an electronic package 704 connected to the surface with electric line fed through the coiled tubing 702, or jointed tubing with a wet connect, as known to one of skill in the art. The injection fluid 602 is pumped down the casing and exits the injection wellbore 110 at the first sleeve 202C identified as stage 500C. The tractor 700 may have a means to engage the sleeve 202 and shift it between the open position and the closed position (e.g., from the open position to the closed position, or from the closed position to the open position, and to or from any intermediate position), based on the flow analysis provided by the flowmeter (e.g., which has detected a short-circuiting flow in stage 500C).

As depicted in at least FIG. 7B, the tractor 700 has engaged the sliding sleeve 202C at stage 500C and closed it, forcing the injection fluid 602 to continue down the wellbore 110 to stages 500A and 500B. Other methods of shifting the sleeve 202, including pumping the shifting tool down the wellbore 110 with the high rate of injection to the "thief" sleeve(s) is contemplated with this invention, such that the tractor 700 and its illustrated use should not be interpreted as limiting on the present invention. The use of the tractor 700 and shifting tools to effect conformance control on the system from the injection wellbore 110 would allow the tractor 700 and electric tools to operate in a much cooler environment with less scaling and corrosion. Although embodiments of the present invention are directed to the use of tractors 700 and/or electric tools with cemented frac sleeves 202 in injection wellbores 110, it is noted that the tractors 700 and/or electric tools may be used where the producing wellbores 112 have cemented frac sleeves 200 to perform multi-stage stimulation and/or conformance control operations in producing wellbores 112 in a similar manner to those described for injecting wellbores 110, when taking into account the change in direction of fluid flow and temperature differences in the producing wellbores 112.

In this regard, the balls 402 (which may be dissolvable), the tractor 700, coiled tubing 702, and/or other sleeve shifting mechanism or assembly may operate as devices configured to address issues such as the two example states of operation as depicted in FIG. 6D (e.g., fluid only through stage 500B due to short-circuiting, and/or fluid only through stages 500G and 500H due to short-circuiting), by closing or opening sleeves 202 to adjust fluid flow and/or fluid pressure through stages 500 as desired. This may allow for optimizing the harvesting of geothermal energy, generation of electricity, and recirculation of fluid.

Although embodiments of the present invention describe open hole producing wellbores 112, it is noted that the producing wellbores 112 may be cased and/or may include sleeves 202 or other output control devices similar to the design of the injection wellbores 110 as described throughout the disclosure. In this regard, the open hole producing wellbores 112 should not be interpreted as limiting on the present invention.

A method 800 for harvesting geothermal energy, as performed by and/or on one or more components of the system 100 for harvesting geothermal energy as described in one or more embodiments throughout the present invention, includes one or more of the following steps. It is noted that any components of any system-level or apparatus-level embodiment of the present invention may be configured to perform one or more of the following steps or embodiments, and vice versa.

In some embodiments of the current invention, the method 800 may include, but is not limited to, a step 802 including providing or drilling an injection wellbore that extends into a subterranean formation. In some embodiments, the method 800 may include, but is not limited to, a step 804 including positioning a plurality of selectively opening sleeves in the injection wellbore 110 spaced apart with the subterranean formation, each of the plurality of selectively opening sleeves being actuatable between a respective open position and a respective closed position. In some embodiments, the method 800 may include, but is not limited to, a step 806 including providing or drilling at least one producing wellbore that extends into the subterranean formation in a predetermined location proximate to the injection wellbore. In some embodiments, the method 800 may include, but is not limited to, a step 808 including fracturing or stimulating the subterranean formation in a plurality of locations proximate to the plurality of selectively opening sleeves to enhance a fluid pathway between the injection wellbore and the at least one producing wellbore when the plurality of selectively opening sleeves are in the open position. The stimulating may include fracturing the subterranean formation by pumping fluid through an open sleeve at a fracture pressure. Additionally, or alternatively, the stimulating may comprise pumping the fluid through the open sleeve at a pressure that is less than the fracture pressure.

In some embodiments, the method 800 may include, but is not limited to, a step 810 including injecting a fluid down the injection wellbore at a first temperature. For example, the fluid may be a wellbore fluid. For instance, the fluid may include, but is not limited to, filtered water or carbon dioxide ($CO_2$). It is noted that $CO_2$ may be desirable if the systems and methods described herein are used for EOR operations in reservoirs including, but not limited to, shale reservoirs or coal bed methane (CBR) reservoirs, where the wellbores may be used for carbon storage and the sleeve system may be used to force a more efficient fluid distribution. In addition, the fluid may include additives such as, but not limited to, diverters to improve the fluid sweep in the reservoir in addition to the conformance control at the wellbores, corrosion control agents, and/or scale inhibitors.

By way of another example, the first temperature may be from a range of temperatures. For instance, the first temperature may be an ambient temperature ranging between 50 and 100 degrees Fahrenheit (° F.). In addition, the first temperature may be dependent on the flow coming from surface process equipment (e.g., may be driven by an outlet temperature of a powerplant discharge), which may adjust the range of temperatures to be within or outside of the ambient range. Further, the first temperature may be impacted by makeup water from a surface or subsurface source that may be cooler depending on the formation temperature, which may adjust the range of temperatures to be within or outside of the ambient range.

In some embodiments, the method 800 may include, but is not limited to, a step 812 including producing the fluid from the at least one producing wellbore at a second temperature higher than the first temperature. For example, the second temperature may be from a range of temperatures. For instance, the second temperature may range between 300 and 650° F. In addition, the second temperature may be dependent on the subsurface temperature and its decline, which may adjust the range of temperatures to be within or outside the above range. Further, the second temperature may be augmented by burning natural gas, coal, oil, or other fossil fuels to increase the temperature to a point where the surface process equipment (e.g., the powerplant) is at its most efficient, which may adjust the range of temperatures to be within or outside the above range. It is noted that augmenting the second temperature may be desirable in areas of the world where the subterranean formation is close to geothermal temperatures (e.g., sandstone reservoirs with great deliverability but too low of a temperature) and heat may be added to the produced fluid prior to entry to the process surface equipment (e.g., a turbine or other generator system). In addition, it is noted that augmenting the second temperature may supplement the heat from the produced wellbore fluid to optimize power generation. In general, it is contemplated that a combination of zero-emission geothermal and fossil fuel for power generation will cut the emissions of the resultant power generated on a power unit basis of fossil fuels burned to achieve that power generated.

In some embodiments, the method 800 may include, but is not limited to, a step 814 including monitoring a temperature, a rate of fluid flow, and/or fluid pressure through the plurality of selectively opening sleeves. For example, the temperature, may be monitored with sensors proximate to or integrated in the sleeves positioned within the wellbores, a temperature monitoring system within or proximate to the wellheads for the wellbores, within surface process equipment, or the like. By way of another example, the rate of fluid flow and/or the fluid pressure may be monitored with flowmeters proximate to or integrated in the sleeves positioned within the wellbores, a pressure monitoring system within or proximate to the wellheads for the wellbores, within surface process equipment, or the like.

In some embodiments, the method 800 may include, but is not limited to, a step 816 including selectively actuating at least one of the plurality of selectively opening sleeves to increase fluid flow through at least a second of the plurality of selectively opening sleeves to optimize the thermal efficiency and temperature gain between the injected fluid and the produced fluid. In some embodiments, the method 800 may include, but is not limited to, a step 818 including determining at least one of the plurality of selectively opening sleeves fluid flow is passing through into a location of the plurality of locations corresponding to the at least one of the plurality of selectively opening sleeves.

It is noted that any methods described throughout the disclosure may include more or fewer steps or embodiments than those described. In addition, it is noted that the steps or embodiments of any methods may be performed at any time (e.g., sequentially, concurrently, or simultaneously). Further, it is noted that the steps or embodiments of any methods may be performed in any order, including in an order as presented in the disclosure and/or an order other than that presented in the disclosure.

Figure 9:
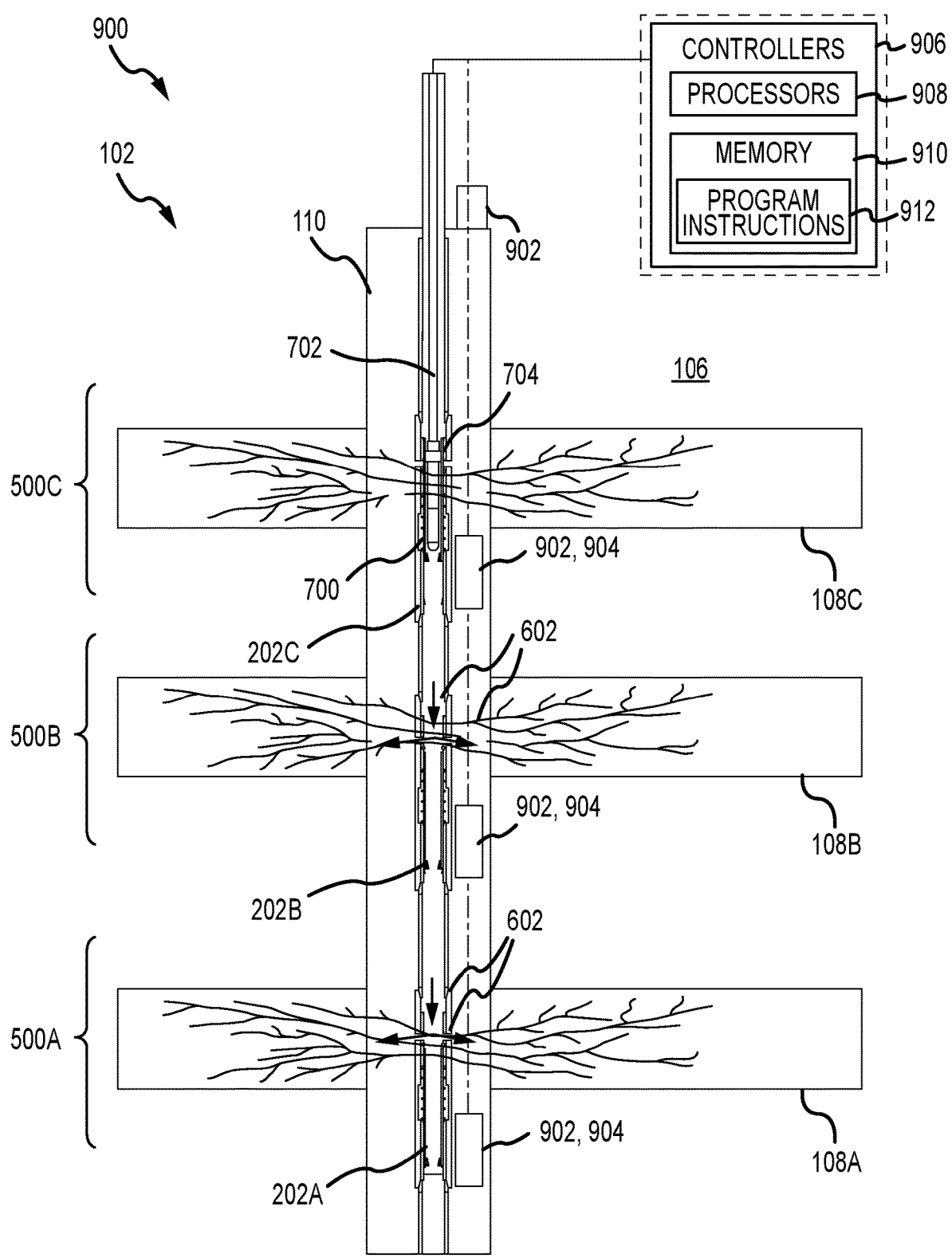
FIG. 9 depicts a control system for monitoring and controlling an amount of fluid pumped in each fracture zone or stage in a formation between an injection wellbore and a producing wellbore of a subsurface heat exchanger, in accordance with one or more embodiments of the present invention.

FIG. 9 depicts a control system 900 for monitoring and controlling an amount of fluid 602 pumped in each fracture 108 in a formation 106 between injection wellbores 110 and producing wellbores 112 (not illustrated in this figure) of the subsurface heat exchanger 102, in accordance with one or more embodiments of the present invention. It is noted one or more components of the control system 900 may be considered components of the surface process equipment 104, for purposes of the present disclosure.

The control system 900 may include one or more sensors 902. For example, the one or more sensors 902 may be at a surface location proximate to a wellhead of the injection wellbores 110 and/or the producing wellbores 112. By way of another example, the one or more sensors 902 may be proximate to the sleeves 202 within the injection wellbores 110 and the corresponding fractures 108 within the formation 106 and/or proximate to the fractures 108 within the producing wellbores 112. In one non-limiting example, the sensors may include, but are not limited to, a Distributed Acoustic Sensing (DAS) fiber, or the like.

The control system 900 may include one or more actuation devices 904 configured to open and closed the one or more sleeves 202. For example, the one or more actuation devices 904 may be proximate to the sleeves 202 within the injection wellbores 110 and the corresponding fractures 108 within the formation 106. It is noted the one or more actuation devices 904 may include the tractor 700 and/or components associated with the tractor 700, in accordance with embodiments of the present disclosure.

The control system 900 may include one or more controllers 906. For example, the controllers 906 may be integrated within surface process equipment 104 illustrated in FIG. 1. By way of another example, the controllers 906 may be operating as standalone devices within or separate from the surface process equipment 104. The one or more controllers 906 may include one or more processors 908 and memory 910. The processors 908 are configured to execute program instructions 912 maintained on or stored in memory 910 (e.g., a memory medium, memory device, or the like). It is noted that the one or more processors 908 of the one or more controllers 906 may execute and/or be configured to cause components in communication with the controllers 906 to execute any of the various process steps described throughout the present invention. For example, the one or more processors 906 may be configured to perform and/or configured to cause components in communication with the controllers 906 to perform any or all of the steps of the methods described through the present invention (e.g., including, but limited to, those of method 800).

Although not shown, the control system 900 may include a user interface coupled (e.g., physically coupled, electrically coupled, communicatively coupled, or the like) to the one or more controllers 906. For example, the user interface may be a separate device coupled to the one or more controllers 906. By way of another example, the user interface and the one or more controllers 906 may be located within a common or shared housing. It is noted, however, that the one or more controllers 906 may not include, require, or be coupled to the user interface.

The one or more controllers 906 may be configured to monitor an amount of fluid 602 pumped into each fracture 108 within the formation 106 via a pressure monitoring system of the control system 900. For example, the one or more controllers 906 may be configured to monitor the flow rate in each fracture 108 or stage 500. By way of another example, the one or more controllers 906 may be configured to monitor fluid pressure (including increase or drop in fluid pressure) in each fracture 108 or stage 500. By way of another example, the one or more controllers 906 may be configured to monitor temperature of fluid differential between the injection wellbore 110 and the producing wellbore 112 for each fracture 108 or stage 500.

The one or more controllers 906 may be configured to control components within the subsurface heat exchanger 102 and/or the surface process equipment 104. For example, the one or more controllers 906 may be configured to selectively open and close the sleeves 202 within the injection wellbores 110 via at least one of electrical energy or hydraulic energy. For instance, the sleeves 202 may be directly controlled via corresponding actuation devices 904, or may be controlled through use of a downhole tool or device such as the tractor 700 as described throughout the present invention. By way of another example, the one or more controllers 906 may be configured to operate surface process equipment 104 to extract energy from heated water 604 delivered from the at least one production wellbore 112 at a surface location located proximate to the wellhead. It is noted that the controlling may occur while monitoring and/or based on data generated during the monitoring.

The control system 900 is capable of optimizing the output of the EGS 100, where the output is harvested geothermal energy, gas, oil, or another intended production from the formation 106. In one non-limiting example, the controller 906 may receive information or data related to a measured pressure a measured temperature, a measured fluid volume being input into the subsurface heat exchanger 102, a measured fluid volume being output from the subsurface heat exchanger 102, a measured fluid volume within the formation 106, a measured fluid flow rate within the injection wellbore 110, a measured fluid flow rate within the production wellbore 112, and/or a measured fluid flow rate within the surface process equipment 104. In another non-limiting example, the controller 906 may receive information or data related to a position of a sleeve 202 and/or a tractor or other tool within the subsurface heat exchanger 102. Based on the received data, the controller 906 determines whether the EGS 100 is performing in an optimized state or mode of operation as defined by a range of pre-determined parameters related to pressure, temperature, fluid volume, fluid flow rate, or the like.

Where the controller 906 determines the EGS 100 is outside one or more of the range of pre-determined parameters (e.g., injection temperature too high, production temperature too low, injection fluid flow rate or production fluid flow rate too high or low, or the like) the controller 906 may execute one or more sets of program instructions to return the EGS 100 to within each of the range of pre-determined parameters. For example, the controller 906 may be capable of determining an adjustment for (and/or directly adjusting, being in communication with) an injection pressure, an injection temperature, an injection volume, an injection fluid flow rate, or the like through the injection wellbore 110. By way of another example, the controller 906 may be capable of determining an adjustment for (and/or directly adjusting, being in communication with) sleeve 202 position within the injection wellbore 110. For instance, the position of the sleeve 202 may be adjusted with either with the use of a tractor 700 or another tool, or with integrated actuators 904 in the sleeves 202 and/or the injection wellbore 110. Adjusting parameters related to the injection wellbore 110 may cause a corresponding change in the production wellbore 112; in this regard, the controller 906 may be considered as being capable of adjusting the production wellbore 112. By way of another example, the controller 906 may be capable of determining an adjustment for (and/or directly adjusting, being in communication with) components of the surface process equipment 104.

Utilizing a dual well subsurface heat exchanger 102 (e.g., one having both injection wellbores 110 and producing wellbores 112) and optimizing from which stages 500 geothermal energy is being harvested provides a number of additional benefits. For example, blocking earlier stages 500 (or stages closer to the toe of the injection wellbore 110) by engaging later fingers 400 with balls 402 when fracturing later stages 500 (or stages closer to the surface or heel of the injection wellbore 110) allows the subsurface heat exchanger 102 to drain pressure from the earlier stages 500 in the producing wellbore 112. Draining pressure allows for the stress from previous fractures 108 to continue to be relieved through the fracture to the producing wellbore 112. Draining pressure from the earlier stages 500 also allows for the recycling/re-circulating of previously-injected fluid immediately, as opposed to waiting for flowback from the well after the entire set of multi-stage fractures 108 are completed.

In one non-limiting example, pumping fifty frac stages 500 simultaneously results in at least 50 fractures pushing outward. The volume that is created pushes the rock volume outward, increasing stress in the rock, which remains until flowback of all fifty frac stages 500. In contrast, engaging earlier stages 500 as taught by the present invention allows the EGS 100 to begin flow back immediately, and additionally allows one to capture the produced water, recycle it, and recirculate it. It is contemplated that fluid recirculation would allow for a considerable reduction in amount of fluid used within the EGS 100, due to the potential for immediate re-use. In one non-limiting example, a process that does not capture, recycle, and recirculate water and frac fluid may need 10 million gallons of fluid to stimulate fifty stages. In contrast, an EGS 100 of the present invention of the same size may need only 3 million gallons of fluid to stimulate 50 stages when re-cycling and re-circulation is utilized.

Figure 10A:
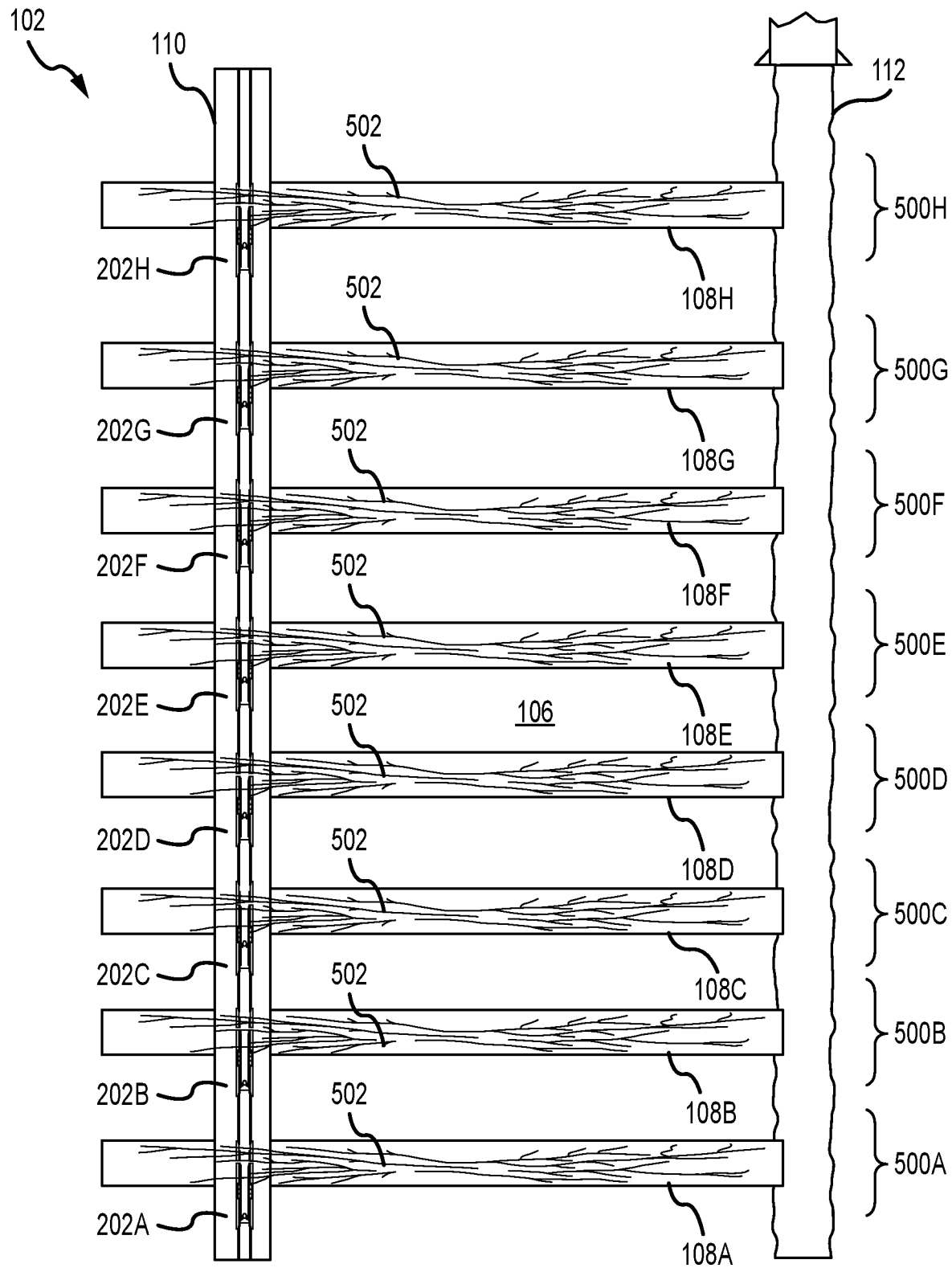
FIG. 10A depicts a top plan section view of fractured stages of a conventional fracture system with retained pressure in a surrounding formation.

FIG. 10A depicts a conventional fracture system including an injection well 110 coupled to a production well 112 via example fractures 108A-108H in respective stages 500A-500H (though the number 8 is non-limiting for purposes of the present disclosure). The wells 110, 112 could be cased and completed with cement in the casing annulus or packers for annular isolation outside of the casing. In one example, the injection wellbore 110 initiates the fracture stimulation stages to the production wellbore 112 (though it is contemplated that simulation could be conducted from the production wellbore 112 to the injection wellbore 110 without departing from the scope of the present disclosure).

It is recognized that not every fracture stage 500 may intersect with the production wellbore 112, and/or some of the fractures 108 may not have a great deal of conductivity between the wellbores 110, 112. Multiple perf clusters or frac sleeves 202 open per stage 500 may be employed to attempt overcome this. Additionally, or alternatively, diverters and a variety of other methods may be used to enhance the conductivity of the fractures 108 and the connectivity of the wellbores 110, 112 through the stimulated areas.

During multi-stage hydraulic fracturing, once stimulation of fractures in a stage is completed, the stage 500 is isolated with a barrier. The barrier may be a bridge plug (retrievable, composite, dissolvable or the like) or a frac sleeve actuated with a ball or other drop member. The isolation barrier traps the pressure and stimulation fluid 502 below that isolation barrier in the now isolated frac stage 500 which is still pressurized. The pressure and stimulation fluid will leak off into the surrounding rock and formation 106 depending on the permeability and fractures present in the formation 106. Unless the fractures or the formation 106 have a high permeability, a great deal of that pressure and fluid in the fractures 108 will not have leaked off during the subsequent stages of the multi-stage stimulation treatment and will occupy volume to prevent the closure of the fracture(s) 108. The volume that is occupied in FIG. 10A is represented by the rectangles (label number 1004) which have seen little leak-off, with any small leak being represented by essentially the same sized rectangles (label number 1004). This trapped fluid and pressure compresses the volumes between the frac stages 500, and increases the stress between in the formation 106 between the fractures 108 from the previous frac stages 500. The trapper fluid and pressure also increase the stress that subsequent frac stages 500 have to overcome, increasing possible seismicity.

Figure 10B:
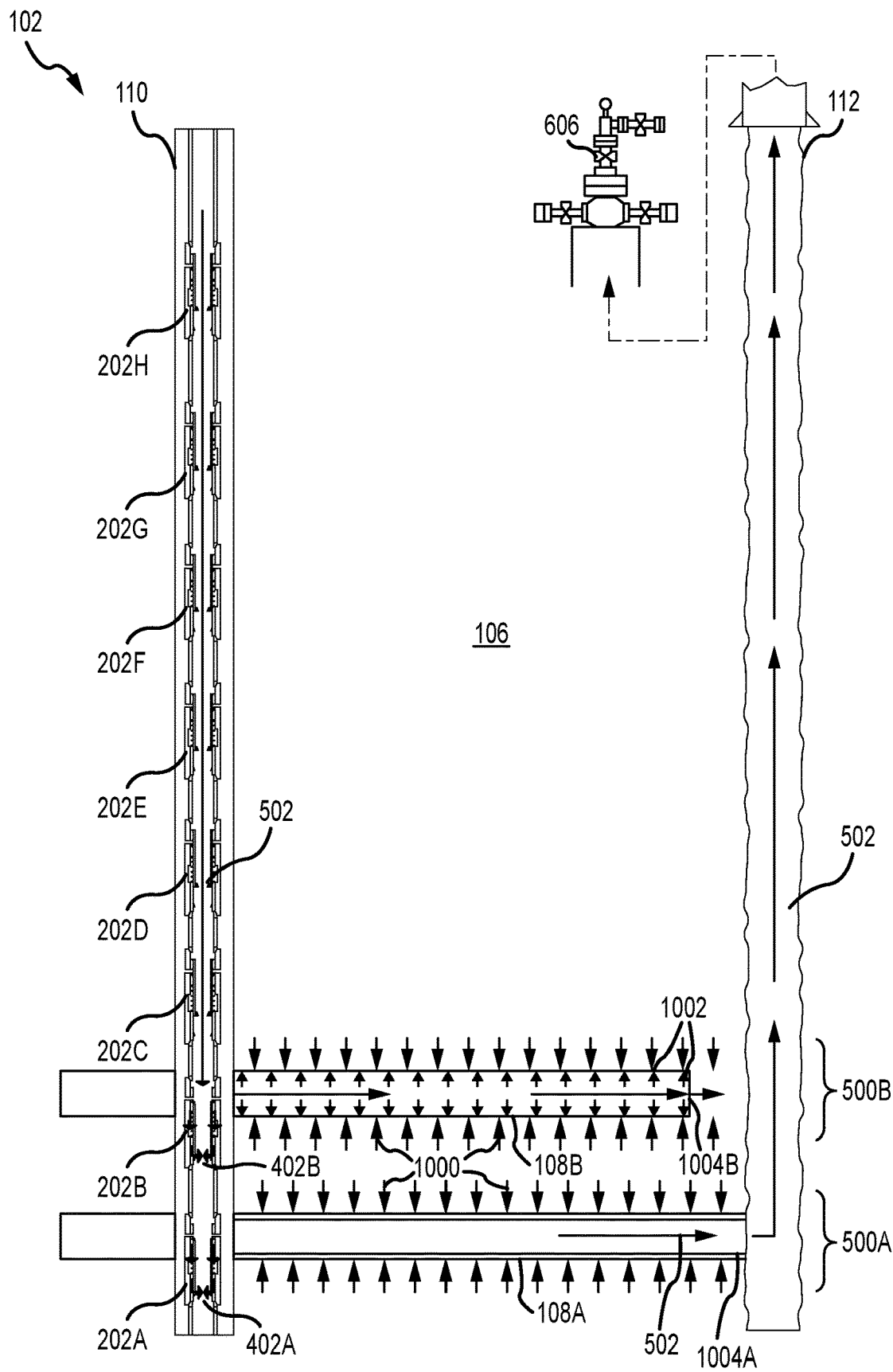
FIG. 10B depicts a top plan section view of stages being fractured in a formation between injection wellbores and production wellbores of a subsurface heat exchanger, according to one or more embodiments of the present disclosure.
Figure 10C:
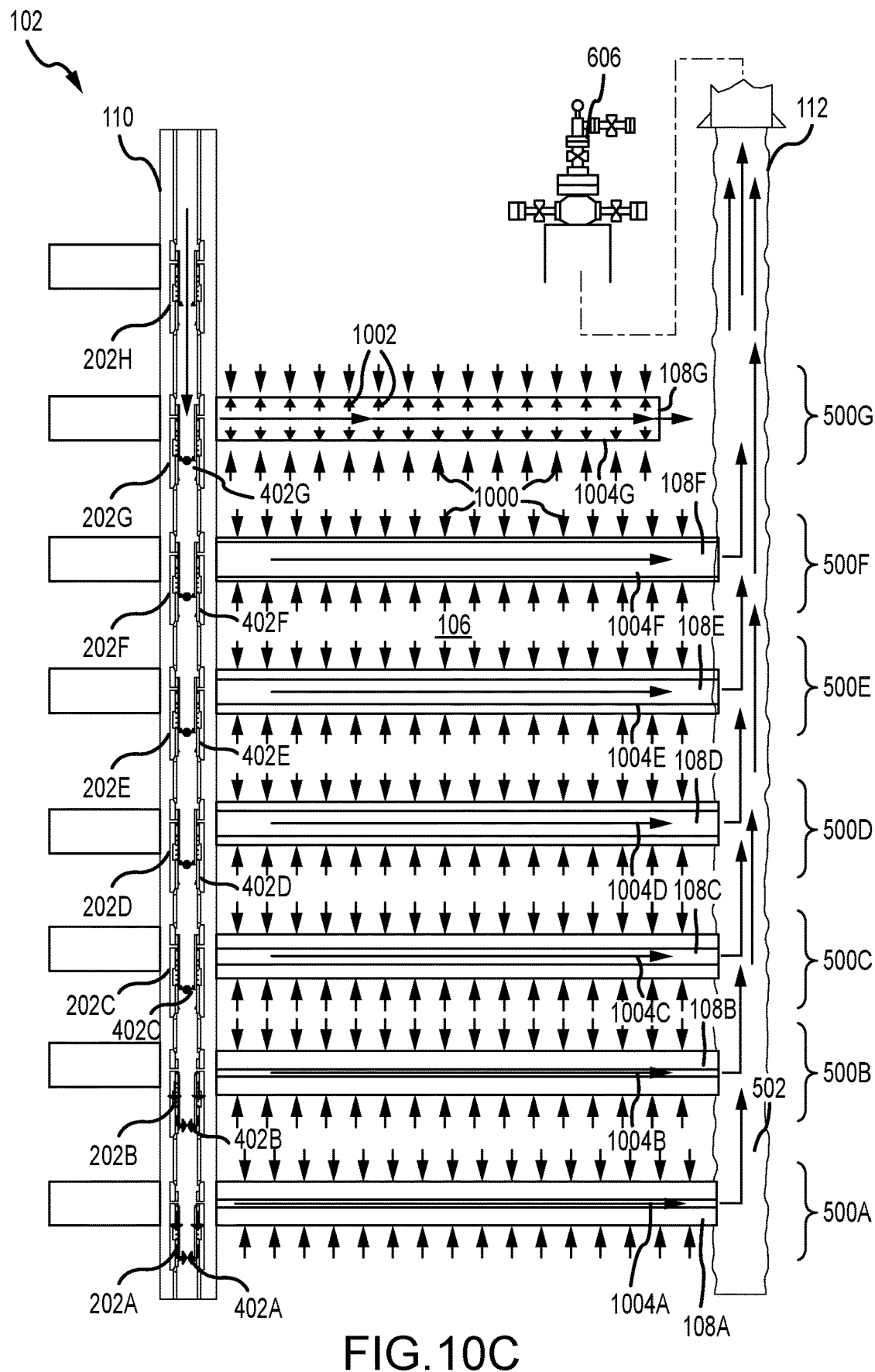
FIG. 10C is another top plan section view of stages being fractured in the subsurface heat exchanger of FIG. 10B, according to one or more embodiments of the present disclosure.

FIGS. 10B-10C depict example subsurface heat exchangers 102, in accordance with one or more embodiments of the present disclosure. It is noted the stages 500 in FIGS. 10B-10C may be the same stages or different stages from the stages 500 depicted in FIGS. 5A-5B. Although FIGS. 10B-10C depict a top plan view of sleeves 202 used in horizontal laterals or sections 116 of the injection wellbore 110, it is noted that one of skill in the art would recognize the sleeves 202 may be deployed in vertical segments 114 of an injection wellbore 110. In addition, it is noted that one of skill in the art would recognize how those sleeves 202 may be deployed in a wellbore 110 using hydraulic or swell packers 300, or any other isolation medium that may be used between stages, and as such should not be interpreted as limiting on the present invention. Although not shown, the embodiments depicted in FIGS. 10B-10C may include the various embodiments related to the control system 900 and its components, as described throughout the present disclosure.

In contrast to FIG. 10A, FIGS. 10B and 10C generally depict how the present invention assists with reducing the horizontal stresses in the formation. Specifically, the systems and methods of the present disclosure reduce induced seismicity risk and provide other benefits, such as: lowering the fluid pressure required for treating and stimulation of fractures; decreasing stress shadowing effects; and lowering the total volume of fracturing fluid needed by returning the fracturing fluid to the surface for active recycling during the stimulation.

FIG. 10B depicts a top plan section view of stages 500 being fractured in a formation 106 between injection wellbores 110 and production wellbores 112 of the EGS 100, according to one or more embodiments of the present disclosure. Two stages 500, which may be the first and second stages or could depict any two stages, are illustrated. Stimulation of stage 500A has been completed and a fracture network 108 extends from injection wellbore 110 to production wellbore 112. Stage 500B is undergoing stimulation with fracturing incomplete between the injection wellbore 110 and the production wellbore 112. For example, stage 500A is the last stage that has fracture stimulated, and stage 500B is the next stage that is isolated from the first stage during the stimulation by a ball 402B in the sleeve 202B which is in the open position.

While frac fluid 502 is pumped out of the open sleeve 202B at stage 500B and actively propagating the fracture 108B toward the production wellbore 112, stage 500A is isolated and does not receive additional frac fluid 502 from the surface. The fractures 108A are draining pressure into the production wellbore 112 and to the surface, where fluid 502 is available for recycling (thus potentially lowering the net volume of water needed for the stimulation). For purposes of the present disclosure, net water is defined as the water pumped into the injection wellbore 110 minus the water produced from the production wellbore 112. This water may need to be recycled in a water treatment facility or other components integrated within or in fluid communication with the surface process equipment 104, so water from previous stimulations, or makeup water could be used, and the produced water from the production wellbore 104 would be treated and would be available for subsequent fractures. The fracture 108B is being created in stage 500B but has not reached the production wellbore 112.

The lines of arrows 1000, 1002 in FIG. 10B, which are pointed in opposite directions at the interface of the fracture 108B face, indicate the formation horizontal pressure in one direction 1000 and the frac fluid 502 pushing the rock back and opening the fracture 108B in the other direction 1002.

In stage 500A, arrows that represent the stimulation fluid 502 are pointing through the induced fracture 108A toward the production wellbore 112. At the production wellbore 112, the fluid 502 leaves the fracture 108A, enters the production wellbore 112 and turns at a pre-determined angle (e.g., substantially 90 degrees, or a similar angle) to move along the lateral and eventually to the surface which is depicted with the wellhead. In some embodiments, the wellhead may be equipped with a pressure gauge 606 and a choke of some design to control the flow from the well to the surface facilities through flowlines connected to the wellhead.

Stages 500A and 500B each have rectangles 1004 that represent an amount of time the respective stage 500 has had to drain (and subsequent amount of the respective fractures 108 have closed). For example, the stage 500A rectangle 1004A is smaller than the rectangle 1004B in stage 500B, as stage 500A has been bleeding fluid 502 into the production wellbore 112 and stage 500B (not being fully fractured) has not started bleeding fluid 502.

FIG. 10C depicts a top plan section view of stages 500 being fractured in a formation 106 between injection wellbores 110 and production wellbores 112 of the EGS 100, according to one or more embodiments of the present disclosure. Seven stages 500, which may be the first seven stages or could depict any seven stages, include stages 500A-500F that are fractured and a stage 500G that is undergoing fracturing between the injection wellbore 110 and the production wellbore 112. For example, stage 500F is the last stage for which stimulation has been completed, and stage 500G is the next stage undergoing stimulation that is isolated from prior stages 500A-500F by a ball 402F in the sleeve 202F which is in the open position.

While stage 500G is being stimulated and actively propagating the fracture 108G toward the production wellbore 112, stages 500A-500F are isolated but are draining pressure into the production wellbore 112 and to the surface, where fluid 502 is available for recycling (thus potentially lowering the net volume of water needed for the stimulation). The fracture 108G being created in stage 500G has not yet reached the production wellbore 112. In stages 500A-500F, horizontal pressure in the formation 106 is represented by arrows 1000. Stage 500G has horizontal pressure represented by the arrows 1000 and countering pressure from the frac fluid 502 pushing the rock back and opening the fracture 108G in the other direction as represented by the arrows 1002.

In stages 500A-500F, arrows that represent the stimulation fluid 502 are pointing through the respective fractures 108A-108F toward the production wellbore 112. At the production wellbore 112, the fluid 502 leaves the fractures 108A-108F, enters the production wellbore 112 and turns at a pre-determined angle (e.g., substantially 90 degrees, or a similar angle) to move along the lateral and eventually to the surface.

Stages 500A-500G each have rectangles 1004 that represent an amount of time the respective stage 500 has had to drain (and subsequent amount of the respective fractures 108 have closed). For example, the rectangles 1004A-1004H are progressively smaller from stage 500A (the smallest) to stage 500G (the largest), which represents the progressively longer time that each stage 500 has to drain and the closing of the respective fracture 108 by the formation stress that is pushing fluid through the fracture 108 to the lower pressure sink of the open hole of the production wellbore 112, which is acting as a pressure relief for all the stages 500. Stages 500A-500F have been bleeding fluid 502 into the production wellbore 112 and stage 500G (not being fully fractured) has not started bleeding fluid 502.

Although FIGS. 10B and 10C include sleeves 202, it is noted that FIGS. 10B and 10C may also represent two wellbores that are undergoing "perf and plug" type stimulations as well, though an open hole lateral in the second well would facilitate the intersection and interwell communication between the wells, without departing from the scope of the present disclosure.

As seen in a comparison of FIG. 10A versus 10B and 10C, the bleeding from the fractures 108 into the production wellbore 112 is actively reducing the volume of fractures 108 filled with fluid 502. This allows the fracture 108 to close and relieves stress on the formation 106 rock between the fracture stages 500 which is compressed by the fractures 108 at both horizontal boundaries for the rock between the fractures 108. The operator can take advantage of this by adjusting the rate at which he is pumping the frac fluid and decreasing the time between frac fluid pumping as the pressure declines in the fractures 108, lowering the horizontal stresses in the rock into which the fractures must be pumped. This may lower the stress shadowing affects, which the operator can adjust based on the rate flowing through the choke on the wellhead at the surface.

It is contemplated that draining pressure is useful for both geothermal energy harvesting and for oil and gas production and shale development wells, as the pressure draining or bleeding into the producing wellbore 112 addresses water issues and reduces the conditions for induced seismicity. For example, excess pressure being retained within the formation 106 may delay the fracking process. By way of another example, shale producers are completed in hard formations like chalks or carbonates, but could be left open hole and/or include components similar to liners with sleeves and open hole packers. The pressure draining or bleeding may be accomplished with perforated completions or sleeves, allowing for extension of the technology from EGS to shale wells.

In one embodiment of the present disclosure, passing fluid through the fractures 108 that are induced from the injection wellbore 110 is feasible with control of the sleeves 202 in the various stages 500. This control also allows for the possibility of a single wellbore variation of the EGS 100 that is an improvement of cyclical injection technologies (e.g., such as "Huff and Puff" technologies for shale wellbore), to allow for production of oil and gas.

Figure 11A:
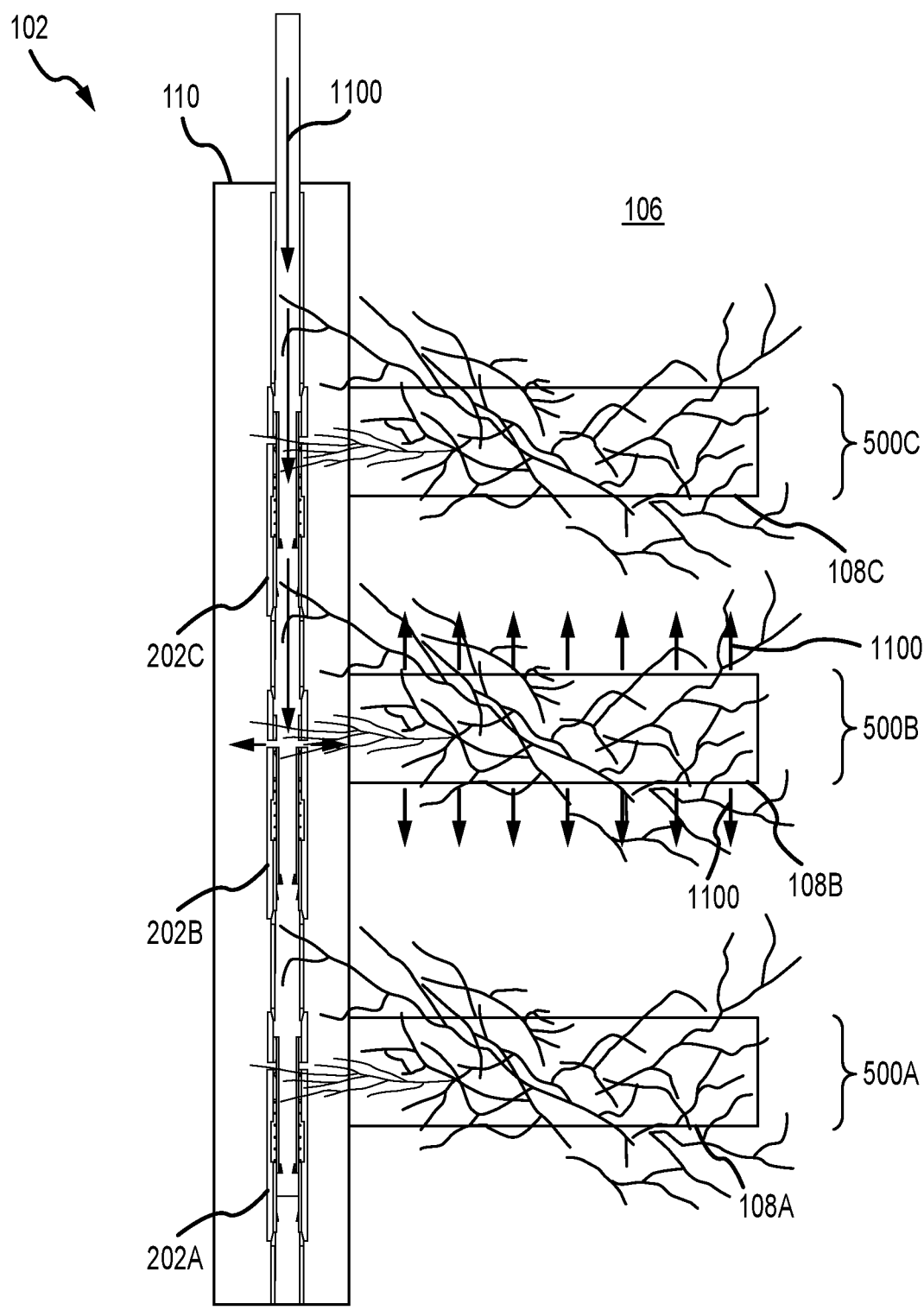
FIG. 11A depicts a top plan section view of fluid pumped through an open sleeve of an injection wellbore into a fracture in a medial zone or stage, in accordance with one or more embodiments of the present invention.
Figure 11B:
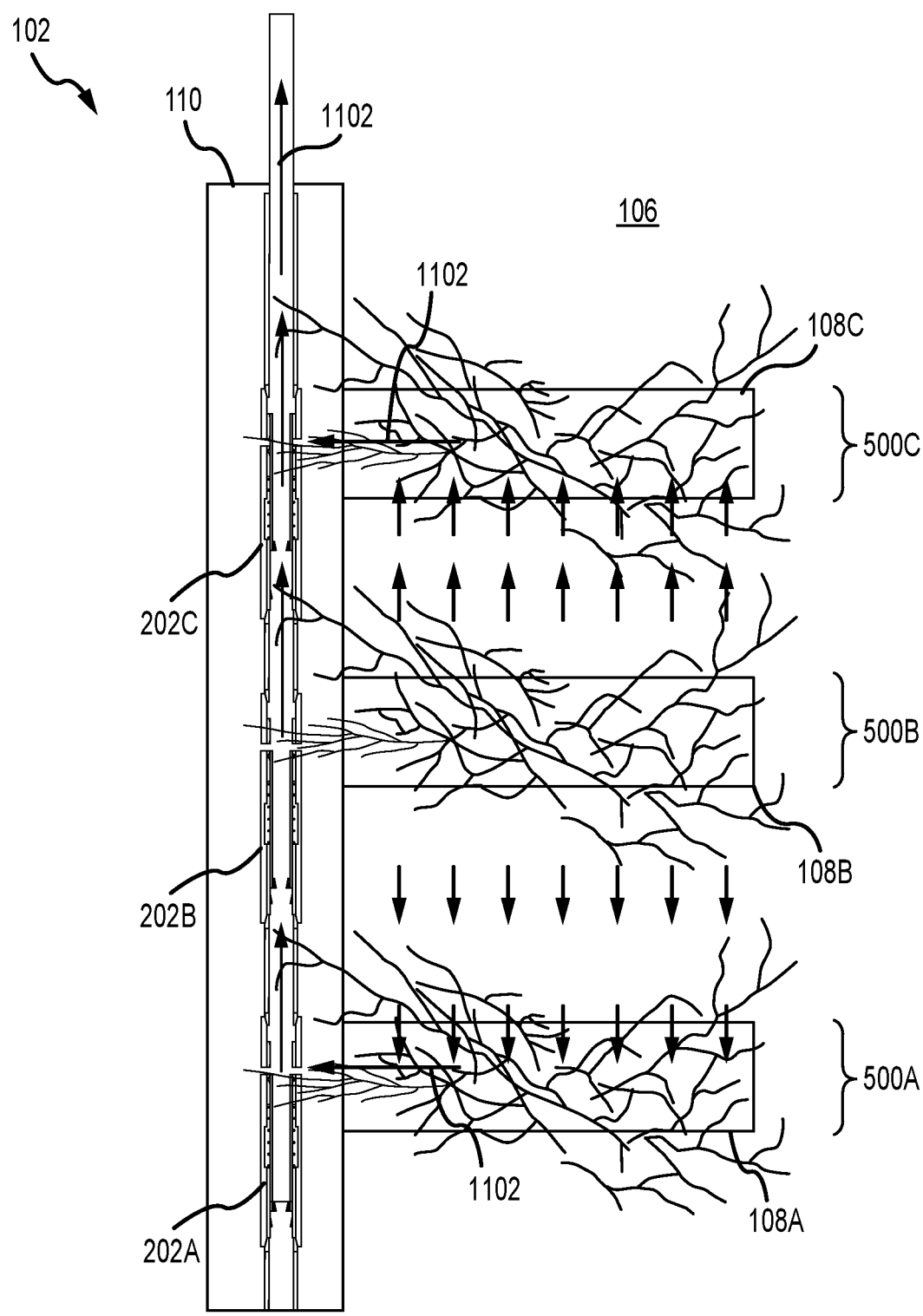
FIG. 11B is another top plan view of the injection wellbore of FIG. 11A with fluid exiting fractures in at least one lateral zone or stage, in accordance with one or more embodiments of the present invention.

FIGS. 11A and 11B depict frac fluid pumped through open sleeves 202 of an injection wellbore 110 and through fractures 108 in a formation 106, in accordance with one or more embodiments of the present invention. It is noted the stages 500 in FIGS. 11A and 11B may be the same stages or different stages from the stages 500 depicted in FIGS. 5A-5B. Although FIGS. 11A and 11B depict a top plan view of sleeves 202 used in horizontal laterals or sections 116 of the injection wellbore 110, it is noted that one of skill in the art would recognize the sleeves 202 may be deployed in vertical segments 114 of an injection wellbore 110. In addition, it is noted that one of skill in the art would recognize how those sleeves 202 may be deployed in a wellbore 110 using hydraulic or swell packers 300, or any other isolation medium that may be used between stages, and as such should not be interpreted as limiting on the present invention. Although not shown, the embodiments depicted in FIGS. 11A and 11B may include the various embodiments related to the control system 900 and its components, as described throughout the present disclosure.

As generally depicted in FIGS. 11A and 11B, fractures 108 have propagated within the formation 106 for the stages 500A-500C. However, while the fractures 108 are part of a fracture network, the fractures 108 do not extend to a production wellbore 112.

As depicted in FIG. 11A, the sleeve 202A of stage 500A and the sleeve 202C of stage 500C are closed (e.g., with the assistance of a tractor 700 and/or internal components of the sleeves 202, as described throughout the present disclosure). Injected fluid 1100 enters into fracture 108B of stage 500B via the open sleeve 202B. For example, the injected fluid 1100 includes an enhanced recovery liquid or a secondary fluid such as $CO_2$ or an engineered natural gas. The formation 106 is loaded with the injected fluid 602 via stage 500B. It is noted that the sleeves 202A, 202C may not need to be closed, including when the fracture 108B offers a path of lesser resistance than the respective fractures 108A, 108C. As such, the discussion regarding sleeve closure should not be interpreted as limiting to the scope of the present disclosure.

As depicted in FIG. 11B, the sleeve 202B is closed, and the sleeves 202A and 202C are opened (e.g., with the assistance of a tractor 700 and/or internal components of the sleeves 202, as described throughout the present disclosure). The pressure of the injected fluid 1100 within the formation 106 will cause a produced fluid 1102 to enter the fracture 108A of the stage 500A and the fracture 108C of the stage 500C from the formation 106. For example, the produced fluid 1102 may include an oil, a gas, and/or a mixture of the injected fluid 1100 and the oil or gas. As the sleeves 202A, 202C are open, the produced fluid 604 will exit the respective fractures 108A, 108C into the injection wellbore 110. In this regard, the injection wellbore 110 also operates as a producing wellbore 112.

Although FIGS. 11A and 11B only depict three fractures 108A-108C, it is noted there could be any number of fractures 108 and corresponding stages 500 without departing from the scope of the present disclosure. For example, there could be 100 sleeves 202, with 50 open and 50 closed at any given time. In addition, it is noted that the EGS 100 is not limited to alternating openings/closings of the sleeves 202. For example, every 2 sleeves could be opened and 5 sleeves are closed, and/or any number of combinations or time periods are possible.

It is noted that the embodiments directed to geothermal energy harvesting throughout the present disclosure may also be usable for Enhanced Oil Recovery (EOR) in shale wells, parallel horizontal wells, and lower permeability wells with matrix permeabilities that do not allow for the use of proximate wells or a dual wellbore system. Cyclic injection allows $CO_2$ or other fluid to be used in a more conventional EOR flood by pumping fluid into alternating frac stages. This potentially minimizes the distance the EOR fluid must travel in the reservoir matrix and maximizes the contact time and area, as the distance between adjacent wellbores 110, 112 is likely much greater than the distance between adjacent fracture stages 500. The casing sleeves 202 allow the EOR fluid ($CO_2$, engineered gas mixtures or other EOR fluid systems) to be pumped into alternating fracture stages by leaving, for example, every other sleeve 202 open, using a tractor 700 or other shifting tool to manipulate the sleeves to provide whatever flood pattern would be desired between fractures 108. The advantage of this method compared to packers 300 is that the same sleeves 202 that are used for fracturing are also used for EOR injection. In contrast, packers 300 with tubing would need a great number of packers to provide the same number of unique injection points, and a much more complex workover would need to be used to prepare the injection wellbore 110.

In one non-limiting example, two oil and gas horizontal wells, such as shale wells completed in harder shale formations (e.g., Chalk of the Niobrara, Carbonates, or the like) that are targeted and are brittle to stimulation, may be parallel and connected by fractures. These shale formations are traditionally installed with "packer plus" style completions, with hydraulic packers 300 for sealing each stage 500 off from another and telescoping frac sleeves 202 for the stimulation. The wellbores can be open hole between the packers 300 and not collapse, as leaving a completion as open hole in a shale formation may not result in undue sloughing and spalling of the formation 106.

In this invention, however, it is not required to complete the production wellbore 112 and instead can leave it open hole, while still allowing the formation 106 to produce oil and gas. This would allow the production wellbore 112 to take advantage of the fractures 108 that were induced from the injection wellbore 110, with no additional costs for stimulation of the fractures 108. The producing wellbore 112 being open hole may facilitate the flow of recovery fluid from the fractures 108 and into the wellbore 112, as the fractures 108 will close due to internal horizontal stresses. The recovery fluid that exits the formation 108 into the production wellbore 112 may also include oil and gas. It is noted a pump may be used to assist in lifting the mixture of recovery fluid and oil or gas from the production wellbore 112.

Although embodiments of the present disclosure are directed to movable sleeves 202 within the injection wellbore 110, it is noted that the EGS 100 may utilize "Plug and Perf" technology in the injection wellbore 110. For example, a first stage 500 closer (or closest) to the toe of the injection wellbore 110 may be fractured through the formation 106 to the production wellbore 112. A cement plug may then be set, similar to the dropping of the ball 402 to engage the fingers 400 in a sleeve 202, and a new stage 500 closer to the surface or the heel of the injection wellbore 110 may then be fractured. This process may continue until all stages 500 have been fractured (or a subset as necessary), at which point the cement plugs are drilled out as desired to reinstitute the flow of injected fluid through the various stages. Pressure drain or bleed through the fractures 108 of the stages 500 isolated by the cement plugs and into the production wellbore 112 will occur, such that the stages 500 will be ready to accept new injected fluid for additional geothermal energy harvesting following the drilling of the cement plug.

In addition, it is contemplated that the embodiments of the present disclosure may be modified, combined, or implemented with one or more of enhanced geothermal systems (EGS), fracture carbonate use, share development, enhanced oil recovery (EOR), and carbon capture, utilization, and storage without departing from the scope of the present disclosure.

In this regard, the monitoring and controlling of the subsurface heat exchanger 102 and surface process equipment 104 may provide a solution for a long-felt but unmet need to create an optimized fluid flow, thermal efficiency, and/or temperature gain when harvesting heat from the subterranean formation 106. Given the potential for complexity when monitoring and controlling the casing sleeves 202 within the injection wellbores 110 and/or the producing wellbores 112 to ensure fluid conformance, the present invention is more than simply a variation of use of a technology in a different field. As such, the monitoring and controlling allow for a focused harvesting of heat at different locations within the subterranean formation 106, which should be considered non-obvious to try and understood to provide unpredictable or unexpected results.

Advantages of the present invention include a novel multi-stage fracturing system and method with casing frac sleeves 202 actuated by balls 402 that reduces or eliminate a need for expensive packers 300 (though packers may still be put into use with the frac sleeves 202). In this manner, systems and methods of the present disclosure provide a scalable, rapid, and economical multi-stage fracturing technology for EGS environments. Advantages of the present invention also include a novel approach using casing sleeves 202 adapted for use during stimulation and for control of fluid through the subsurface heat exchanger 102. A wellbore tractor 700 used to control conformance in injection wellbores 110 minimizes the need to complete producing wellbores 112, which provides an economical technology for effective conformance control. Advantages of the present invention also include the use of pressure analysis to monitor fractures in geothermal wells, which provides a novel, low-cost technology to detect fractures arrivals in open hole producing wellbores 112.

While various embodiments of the system and method have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting. Further, it is to be understood that the claims are not necessarily limited to the specific features or steps described herein. Rather, the specific features and steps are disclosed as embodiments of implementing the claimed system and method.

What is claimed is:

1. A method of harvesting geothermal energy in a subterranean formation, comprising:

providing an injection wellbore that extends into the subterranean formation;

positioning a plurality of selectively opening sleeves in the injection wellbore spaced apart within the subterranean formation, each of said plurality of selectively opening sleeves being actuatable between an open position and a closed position, wherein said plurality of selectively opening sleeves are threadably connected to a casing string, and wherein at least some of said plurality of selectively opening sleeves are encased in cement;

providing at least one producing wellbore that extends into the subterranean formation in a predetermined location proximate to said injection wellbore;

fracturing said cement encasing said selectively opening sleeves and fracturing the subterranean formation in a plurality of locations proximate to the plurality of selectively opening sleeves to enhance a fluid pathway between said injection wellbore and said at least one producing wellbore when said plurality of selectively opening sleeves are in the open position;

injecting a fluid down said injection wellbore at a first temperature, wherein said injected fluid harvests geothermal energy from the subterranean formation as it flows through the fluid pathway to said at least one producing wellbore; and producing a heated fluid from said at least one producing wellbore at a second temperature higher than said first temperature.

2. The method of claim 1, further comprising:
monitoring, at a surface location proximate to the at least one producing wellbore, a rate of fluid flow of said injected fluid through said plurality of selectively opening sleeves; and
selectively opening or closing at least one of said plurality of selectively opening sleeves to adjust fluid flow of said injected fluid between said injection wellbore and said at least one producing wellbore to optimize the thermal efficiency and temperature gain between said injected fluid and said heated fluid.

3. The method of claim 1, further comprising:
monitoring, at a surface location proximate to the at least one producing wellbore, at least one of a temperature or fluid pressure drop at different locations of one or more of said injection wellbore and said at least one producing wellbore to determine which of said plurality of selectively opening sleeves should be in the open position or the closed position to optimize fluid flow between said injection wellbore and said at least one producing wellbore.

4. The method of claim 1, further comprising:
directing said injected fluid into fractures associated with said plurality of locations corresponding to at least one of said plurality of selectively opening sleeves.

5. The method of claim 4, wherein at least one of said plurality of selectively opening sleeves is actuated from the closed position by pumping a ball down the injection wellbore into a catch assembly of said at least one of said plurality of selectively opening sleeves at a first fluid pressure, wherein said catch assembly is operable to allow a downhole tool to pass through said catch assembly and travel to a second selectively opening sleeve located downhole of said at least one of said plurality of selectively opening sleeves with said catch assembly.

6. The method of claim 5, wherein said catch assembly is configured to pass said ball through said catch assembly of said at least one of said plurality of selectively opening sleeves when a second fluid pressure that is higher than the first fluid pressure is applied to the ball, wherein the injected fluid is allowed to continue downhole in said injection wellbore after said ball passes through said catch assembly.

7. The method of claim 6, wherein a diameter of said ball is configured to decrease based on one or more of time or a chemistry of said injected fluid, wherein after said ball diameter decreases by a predetermined amount, said ball can pass through said catch assembly located on said at lest one of said plurality of selectively opening sleeves.

8. The method of claim 4, wherein at least one of said plurality of selectively opening sleeves is actuated between the open position and the closed position with a downhole tool selectively positioned with coiled tubing or a downhole tractor driven with electrical energy or hydraulic energy.

9. The method of claim 1, further comprising:
monitoring at a surface location proximate to the at least one producing wellbore, via a control system including one or more sensors, an effectiveness of fluid flow through the subterranean formation; and
adjusting the opening and closing of said plurality of selectively opening sleeves to optimize at least one of an amount of said fluid being injected into said injection wellbore, an amount of said heated fluid produced by said at least one producing wellbore, and a temperature differential between said first temperature of said fluid injected into said injection wellbore and said second temperature of said heated fluid produced by said at least one producing wellbore.

10. The method of claim 9, wherein said control system further comprises a pressure monitoring system operable to:
determine, at a surface location proximate to the at least one producing wellbore, a rate of fluid flow through one or more stages in the subterranean formation defined by fractures associated with said plurality of locations; and
optimize said rate of fluid flow and said second temperature of said heated fluid by selectively opening and/or closing at least one of said plurality of selectively opening sleeves.

11. The method of claim 9, further comprising:
opening or closing said plurality of selectively opening sleeves with a downhole tool driven by electrical energy or hydraulic energy.

12. The method of claim 1, further comprising:
extracting energy from said heated fluid delivered from said at least one producing wellbore at a surface location proximate to a wellhead of said at least one producing wellbore,
wherein said fluid is injected down said injection wellbore at said first temperature by at least a first surface component at the surface location, and
wherein said heated fluid is received or extracted from said at least one producing wellbore at said second temperature by at least a second surface component at the surface location, and
wherein said energy is extracted from said heated fluid by said at least a second surface component.

13. The method of claim 1, wherein the fracturing of the subterranean formation in the plurality of locations proximate to the plurality of selectively opening sleeves further comprises:
injecting a first amount of fracturing fluid through a first selectively opening sleeve of said plurality of selectively opening sleeves, wherein said first selectively opening sleeve is at a first location, wherein said first location is a first distance from a toe of said injection wellbore;
engaging a second selectively opening sleeve of said plurality of selectively opening sleeves, wherein said second selectively opening sleeve is at a second location, wherein said second location is a second distance from said toe of said injection wellbore, wherein said second distance is greater than said first distance, and wherein engaging said second selectively opening sleeve isolates said first selectively opening sleeve within said injection wellbore;
injecting a second amount of fracturing fluid at said second location that is said second distance from said toe of said injection wellbore; and
producing said first amount of fracturing fluid via said at least one producing wellbore to reduce pressure in the subterranean formation while said second amount of fracturing fluid is being injected at said second location.

14. A system for harvesting geothermal energy from a subterranean formation and extracting said harvested geothermal energy at a surface location, comprising:
an injection wellbore provided in the subterranean formation;
a plurality of selectively opening sleeves positioned in the injection wellbore and spaced apart within the subterranean formation, each of said plurality of selectively opening sleeves having an open position to inject fluid into the subterranean formation and a closed position to prevent the injection of said fluid into the subterranean formation, wherein at least some of said plurality of selectively opening sleeves are coupled to and in line with a casing string within the injection wellbore, and wherein at least some of said plurality of selectively opening sleeves are encased in cement prior to a fracturing of the subterranean formation; and at least one producing wellbore provided in the subterranean formation in a predetermined location proximate to said injection wellbore, wherein said cement encasing said selectively opening sleeves and the subterranean formation are fractured in a plurality of locations proximate to said plurality of selectively opening sleeves to enhance a fluid pathway between said injection wellbore and said at least one producing wellbore when said plurality of selectively opening sleeves are in the open position, wherein said at least one producing wellbore is configured to produce a heated fluid at a second temperature higher than a first temperature of said injected fluid.

15. The system of claim 14, further comprising:

a control system to monitor the effectiveness of fluid flow through the subterranean formation and adjust the opening and closing of said plurality of selectively opening sleeves to optimize at least one of an amount of said fluid being injected into said injection wellbore, the amount of heated fluid produced by said at least one producing wellbore, and a temperature differential between said first temperature of said fluid injected into said injection wellbore and said second temperature of said heated fluid produced by said at least one producing wellbore.

16. The system of claim 15, said control system further comprising a pressure monitoring system that determines, at a surface location proximate to the at least one producing wellbore, a rate of fluid flow through one or more stages in the subterranean formation, said control system being operable to adjust the rate of fluid flow through said plurality of selectively opening sleeves to optimize the harvesting of geothermal energy, wherein each of said stages is associated with a sleeve of said plurality of selectively opening sleeves.

17. The system of claim 14, wherein said plurality of selectively opening sleeves can be opened or closed with a downhole tool driven by electrical energy or hydraulic energy.

18. The system of claim 14, wherein said system is configured to extract energy from said heated fluid delivered from said at least one producing wellbore at a surface location proximate to a wellhead of said at least one producing wellbore, the system further comprising:

at least a first surface component at the surface location configured to inject said fluid down said injection wellbore at said first temperature; and at least a second surface component at the surface location configured to receive said heated fluid produced or extracted from said at least one producing wellbore at said second temperature and extract energy from said heated fluid, wherein said energy is extracted from said heated fluid by said at least a second surface component.

19. The system of claim 14, wherein the plurality of selectively opening sleeves comprise:

a first selectively opening sleeve of said plurality of selectively opening sleeves, wherein said first selectively opening sleeve is at a first location which is a first distance from a toe of said injection wellbore; and a second selectively opening sleeve of said plurality of selectively opening sleeves, wherein said second selectively opening sleeve is at a second location which is a second distance from said toe of said injection wellbore, wherein said second distance is greater than said first distance;

wherein the first selectively opening sleeve has a first open position to permit a first amount of fracturing fluid to flow into a first fracture network associated with the first selectively opening sleeve, wherein the second selectively opening sleeve is configured to be blocked to isolate the first selectively opening sleeve within said injection wellbore, wherein the second selectively opening sleeve has a second open position to permit a second amount of fracturing fluid to flow into a second fracture network associated with the second selectively opening sleeve such that said at least one producing wellbore is capable of producing said first amount of fracturing fluid to reduce pressure in the subterranean formation while said second amount of fracturing fluid is being pumped out of an opening of said second selectively opening sleeve and into the subterranean formation.

20. A method of harvesting geothermal energy in a subterranean formation, comprising:

drilling an injection wellbore that extends into the subterranean formation;

positioning a plurality of selectively opening sleeves in the injection wellbore spaced apart within the subterranean formation, each of said plurality of selectively opening sleeves being actuatable between an open position and a closed position, wherein a set of adjacent selectively opening sleeves of said plurality of selectively opening sleeves are threadably connected to a casing string, and wherein said set of adjacent selectively opening sleeves and said casing string are encased in cement;

fracturing said cement encasing said selectively opening sleeves and fracturing the subterranean formation in a plurality of locations proximate to the plurality of selectively opening sleeves to define a plurality of stages at a plurality of distances from a ground surface and to enhance a fluid flow into the subterranean formation when said plurality of selectively opening sleeves are in the open position;

injecting a fluid down said injection wellbore at a first temperature through a first selectively opening sleeve of said plurality of selectively opening sleeves at a first distance of the plurality of distances in the injection wellbore corresponding to a first stage of the plurality of stages;

closing said first selectively opening sleeve and opening at least a second selectively opening sleeve of said plurality of selectively opening sleeves at a second, different distance of the plurality of distances in the injection wellbore corresponding to a second, different stage of the plurality of stages; and producing a heated fluid from said at least a second selectively opening sleeve at a second temperature higher than said first temperature.

* * * * *